(12) United States Patent
Yurekli et al.

(10) Patent No.: US 8,185,422 B2
(45) Date of Patent: May 22, 2012

(54) WORK ALLOCATION MODEL

(75) Inventors: Savas Yurekli, Eskisehir (TR); Geremy Heath, Manly (AU); Robert Easton, Surrey (GB)

(73) Assignee: Accenture Global Services Limited, Dublin (IE)

( * ) Notice: Subject to any disclaimer, the term of this patent is extended or adjusted under 35 U.S.C. 154(b) by 1528 days.

(21) Appl. No.: 11/461,077

(22) Filed: Jul. 31, 2006

(65) Prior Publication Data

US 2008/0066072 A1 Mar. 13, 2008

(51) Int. Cl.
*G06Q 10/00* (2012.01)
(52) U.S. Cl. ...................................... 705/7.11; 705/7.13
(58) Field of Classification Search .................. 705/7.11, 705/7.13
See application file for complete search history.

(56) References Cited

U.S. PATENT DOCUMENTS

| | | | |
|---|---|---|---|
| 5,233,533 A | | 8/1993 | Edstrom et al. |
| 5,343,388 A | * | 8/1994 | Wedelin ............................. 705/8 |
| 5,408,663 A | | 4/1995 | Miller |
| 5,504,887 A | * | 4/1996 | Malhotra et al. .............. 707/205 |
| 5,546,542 A | * | 8/1996 | Cosares et al. ................ 709/241 |
| 5,623,404 A | * | 4/1997 | Collins et al. ................ 705/7.17 |
| 5,826,236 A | | 10/1998 | Narimatsu et al. |
| 5,940,816 A | * | 8/1999 | Fuhrer et al. ..................... 706/13 |
| 6,070,144 A | * | 5/2000 | Ginsberg et al. ............. 705/7.17 |
| 6,092,065 A | * | 7/2000 | Floratos et al. .................... 707/6 |
| 7,069,229 B1 | * | 6/2006 | Richardson et al. ......... 705/7.15 |
| 7,139,719 B1 | * | 11/2006 | Cherneff et al. ............. 705/7.23 |
| 2002/0188489 A1 | * | 12/2002 | Cheng et al. ....................... 705/8 |
| 2003/0099014 A1 | * | 5/2003 | Egner et al. .................... 359/124 |

FOREIGN PATENT DOCUMENTS

GB 2194086 2/1988

OTHER PUBLICATIONS

"A tabu search heuristic for the generalized assignment problem", [PDF] from niu.edu JA Diaz . . .—European Journal of Operational Research, 2001—Elsevier.*
"Scheduling to minimize average completion time: off-line and on-line algorithms", [PDF] from psu.edu LA Hall, DB Shmoys . . .—. . . of the seventh annual ACM-SIAM . . . , 1996—portal.acm.org.*
A genetic algorithm for the project assignment problem PR Harper, V de Senna, IT Vieira . . .—Computers & operations . . . , 2005—Elsevier.*
Adaptive Approach Heuristics for the Generalized Assignment Problem [PDF] from recercat.net . . . , D Serra—1998.*
Colored Petri Nets with changeable structures (CPN-CS) and their applications in modeling one-of-a-kind production (OKP) systems [PDF] from ualberta.ca Z Jiang, MJ Zuo, RYK Fung . . .—Computers & industrial engineering, 2001—Elsevier.*
Christian Gabriel, European Patent Office, European Search Report for EP 06015914, April 18, 2007, 6 pages.

* cited by examiner

*Primary Examiner* — Jonathan G Sterrett
(74) *Attorney, Agent, or Firm* — Fish & Richardson P.C.

(57) ABSTRACT

A system and method for allocating processes to a plurality of resources analyses an available resource capacity for a plurality of resources, generates resource assignment sets and corresponding schedule parameters, and generates a control parameter for each resource assignment set. The control parameter is based on corresponding weighting parameters and corresponding schedule parameters. One of the resource assignment sets is selected and used to allocate tasks to the resources based on a selection criterion for the control parameter.

24 Claims, 12 Drawing Sheets

WORK ALLOCATION MODEL

FIELD

This disclosure relates to systems and methods for allocating processes to a plurality of resources.

BACKGROUND

In various environments, such as the manufacturing industry, consulting services, or computer-implemented processes, for example, controlling the scheduling and the allocation of individual processes in a project is often a critical task for insuring a smooth and efficient production flow. For a plurality of processes requiring large resource capacities and a plurality of different resource capabilities, focusing on one or more prioritized processes or resources often result in an undesirable idle time of other resources.

SUMMARY

Disclosed herein is a system and method for allocating processes to a plurality of resources that provides an improved utilization of the resources and an improved throughput adaptable to the specific needs of the user.

DETAILED DESCRIPTION

Figure 1:
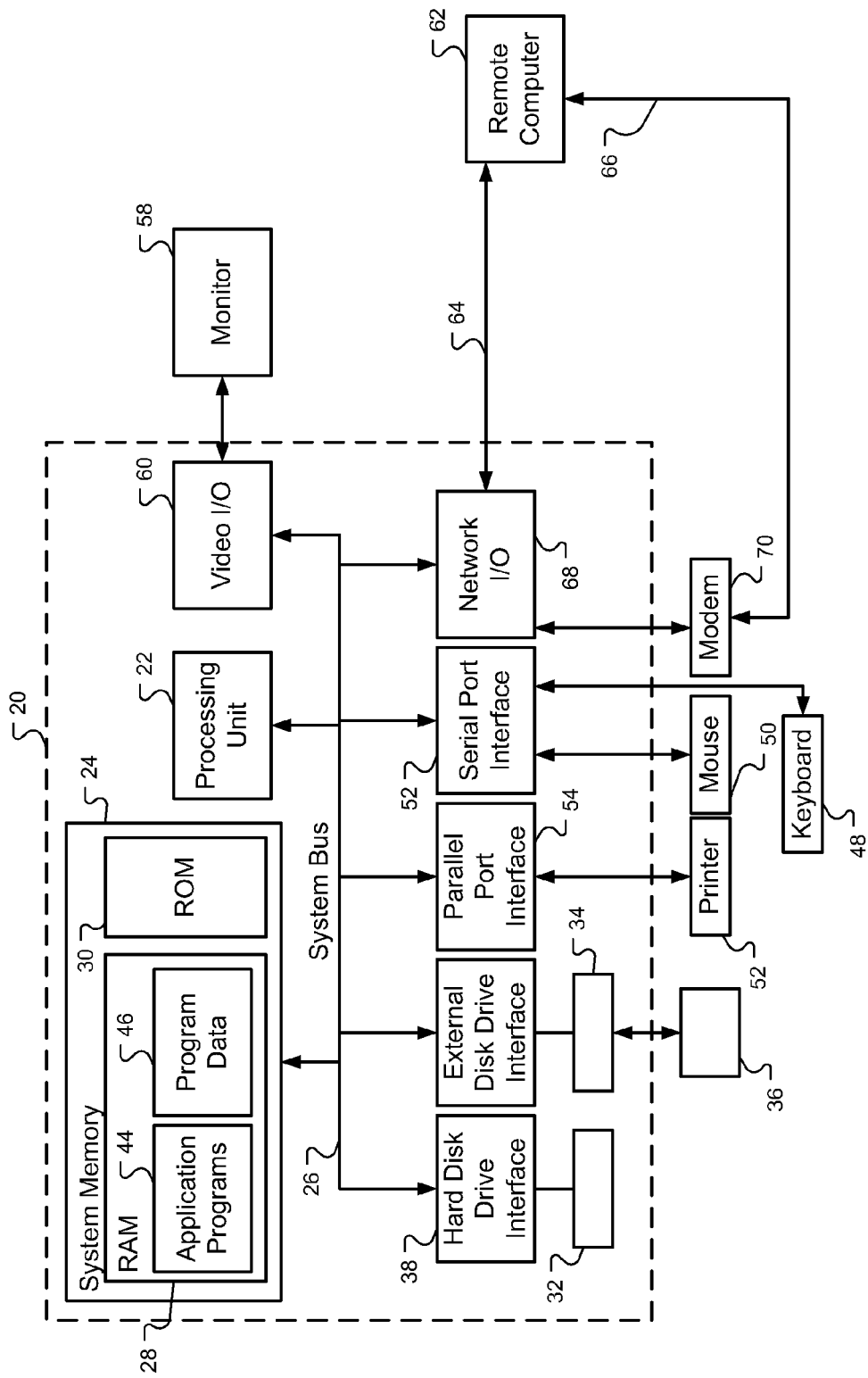
FIG. 1 shows an exemplary system for implementing the systems and methods disclosed herein.

FIG. 1 shows an exemplary system for implementing the systems and methods disclosed herein. The system includes a general purpose computing device in the form of a conventional computing environment 20 (e.g. personal computer), including a processing unit 22, a system memory 24, and a system bus 26 that couples various system components including the system memory 24 to the processing unit 22. The processing unit 22 may perform arithmetic, logic and/or control operations by accessing system memory 24. The system memory 24 may store information and/or instructions for use in combination with processing unit 22. The system memory 24 may include volatile and non-volatile memory, such as random access memory (RAM) 28 and read only memory (ROM) 30. A basic input/output system (BIOS) containing the basic routines that helps to transfer information between elements within the personal computer 20, such as during start-up, may be stored in ROM 30. The system bus 26 may be any of several types of bus structures including a memory bus or memory controller, a peripheral bus, and a local bus using any of a variety of bus architectures.

The personal computer 20 may further include a hard disk drive and an external disk drive 34 for reading from or writing to a removable disk 36. The removable disk may be a magnetic disk for a magnetic disk driver or an optical disk such as a CD ROM for an optical disk drive. The hard disk drive 32 and external disk drive 34 are connected to the system bus 26 by a hard disk drive interface 38 and an external disk drive interface 40, respectively. The drives and their associated computer-readable media provide nonvolatile storage of computer readable instructions, data structures, program modules and other data for the personal computer 20. The data structures may include relevant data of the implementation of the resource allocation method, as described in more details below. The relevant data may be organized in a database, for example a relational or object database.

Although the exemplary environment described herein employs a hard disk and an external disk 36, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 36, ROM 30 or RAM 28, including an operating system, one or more application programs 44, other program modules, and program data 46; The application programs may include at least a part of the functionality as detailed in FIGS. 2 and 3.

A user may enter commands and information, as discussed below, info the personal computer 20 through input devices such as keyboard 48 and mouse 50. Other input devices may include a microphone (or other sensors), joystick, game pad, scanner, or the like. These and other input devices may be connected to the processing unit 22 through a serial port interface 52 that is coupled to the system bus 26, or may be collected by other interfaces, such as a parallel port interface 54, game port or a universal serial bus (USB). Further, information may be printed using printer 56. The printer 56 and other parallel input/output devices may be connected to the processing unit 22 through parallel port interface 54. A monitor 58 or other type of display device is also connected to the system bus 26 via an interface, such as a video input/output 60. In addition to the monitor, computing environment 20 may include other peripheral output devices, such as speakers or other audible output.

The computing environment 20 may communicate with other electronic devices such as a computer, telephone (wired or wireless), personal digital assistant, television, or the like. To communicate, the computer environment 20 may operate in a networked environment using connections to one or more electronic devices. FIG. 1 depicts the computer environment networked with remote computer 62. The remote computer 62 may be another computing environment such as a server, a router, a network PC, a peer device or other common network node, and may include many or all of the elements described above relative to the computing environment 20. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAM 64 through a network I/O 68. When used in a WAN networking environment, the computing environment 20 may include a modem 70 or other means for establishing communications over the WAN 66. The modem 70, which may be internal or external to computing environment 20, is connected to the system bus 26 via the serial port interface 52. In a networked environment, program modules depicted relative to the computing environment 20, or portions thereof, may be stored in a remote memory storage device resident on or accessible to remote computer 62, it will be appreciated that the network connections shown are exemplary and other means of establishing a communications link between the electronic devices may be used.

The above-described computing system is only one example of the type of computing system that may be used to implement the method for allocating a plurality of processes to a plurality of resources.

Figure 2:
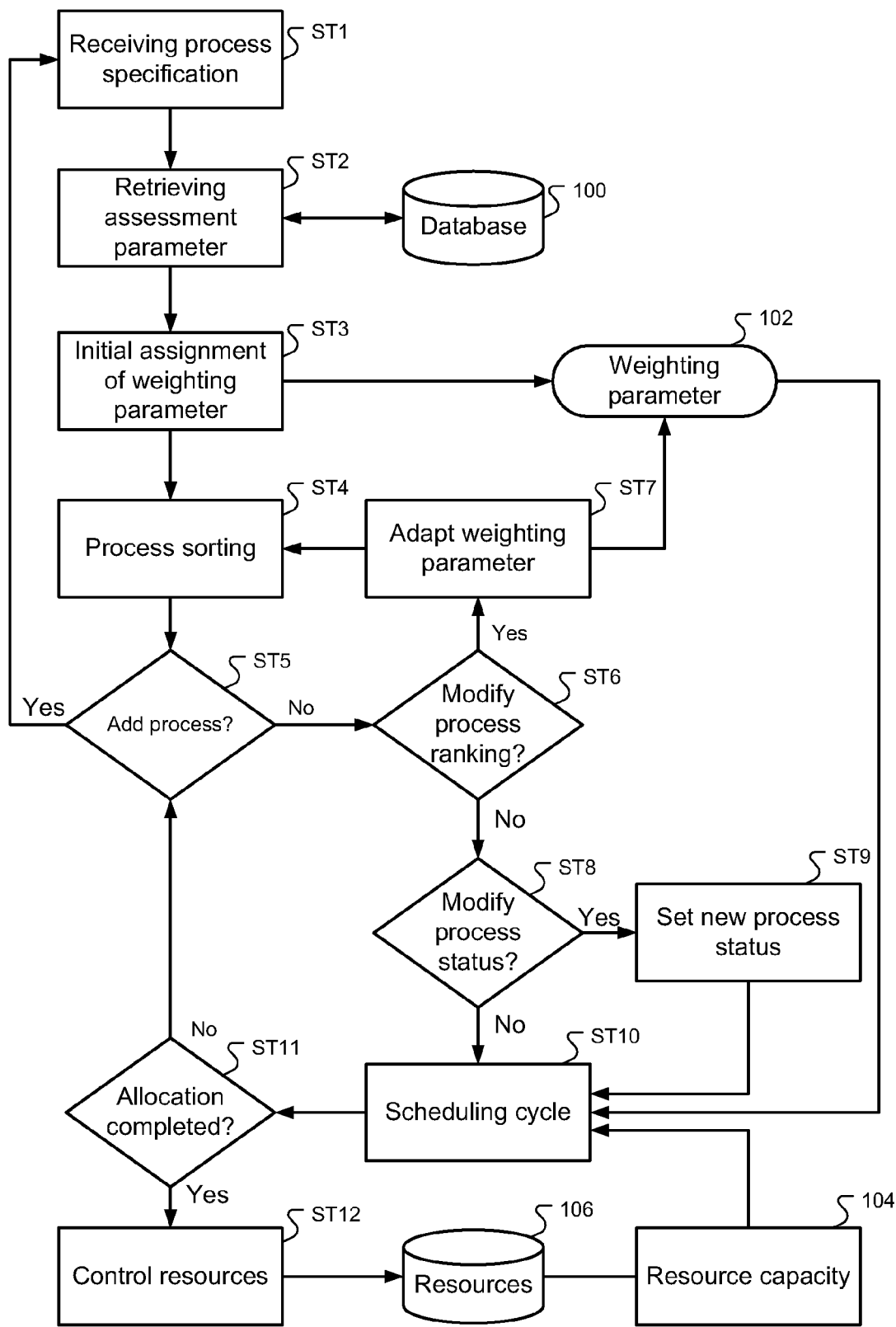
FIG. 2 is a flow diagram of a method of allocating processes to a plurality of resources.

FIG. 2 is a flow diagram of a method for allocating processes to a plurality of resources. In a first step ST1 a process specification is received from a database, a user interface, or the like. The process specification exemplarily defines at least one process, in another example a plurality of processes, such as production processes to be carried out at a production plant of a car manufacturer. At least some of the processes may be production processes for a particular vehicle or a component thereof, for example. Alternatively or additionally at least some of the processes may represent service and/or repair orders for vehicles or components thereof. At least some of the processes may be standard production processes within an assembly line. Other processes may represent customer orders, spare part deliveries of subassembly delivery.

Each process comprises at feast one task, wherein each task belongs to a task category. Exemplarily, at least some of the processes comprise a plurality of tasks. A process for producing a mudguard for a car, for example, comprises a plurality of tasks, such as cutting and/or punching metal, bending/folding the metal to specific shape, drilling or punching holes for passing wire through the holes or for screwing additional components to the mudguard, welding, painting, etc. Each task belongs to a task category, such as drilling, milling, bending, welding, cutting metal up to a predetermined thickness, cutting metal thicker than said predetermined thickness, punching, cleaning, painting, gluing, assembly, simulation, crash test, wind tunnel test, etc. Exemplarily, at least some of the tasks are at least partly carried out by a machine, particularly a robot and/or a computer. Other tasks may be carried out by a worker who may exemplarily operate a machine, such as a drill, a polishing machine, a computer, etc. Each of the individual machine, robot, computer, workplace, etc. may represent a resource for carrying out at least one particular category of tasks.

Each of the resources has a resource capacity for performing tasks within at least one category. The resource capacity may be defined in terms of a maximum task extent that can be performed by the resource per time unit, such as drill holes per minute, meters of welding seam per hour, or square meter of paining per hour, etc. At least some of the resources may have a standard use time, such as 12 or 24 hours per day, a certain number of days per week, or 60 minutes per hour, for example. Exemplarily, at least some of the resources further have a non-scheduled time reserve parameter, exemplarily defined in terms of a percentage of the standard use time, such as 20%, for example. A non-scheduled time reserve defined for a resource may be used to reserve time for maintenance and servicing of the resource and/or for performing additional non-scheduled tasks. Exemplarily, the standard use time and the non-scheduled time reserve parameter for a resource are at least partially stored in a database and/or entered by a user. Stored data may also be edited by a user.

Exemplarily, for at least some of the tasks the process specification received from a user or retrieved from a database defines a processing time, where the processing lime of a task exemplarily defines the total time during which the respective resource is in use and/or occupied for carrying out this task. The processing time may be defined in a capacity requirement parameter assigned to the task. In one example a standard processing time for one or more tasks is stored in a database and/or entered by a user. Alternatively or additionally a task volume parameter may be defined for at least some of the tasks, where the task volume parameter defines an extent of the task, such as how may holes have to be drilled, how large is the area to be painted, etc. Exemplarily, the processing time for a task is determined depending on the task volume parameter, where, exemplarily, a resource capacity for a particular resource is considered and/or a standard resource capacity value is used for determining a processing time and/or a standard processing time respectively.

For at least some of the tasks a time frame parameter may be defined. At least some of the tasks are not sufficiently defined by processing time but may require additional time to be carried out. For example, painting requires time for drying the paint in addition to the mere painting process. In particular, in case the painting task requires several layers of paint, there may be required a considerable amount of time for drying the individual layers, where the painting resource is not directly used for this painting task and may be used for different tasks which may even belong to different processes. Accordingly, at least some of the tasks have a time frame parameter assigned to the task, where the time frame parameter defines the minimum time need for completing the task, including the processing time and additionally required idle time, for example. Accordingly, for at least some of the tasks two time parameters may be defined, namely the processing time and the time frame parameter.

Exemplarily, the time frame parameter defines a division of the total time enclosed by the time frame parameter, i.e. the time frame parameter exemplarily defines a plurality of periods of time or time intervals or time slots. For example, the time frame parameter may define three hours, where each hour is considered as a separate time frame interval (time slot) although the three hours may be scheduled directly in succession. For other tasks, time frame intervals (time slots), for example, of minutes, days, or weeks may be defined. In another example an arbitrary period of time may be defined as a time frame interval (time slot). In one example the same time frame interval is used for all tasks within all processes. The time frame parameter may define the minimum number of time frame intervals among which the total processing time for the respective task should be distributed. When carrying out a task the processing time is exemplarily distributed within the time frame intervals, or may even extend beyond the time frame intervals. Exemplarily, a minimum and a maximum of processing time to be assigned to a single time frame interval (time slot) are determined. In one example said minimal and maximal value may be determined by calculating the ratio between the processing time and the number of time frame intervals, i.e. by determining the mean value of processing time per time frame interval and adding or subtracting a certain percentage thereof, respectively. Accordingly, the minimum processing time to be assigned to a single time frame interval may be set to 50% of the mean value, where the maximum value may be set to 150% of the mean value. This enables the resources to perform multiple tasks in a time frame interval.

Within a process, exemplarily, at least some of the tasks depend on each other, i.e., one task may technically require to be carried out before other tasks. For example, welding is exemplarily carried out before painting. Exemplarily, the process specification defines the composition of the processes from the tasks. In a further example, the process specification defines a dependency of the tasks from each other, i.e. it exemplarily defines for each task which other tasks have to be carried out before this task. This dependency specification is exemplarily defined in a dependency parameter assigned to at least some of the tasks, in another example to each of the tasks.

Exemplarily, at least some of the tasks are carried out at different locations than the other tasks. For example, simulation may be carried out on a remote computer system and painting may be carried out at a paint shop located remote from a welding robot. Accordingly, the resources may be distributed. Exemplarily, the resources are connected with each other and/or to a resource control unit via a network such as the networks exemplary described in connection with FIG. 1.

The resource control unit exemplarily receives the process specification in step ST1. In one example the process specification is associated or comprises for at least some of the processes, in another example for each of the processes, a process identification parameter (Process ID), where a detailed definition or specification of the process identified by the process identification parameter is stored in a database 100. The process specification may further comprise a weighting parameter for each of the processes. Exemplarily, the database 100 stores an assessment parameter for each of the processes, which is retrieved from the database 100 in step ST2. Alternatively, the assessment parameter for at least part of the processes may be received from a user together with the process identification parameter (Process ID). The assessment parameter exemplarily defines an effective extent with respect to a required processing time and/or a required capacity and/or capability for the resources, for example, of the process which it is assigned to. Accordingly, the assessment parameter exemplarily represents a measure for the effective utilization of a resource through the process, for example. Alternatively or additionally other criteria may be considered for the assessment of a process and for establishing an assessment parameter. In one example, the assessment parameter for a process is determined based on a process volume parameter and an efficiency parameter assigned to the process. The process volume parameter may define a total amount of units or a total number of parts or pieces of products that have to be processed in the process. The efficiency parameter may define an effective extent with respect to a required processing time and/or a required capacity and/or capability for the resources, for example, for a single unit or a single part of piece of a product to be processed.

Exemplarily, the processes are managed in a process management module. This management module is capable of receiving process specifications for at least one process, in another example for a plurality of processes, from a database and/or a process specification interface, for example.

The process specification for each process may comprise a list of tasks and/or a detailed definition of tasks comprised in the process, a criticality parameter of the process and/or a preferred location for performing the process or at least part of the tasks, where the preferred location may be defined in a task location parameter, for example. The process specification may further comprise a requested starting time for the process, a requested ending time for the process, and/or the process volume parameter.

In one example, the process specification for at least one process may comprise a unique identification of tasks through a task identification parameter (task ID) for each task. A detailed definition or specification of the tasks identified according to the task identification parameters may then be retrieved from a database. The task specifications retrieved from the database may comprise a capacity requirement parameter that, exemplarily, is initially set to a standard processing time stored in the database. Exemplarily, a time frame parameter for one or more tasks is initially set to a standard time frame stored in the database. The task specification for one or more tasks may further define a task location and/or a task category.

In one example, the process specification and/or the task specification may comprise for one or more processes and/or tasks a forced resource assignment of said process or task to a specific resource. Exemplarily, the forced resource assignment defines a resource for performing said process or task, where the forced resource assignment is exemplarily not changed during establishing a first and/or one or more further resource-task assignment sets. The forced resource assignment is exemplarily received from a user and/or retrieved from a database via the process specification interface.

The task specification for at least one task may further comprise a dependency parameter defining other tasks within the same process on which the at least one task depends. The task on which the at least one task depends are exemplarily called predecessors or predecessor tasks in the following. Exemplarily, a bundle parameter may he assigned to at least one task, in another example to each task. Exemplarily, the bundle parameter defines a group of tasks within a particular process, where tasks having identical bundle parameter belong to the same group of tasks. A grouping of tasks may be of particular advantage for tasks that are exemplarily assigned to the same resource.

In one example implementation, a group of tasks having the same bundle parameter must be performed by the same resource. This ensures the continuity in the execution of the tasks, e.g. all tasks in the bundle are assigned to the same resource so that the resource can use the output of a predecessor task for the successor tasks. Similarly, if there is no dependency interrelation, bundled tasks might be sharing same material for the execution, therefore assigning those tasks to the same resource may be advantageous.

In step ST3 for each process a weighting parameter 102 is determined based on the assessment parameter assigned to the respective process. Exemplarily, the weighting parameter 102 is an infernal parameter (internal weighting parameter) which is, exemplarily, used for internal processing, such as ranking the processes and is exemplarily not made visible to the user. In the initial assignment of the weighting parameters 102 to the processes in step ST3, the weighting parameter is exemplarily set to be identical to the assessment parameter. Accordingly, in one example, for all processes the internal weighting parameter is initially set to the assessment parameter before any exemplarily manual priority adjustment is made. A manual priority adjustment is, for example, made by manually modifying a process ranking parameter as described later.

Exemplarily, the processes are initially sorted by their assessment parameter, then in a subsidiary way by the process volume parameter, and then in a further subsidiary way by a process criticality parameter. Subsequent sorting in step ST4 is, for example, performed by the weighting parameter 102, then in a subsidiary way by the process volume parameter and then in a further subsidiary way by the process criticality parameter. Alternatively also the initial sorting of the processes may be carried out based on the weighting parameter 102 instead of the assessment parameter. Nevertheless, since the weighting parameter 102 is initially identical to the assessment parameter in the described example, the sorting of the processes will be identical in this case. Once the internal weighting parameter is determined, ordering of the processes may occur depending on the internal weighting parameter instead of the assessment parameter.

The criticality parameters assigned to the processes may be received as part of the process specification or retrieved from the database 100. The criticality parameter may be assigned to the processes by a user according to user's preferences. The processes are exemplarily sorted in descending order of their weighting parameter 102 (or assessment parameter), meaning that the process having the highest weighting parameter (or assessment parameter) is ranked first, the process having the second highest weighting parameter (or assessment parameter) is ranked second, and so on. Processes having identical weighting parameters (or assessment parameters) are, for example, ordered according to their process volume parameter in descending order. Even further, processes having identical weighting parameters (or assessment parameters) and identical process volume parameters are, for example, ordered according to their process criticality parameter in ascending order. Once the ordering of the processes is completed, a ranking parameter is assigned to the processes, which is an integer number, for example.

Different types of processes may use the same resources, but their benefits to the organization may be measured by different metrics. For example, the manufacturing of two different types of products, of which production or processing priorities are driven by different parameters, can be performed by the same group of resources, such as building two different models of cars in the same factory. The two different models of cars share the same production lines to a great extent at least for some parts and, therefore, the common tasks are performed by the same resources. The methods disclosed herein provide a solution to assess the priorities of two different groups of processes in a combined way.

In on example implementation, the methods differentiate at least two different groups of processes and use the weighting parameter and the volume parameter, respectively, to prioritize and to measure the benefit of the two different groups. Other types of processes, which may not have, for example, any measurable benefit to the organization, are regarded as "other" group of processes and the metric to measure the success of the optimization algorithm is to control their finishing time and try to prevent any delays.

For the "volume" type of processes, an as "internal volume parameter" parameter may be used in the same way as or analogous way to the internal weighting parameter, e.g. for the new processes the internal weighting parameter is initially set to the volume parameter. If the ranking of a process is advanced by one, then the "internal volume parameter" of the process that is being promoted and the process that is going to be degraded by one rank may be swapped. Accordingly, for "volume" type processes the internal volume parameter may be understood and used analogous to the weighting parameter, i.e. for "volume" type processes the weighting parameter may be replaced by the internal volume parameter.

Tables 1A to 1I demonstrate sorting and ranking steps for the work allocation processes. Each row in the tables (except the labelling row) represents one process identified by the process identification parameter (process ID). Further, the process volume parameter, the assessment parameter, the criticality parameter and the internal weighting parameter 102 for each process are shown in the Tables. Moreover, the ranking parameter assigned to each process in step ST4 is also indicated in the Tables. Finally, in one example a process status parameter is assigned to each of the processes. Table 1A represents an exemplary situation after step ST4. The processes (100, 200, . . . , 1000) have been sorted in accordance with the above described exemplary sorting criteria and ranked according to the achieved ordering, where the ranking is defined by the ranking parameters (priority ranking parameter) having integer values from 1 to the integer representing the total number of ranked processes, which in the example of Table 1A is 10.

TABLE 1A

| Priority Ranking Parameter | Process ID | Internal Weighting Parameter | Assessment Parameter | Process Volume Parameter | Criticality Parameter | Process Status |
|---|---|---|---|---|---|---|
| 1 | 100 | 1000 | 1000 | 25000 | 1 | Unscheduled |
| 2 | 200 | 800 | 800 | 20000 | 2 | Unscheduled |
| 3 | 300 | 500 | 500 | 15000 | 1 | Unscheduled |
| 4 | 400 | 500 | 500 | 10000 | 3 | Unscheduled |
| 5 | 500 | 300 | 300 | 12000 | 2 | Unscheduled |
| 6 | 600 | 200 | 200 | 10000 | 1 | Unscheduled |
| 7 | 700 | 200 | 200 | 7000 | 3 | Unscheduled |
| 8 | 800 | 0 | 0 | 17000 | 2 | Unscheduled |
| 9 | 900 | 0 | 0 | 12000 | 1 | Unscheduled |
| 10 | 1000 | 0 | 0 | 12000 | 3 | Unscheduled |

Subsequently, in step ST5 it is determined whether further processes should be added. This determination may be made depending on a respective input from a user who may decide not to add further processes at that stage. In this case the method proceeded to a step ST6 where it is determined whether the user decides to manually modify the ranking of the processes. In this case a modified ranking parameter for at least one process may be received from the user. For example, the user may manually set the ranking parameter for the process with Process ID equal 900 to a value of two, i.e. the user may manually change the ranking parameter from the previous value nine to a value of two, defining this process as the second highest ranked process. Accordingly, the ranking of the processes with a previous ranking parameter between the previous ranking parameter (excluded) and the new ranking parameter (included) of the manually modified process are shifted towards the value of the previous ranking parameter of the modified process. The resulting new ranking parameters for the individual processes can be seen in Table 1B below.

Subsequently, in step ST7 the weighting parameter 102 for the modified process is adapted to the new ranking. In one example, the weighting parameter 102 is adapted as follows: With the modified process having a new ranking parameter of N larger than one but smaller than the total number of ranked processes, the adapted weighting parameter 102 is determined based on the weighting parameters 102 of the processes having ranking parameter of N−1 and N+1, i.e. the neighboring processes. Exemplarily, in case the neighbouring weighting parameters, i.e. the weighting parameter 102 for the processes having the ranking parameters N−1 and N+1, are different, then the adapted weighting parameter 102 of the modified process is set to a value between the neighbouring weighting parameters, exemplarily to the average value of the neighbouring weighting parameters. Otherwise, i.e. in case the neighbouring weighting parameters are identical, the adapted weighting parameter 102 may be set to the same value.

In case the modified process has a new ranking parameter of one, its weighting parameter 102 is exemplarily adapted depending on the weighting parameter 102 of the process with the new ranking parameter two. Exemplarily, the modified weighting parameter 102 is set to a value that is by a predetermined number or incremental value, such as one or 100, higher than the weighting parameter 102 of the process having the ranking parameter two. In case the new ranking parameter of the modified process corresponds to the total number of ranked processes, i.e. in case the modified process has been assigned to the lowest rank, its weighting parameter 102 may be set to a value of zero, for example.

Based on the adapted weighting parameter 102 the method as shown in FIG. 2 proceeds to step ST4, where the processes are again sorted as described above. Table 1B represents a situation after the steps ST5 to ST7 and ST4 have been carried out. In this example, a user has modified the ranking parameter of the process (900) to the value two in step ST6. In step ST7 the weighting parameter 102 for the process (900) has been adapted to the value 900, which is the average of the neighbouring weighting parameters which are 800 and 1000, respectively. In step ST4 the processes have been sorted as described above. Exemplarily, all newly added processes have a process status parameter set to "Unscheduled", which may define that no scheduling has been defined for these processes up to this stage.

"Unscheduled", "Scheduled", "Firm", "On-hold", "In-Progress", "Completed", and "Cancelled" or a status corresponding to these values. In one example the user can change the process status parameter only to the values "On-hold" and "Cancelled" or a status corresponding to these values, while the other values for the process status parameter are automatically assigned by an exemplary system.

The method then proceeds to step ST10 of scheduling the processes. Details of the scheduling cycle ST10 according to an exemplary implementation are described later with reference to FIG. 3. In step ST10 an available resource capacity 104 for each of a plurality of resources 106 is analyzed, wherein each of the resources 106 that is analyzed may have a capability of performing tasks within at least one task category of the tasks comprised in the processes that have been received and sorted in the previous steps. Based on the analyzed resource capacity for the task categories defined for the sorted processes, a first scheduling of all tasks belonging to the specified processes is established and a first schedule parameter for each of the processes is evaluated depending on the established scheduling of the tasks belonging to the

TABLE 1B

| Priority Ranking Parameter | Process ID | Internal Weighting Parameter | Assessment Parameter | Process Volume Parameter | Criticality Parameter | Process Status |
|---|---|---|---|---|---|---|
| 1 | 100 | 1000 | 1000 | 25000 | 1 | Unscheduled |
| 2 | 900 | 900 | 0 | 12000 | 1 | Unscheduled |
| 3 | 200 | 800 | 800 | 20000 | 2 | Unscheduled |
| 4 | 300 | 500 | 500 | 15000 | 1 | Unscheduled |
| 5 | 400 | 500 | 500 | 10000 | 3 | Unscheduled |
| 6 | 500 | 300 | 300 | 12000 | 2 | Unscheduled |
| 7 | 600 | 200 | 200 | 10000 | 1 | Unscheduled |
| 8 | 700 | 200 | 200 | 7000 | 3 | Unscheduled |
| 9 | 800 | 0 | 0 | 17000 | 2 | Unscheduled |
| 10 | 1000 | 0 | 0 | 12000 | 3 | Unscheduled |

From the step ST4 the method again proceeds to step ST5, where it is determined whether further processes are added. Table 1C shows a definition for three further processes that may be received from a user. For this the method proceeds to step ST1 as shown in FIG. 2. The new processes, for examples, may initially have no ranking parameter assigned thereto. The three new processes may be received in three subsequent cycles of the loop defined by the steps ST1 to ST5, or they may be received simultaneously in one cycle. The new processes are added to the previous processes and sorted and ranked together with the previous processes as described above. After the new processes have been ranked their initial process status parameter may be automatically set from the value "New Process" to the Value "Unscheduled".

respective process. The first scheduling of all tasks represents a first resource-task assignment set assigning the plurality of tasks to the plurality of resources. Further, when the first resource-task assignment set has been established a first control parameter is evaluated based on the plurality of pairs each comprising a weighting parameter and a schedule parameter assigned to each of the plurality of processes. The first control parameter may be stored together with the first resource-task assignment set.

Further, a second resource-task assignment set different from the first resource-task assignment set is established. The second resource-task assignment set may differ from the first resource-task assignment set in that not all tasks are assigned

TABLE 1C

| Priority Ranking Parameter | Process ID | Internal Weighting Parameter | Assessment Parameter | Process Volume Parameter | Criticality Parameter | Process Status |
|---|---|---|---|---|---|---|
| NA | 1100 | 500 | 500 | 20000 | 2 | New Process |
| NA | 1200 | 900 | 900 | 10000 | 1 | New Process |
| NA | 1300 | 0 | 0 | 20000 | 1 | New Process |

If in step ST6 no modification of a ranking parameter is requested, the method according to the example as shown in FIG. 2 proceeds to a step ST8, where it is determined whether a user wants to manually modify at least one of the process status parameters. Accordingly, the user may, in case of need, manually modify the process status parameter for at least one process, where in step ST9 the new status is assigned to the modified process. Exemplarily, the process status parameter for each process may take one of the values "New Process", to the same resources as in the first resource-task assignment set. A second schedule parameter for each of the processes is evaluated depending on the established scheduling of the tasks within the second resource-task assignment set and a second control parameter is evaluated based on the plurality of pairs of parameters, each pair comprising a weighting parameter and a schedule parameter defined for each of the plurality of processes. The second control parameter may be stored together with the second resource-task assignment set.

Even further, one or more additional resource-task assignment sets different from the first and second resource-task assignment set and/or different from one another may be established in the same manner and for each additional resource-task assignment set an additional control parameter may be evaluated. Each additional control parameter may be stored together with the respective resource-task assignment set in a database, such as the database 100.

Based on a selection criterion for the control parameter, step ST10 may select one of the stored control parameters. The selection criterion may define to select the resource-task assignment set having the highest control parameter or the lowest control parameter. Alternatively, the selection criterion may define any other condition for the control parameter. Based on the selection of a control parameter, step ST10 may retrieve the corresponding resource-task assignment set from the database. In one example implementation, all established resource-task assignment sets may be stored together with the control parameters. In step ST10 the method may further allocate at least some of the processes to a plurality of resources 106 by allocating the tasks of for processes to the resources according to the selected resource-task assignment set.

The criterion used to reach the optimum effectiveness and/or time efficiency for a process by making use of the method can be different for different types of processes. For some processes, keeping the requirements on the due dates are important hence the method might choose the resource assignment which gives the minimum delays. For some processes, however, analyzing only the delays is not sufficient, but the potential losses in case of delay might be considered as well next to the amount of delays. In contrast to the examples given above, some processes may require even early delivery and may require choosing an assessment criterion that favors 'earliness'.

In step ST11, the method may further determine whether the allocation cycle has been completed. The decision on this may be defined according to user input. For example, the user may decide to add further processes or to manually edit one or more of the scheduled or unscheduled processes. This may also include manually ordering or reordering of the processes. In this case the method may proceed to step ST5 which has already been described above. If in step ST11 the allocation cycle is determined to be completed, the method may further comprise a step ST12 of controlling at least some of the resources 106 according to the established allocation of the tasks to the resources. Exemplarily, a control unit is connected to at least some of the resources via a network and the method, exemplarily, further comprises a step of directly or indirectly controlling operation of at least some of the resources according to the established schedule. In particular, an operation schedule or control signals or messages corresponding thereto may be transmitted to the individual resources via the network. Operation of the respective resource may be started and slopped either automatically of through a user of the resource in accordance with the transmitted operation schedule.

Table 1D shows an example of the plurality of processes described above, where the processes 1100, 1200, and 1300 have been added after the other processes have already been scheduled. The added processes have not yet been scheduled. This is indicated by the process status parameter for the individual processes.

TABLE 1D

| Priority Ranking Parameter | Process ID | Internal Weighting Parameter | Assessment Parameter | Process Volume Parameter | Criticality Parameter | Process Status |
| --- | --- | --- | --- | --- | --- | --- |
| 1 | 100 | 1000 | 1000 | 25000 | 1 | Scheduled |
| 2 | 900 | 900 | 0 | 12000 | 1 | Scheduled |
| 3 | 1200 | 900 | 900 | 10000 | 1 | Unscheduled |
| 4 | 200 | 800 | 800 | 20000 | 2 | Scheduled |
| 5 | 1100 | 500 | 500 | 20000 | 2 | Unscheduled |
| 6 | 300 | 500 | 500 | 15000 | 1 | Scheduled |
| 7 | 400 | 500 | 500 | 10000 | 3 | Scheduled |
| 8 | 500 | 300 | 300 | 12000 | 2 | Scheduled |
| 9 | 600 | 200 | 200 | 10000 | 1 | Scheduled |
| 10 | 700 | 200 | 200 | 7000 | 3 | Scheduled |
| 11 | 1300 | 0 | 0 | 20000 | 1 | Unscheduled |
| 12 | 800 | 0 | 0 | 17000 | 2 | Scheduled |
| 13 | 1000 | 0 | 0 | 12000 | 3 | Scheduled |

In the example shown in Table 1D, process 1100 is ranked above process 300 because it has the same internal weighting parameter but a higher process volume parameter. Process 1200 is ranked below process 900 because it has the same weighting parameter but a lower process volume parameter. Process 1300 is ranked above process 800 because it has the same weighting parameter but a higher process volume parameter.

Table 1E demonstrates an example in which process 1300 has been manually adjusted to the highest ranked process in step ST6 shown in FIG. 2. Accordingly, the (internal) weighting parameter is set to a value corresponding to the weighting parameter (value 1000) of the second highest ranked process (process ID 100) plus one, i.e. to the value 1001.

TABLE 1E

| Priority Ranking Parameter | Process ID | Internal Weighting Parameter | Assessment Parameter | Process Volume Parameter | Criticality Parameter | Process Status |
| --- | --- | --- | --- | --- | --- | --- |
| 1 | 1300 | 1001 | 0 | 20000 | 1 | Unscheduled |
| 2 | 100 | 1000 | 1000 | 25000 | 1 | Scheduled |
| 3 | 900 | 900 | 0 | 12000 | 1 | Scheduled |
| 4 | 1200 | 900 | 900 | 10000 | 1 | Unscheduled |
| 5 | 200 | 800 | 800 | 20000 | 2 | Scheduled |
| 6 | 1100 | 500 | 500 | 20000 | 2 | Unscheduled |

TABLE 1E-continued

| Priority Ranking Parameter | Process ID | Internal Weighting Parameter | Assessment Parameter | Process Volume Parameter | Criticality Parameter | Process Status |
|---|---|---|---|---|---|---|
| 7 | 300 | 500 | 500 | 15000 | 1 | Scheduled |
| 8 | 400 | 500 | 500 | 10000 | 3 | Scheduled |
| 9 | 500 | 300 | 300 | 12000 | 2 | Scheduled |
| 10 | 600 | 200 | 200 | 10000 | 1 | Scheduled |
| 11 | 700 | 200 | 200 | 7000 | 3 | Scheduled |
| 12 | 800 | 0 | 0 | 17000 | 2 | Scheduled |
| 13 | 1000 | 0 | 0 | 12000 | 3 | Scheduled |

For processes that have already been started the process status parameter may be set to a value representing "in-Progress" or a similar value. This may apply to processes for which at least one task has already been started to be performed by at least one resource. A task status parameter (Task_Status) is assigned to at least one task within each process, and a separate task status parameter may be assigned to each of the tasks within each of the processes. The task status parameter for each task may take one of the values "Unscheduled", "Scheduled", "Firm", "On-hold", "Early Start", "In-Progress", "Completed", and "Cancelled" or a status corresponding to these values. For tasks that have already been started, the task status parameter is set to a value representing "In-Progress" or a similar value. For processes that are scheduled to be started within a certain time (freezefirm period), which may be defined through a freeze timefirm period duration parameter or freezefirm period parameter, the process status parameter is set to a value representing "Firm" or a similar value. This improves the reliability of establishing and controlling a schedule for the near future which is defined by the firm period parameter. Accordingly, planning the material and resources required for performing the tasks in advance can be facilitated. In the example of Table 1F, a new schedule has been generated and processes 200 and 900 are now scheduled within the freezefirm period so that the assigned process status parameter is set to 'Firm'. Processes 1300 and 100 have already been started, so the process status parameter is now updated to 'In-Progress'. Processes having a status of "In-Progress" or "Firm" are not changed during the scheduling cycle ST10. These processes may retain their position in the process priority table until the processes have been completed, i.e. until the process status parameter is set to a value "Complete" or a status corresponding thereto. In another implementation, the ranking parameter of these processes can be automatically and/or manually changed. Such a change can occur before a scheduling of the processes is performed, for example.

TABLE 1F

| Priority Ranking Parameter | Process ID | Internal Weighting Parameter | Assessment Parameter | Process Volume Parameter | Criticality Parameter | Process Status |
|---|---|---|---|---|---|---|
| 1 | 1300 | 1001 | 0 | 20000 | 1 | Inprogress |
| 2 | 100 | 1000 | 1000 | 25000 | 1 | Inprogress |
| 3 | 900 | 900 | 0 | 12000 | 1 | Firm |
| 4 | 1200 | 900 | 900 | 10000 | 1 | Scheduled |
| 5 | 200 | 800 | 800 | 20000 | 2 | Firm |
| 6 | 1100 | 500 | 500 | 20000 | 2 | Scheduled |
| 7 | 300 | 500 | 500 | 15000 | 1 | Scheduled |
| 8 | 400 | 500 | 500 | 10000 | 3 | Scheduled |
| 9 | 500 | 300 | 300 | 12000 | 2 | Scheduled |
| 10 | 600 | 200 | 200 | 10000 | 1 | Scheduled |
| 11 | 700 | 200 | 200 | 7000 | 3 | Scheduled |
| 12 | 800 | 0 | 0 | 17000 | 2 | Scheduled |
| 13 | 1000 | 0 | 0 | 12000 | 3 | Scheduled |

Exemplarily, processes having a process status parameter of either "In-Progress" or "Firm" can be manually assigned a status of "On-hold" with a predetermined or predeteminable user defined restart date. Exemplarily, these processes will retain their original priority ranking (ranking parameter) and are exemplarily assigned to the first available resource after the restart date. In a different implementation, the ranking parameter of "resumed" processes can be changed automatically and/or manually.

Table 1G shows an example in which the process 900 has been manually assigned a process status parameter of "On-hold" with a process restart date of "ASAP" (as soon as possible) to free up capacity for a new urgent Process 1400. Process 900 will hold its previous position in the process priority list based on the ranking parameter. Exemplarily, process 900 will be re-scheduled in step ST10 as soon as a suitable resource capacity 104 is available. In addition, process 700 has been manually assigned a process status parameter of "Cancelled". Processes having a status "Cancelled" are exemplarily not considered during the assignment to resources in step ST10.

TABLE 1G

| Priority Ranking Parameter | Process ID | Internal Weighting Parameter | Assessment Parameter | Process Volume Parameter | Criticality Parameter | Process Status |
|---|---|---|---|---|---|---|
| 1 | 1300 | 1001 | 0 | 20000 | 1 | Inprogress |
| 3 | 900 | 900 | 0 | 12000 | 1 | On-Hold |
| 4 | 1200 | 900 | 900 | 10000 | 1 | Scheduled |
| 5 | 1400 | 700 | 700 | 20000 | 1 | Unscheduled |
| 6 | 200 | 800 | 800 | 20000 | 2 | Firm |
| 7 | 1100 | 500 | 500 | 20000 | 2 | Scheduled |
| 8 | 300 | 500 | 500 | 15000 | 1 | Scheduled |
| 9 | 400 | 500 | 500 | 10000 | 3 | Scheduled |
| 10 | 500 | 300 | 300 | 12000 | 2 | Scheduled |
| 11 | 600 | 200 | 200 | 10000 | 1 | Scheduled |
| 12 | 700 | 200 | 200 | 7000 | 3 | Cancelled |
| 13 | 800 | 0 | 0 | 17000 | 2 | Scheduled |
| 14 | 1000 | 0 | 0 | 12000 | 3 | Scheduled |

As shown in Table 1H, process 1400, which has already been added in Table 1G, is manually adjusted to have a ranking parameter with a value of 3, indicating that this process is ranked above process 900. Accordingly, process 1400 is exemplarily scheduled before process 900. The weighting parameter for process 1400 is, exemplarily automatically, set to the value (1000+900)/2=950, as described above.

TABLE 1H

| Priority Ranking Parameter | Process ID | Internal Weighting Parameter | Assessment Parameter | Process Volume Parameter | Criticality Parameter | Process Status |
|---|---|---|---|---|---|---|
| 1 | 1300 | 1001 | 0 | 20000 | 1 | Inprogress |
| 2 | 100 | 1000 | 1000 | 25000 | 1 | Inprogress |
| 3 | 1400 | 950 | 700 | 20000 | 1 | Unscheduled |
| 4 | 900 | 900 | 0 | 12000 | 1 | On-Hold |
| 5 | 1200 | 900 | 900 | 10000 | 1 | Scheduled |
| 6 | 200 | 800 | 800 | 20000 | 2 | Firm |
| 7 | 1100 | 500 | 500 | 20000 | 2 | Scheduled |
| 8 | 300 | 500 | 500 | 15000 | 1 | Scheduled |
| 9 | 400 | 500 | 500 | 10000 | 3 | Scheduled |
| 10 | 500 | 300 | 300 | 12000 | 2 | Scheduled |
| 11 | 600 | 200 | 200 | 10000 | 1 | Scheduled |
| 12 | 700 | 200 | 200 | 7000 | 3 | Cancelled |
| 13 | 800 | 0 | 0 | 17000 | 2 | Scheduled |
| 14 | 1000 | 0 | 0 | 12000 | 3 | Scheduled |

Table 1I shows an exemplary situation after a new master resources schedule is generated in step ST10. Process 1400 has been at least partly assigned to the resources previously assigned to process 900. This is not visible from the shown table. The process status parameter for process 1400 has been, exemplarily automatically, set to the value 'Firm'. Process 900 is rescheduled when a suitable resource 106 next becomes available and assigned a process status parameter of 'Scheduled'. Process 100 is now complete and assigned a status of "Complete" or a value corresponding thereto. Exemplarily, the ranking parameter for completed and/or cancelled processes is, exemplarily automatically, set to an undefined status, such as a value of "X", indicating that these processes should not be considered during ordering or scheduling of processes. Exemplarily, processes having such a ranking parameter (e.g. "X") are no longer visible to a user.

TABLE 1I

| Priority Ranking Parameter | Process ID | Internal Weighting Parameter | Assessment Parameter | Process Volume Parameter | Criticality Parameter | Process Status |
|---|---|---|---|---|---|---|
| 1 | 1300 | 1001 | 0 | 20000 | 1 | Inprogress |
| 5 | 1400 | 950 | 700 | 20000 | 1 | Firm |
| 3 | 900 | 900 | 0 | 12000 | 1 | Scheduled |
| 4 | 1200 | 900 | 900 | 10000 | 1 | Scheduled |
| 6 | 200 | 800 | 800 | 20000 | 2 | Firm |
| 7 | 1100 | 500 | 500 | 20000 | 2 | Scheduled |
| 8 | 300 | 500 | 500 | 15000 | 1 | Scheduled |
| 9 | 400 | 500 | 500 | 10000 | 3 | Scheduled |
| 10 | 500 | 300 | 300 | 12000 | 2 | Scheduled |
| 11 | 600 | 200 | 200 | 10000 | 1 | Scheduled |
| 13 | 800 | 0 | 0 | 17000 | 2 | Scheduled |

TABLE 1I-continued

| Priority Ranking Parameter | Process ID | Internal Weighting Parameter | Assessment Parameter | Process Volume Parameter | Criticality Parameter | Process Status |
|---|---|---|---|---|---|---|
| 14 | 1000 | 0 | 0 | 12000 | 3 | Scheduled |
| X | 100 | 1000 | 1000 | 25000 | 1 | Complete |
| X | 700 | 200 | 200 | 7000 | 3 | Cancelled |

The internal weighting parameter may alternatively be determined in a different way when the ranking parameter is manually modified. One exemplary alternative is described in the following with reference to Table 1B'. For example, the user may manually set the ranking parameter for the process with Process ID=900 to a value of two, i.e. he may manually change the ranking parameter from the previous value nine to a value of two, defining this process as the second highest ranked process, as described above. Accordingly, the ranking of the processes with a previous ranking parameter between the previous ranking parameter (excluded) and the new ranking parameter (included) of the manually modified process are shifted towards the value of the previous ranking parameter of the modified process. The resulting new ranking parameters for the individual processes can be seen in Table 1B' discussed below.

Subsequently, in step ST7 the weighting parameter 102 for the modified process is adapted to the new ranking. In the present example, the weighting parameter 102 is adapted as follows: With the modified process having a new ranking parameter of N larger than one but smaller than the total number of ranked processes, the adapted weighting parameter 102 is determined based on the weighting parameter 102 of the process previously having the ranking parameter of N. Exemplarily, the adapted weighting parameter 102 of the modified process is set to the previous weighting parameter of the process previously having the ranking parameter of N. Exemplarily, the weighing parameters of each shifted process, i.e. each process for which the new ranking parameter is shifted by one towards the value of the previous ranking parameter of the modified process, is modified such that the new ranking parameter corresponds to the previous ranking parameter of the process that previously had the ranking parameter corresponding to the new ranking parameter of the shifted process. For example, the new ranking parameter for the shifted process 200 corresponds to the previous ranking parameter of process 300. Accordingly, the new internal weighting parameter of process 200 is set to the value of the previous weighting parameter of the process 300, as exemplarily shown in Table 1B'.

Figure 3:
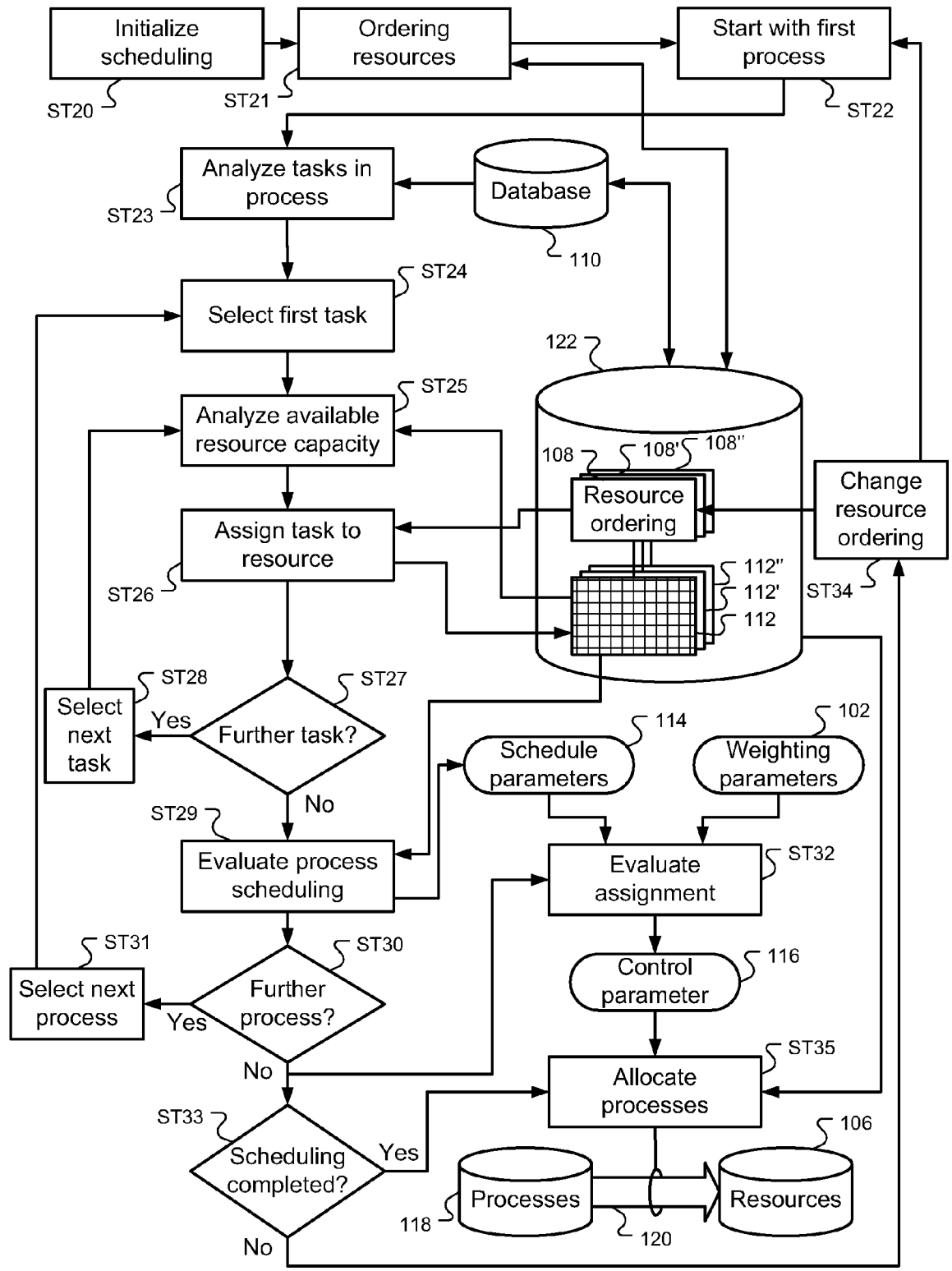
FIG. 3 is a flow diagram of a method of scheduling processes according to available resources.

An example scheduling cycle of step ST10 is described with reference to FIG. 3. Exemplarily, the scheduling cycle comprises a step ST20 of initializing the scheduling. Step ST20 may comprise a step of receiving specifications for processes together with the ranking of the processes and at least part of the parameters and statuses as exemplarily described above. In step ST20 data may be retrieved from a database, such as the database 100, and/or from the resources 106. The scheduling cycle is exemplarily at least partly performed in a central scheduling and/or control unit. Exemplarily, the scheduling and/or control unit communicates with the database 100 and/or the resources 106 via a network and may particularly receive process specifications via this network.

The example scheduling method further comprises a step ST21 of ordering at least part of the available resources 106. This ordering may occur according to arbitrary order conditions. Ordering may occur according to the capacities and/or capabilities of the individual resources with the resource having the highest capacity being positioned at the beginning of the ordering and the resource with the lowest capacity positioned at the end of the ordering, for example. In a different implementation, ordering of the resources may occur according to a resource identification number, or in alphabetic order of the resource names. Exemplarily, the established ordering of the resources serves as a well defined basis for the later cycles of assigning tasks to the resources of for analyzing the available capacities of the resources in a well defined order. The resource or during 108 may be stored in a database, such as database 110 or the database 100. In one implementation, the databases 110 and 100 may be the same database.

In slop ST22 the scheduling cycle may start with the first process. Exemplarily, the process with the highest ranking, i.e. the lowest ranking parameter, and having a process status parameter different from "In-Progress" or "Firm" is selected to start the scheduling cycle. In another implementation, as described in more detail later, the processes having a process status parameter of "In-Progress" or "Firm" are selected first.

The selected process is analyzed in step ST23. Step ST23 of analyzing the process, exemplarily, comprises analyzing the composition of the process from the tasks belonging to the process. Necessary data are exemplarily retrieved from the

TABLE 1B'

| Priority Ranking Parameter | Process ID | Internal Weighting Parameter | Assessment Parameter | Process Volume Parameter | Criticality Parameter | Process Status |
|---|---|---|---|---|---|---|
| 1 | 100 | 1000 | 1000 | 25000 | 1 | Unscheduled |
| 2 | 900 | 800 | 0 | 12000 | 1 | Unscheduled |
| 3 | 200 | 500 | 800 | 20000 | 2 | Unscheduled |
| 4 | 300 | 500 | 500 | 15000 | 1 | Unscheduled |
| 5 | 400 | 300 | 500 | 10000 | 3 | Unscheduled |
| 6 | 500 | 200 | 300 | 12000 | 2 | Unscheduled |
| 7 | 600 | 200 | 200 | 10000 | 1 | Unscheduled |
| 8 | 700 | 0 | 200 | 7000 | 3 | Unscheduled |
| 9 | 800 | 0 | 0 | 17000 | 2 | Unscheduled |
| 10 | 1000 | 0 | 0 | 12000 | 3 | Unscheduled | database 110 and/or the database 100, for example. Exemplarily, at least part of the process specification as described above is analyzed in step ST23. Additional or alternative method step that may be comprised in step ST23 are described in more detail in connection with FIGS. 4A and 4B as well as Tables 2A to 2C, below. In step ST24 the first task of the process is selected for the further scheduling. This selection is exemplarily made at least partly based on the time dependencies of the tasks defined in the process specification.

The selected task belongs to a task category which is exemplarily considered as a basis for the step ST25 of analyzing available resource capacities for carrying out the selected task. Exemplarily, in step ST25 resources having a capability of performing tasks within the task category of the selected task is searched in an order according to the resource ordering 108 and their available resource capacity is analyzed. The available resource capacity for a resource is determined, for example, based on the total resource capacity and an already scheduled capacity of that resource. As described above, the total resource capacity may result from standard used time and a non-scheduled time reserve parameter. If an available resource capacity corresponding to the capacity required by the selected task is found, the task may be assigned to the respective resource in step ST26. This assignment of the selected task to a resource is added to a resource-task assignment set 112 (112', 112", ...), such as a first resource-task assignment set 112. The resource-task assignment set 112 defines resource capacities that have already been scheduled by assigning tasks to the resources. The resource-task assignment set may also define both the assignment of tasks to the resources, i.e. the linking between tasks and resources, and a scheduling for carrying out the tasks by the resources, i.e. timing parameters. The timing parameters may be based on the processing times and the time frame parameters of the tasks as described above.

Next, in step ST27 it is determined whether the presently analyzed process comprises a further task that has not yet been assigned to a resource. In the affirmative, the next task within the process is selected in step ST28 and the method proceeds to step ST25, where an available resource capacity for performing the newly selected task is analyzed, as described above. In case all tasks within the process have been assigned to resources, no further task is determined in step ST27 and the method exemplarily proceeds to step ST29, where the scheduling on the process is evaluated based on the scheduling of the individual tasks within the process. According to this evaluated scheduling a schedule parameter 114 is created for the process and stored in a database, such as database 110 and/or database 100, for example. The schedule parameter may define a period of time until the last task within the process is completed according to the scheduling of the tasks defined in the resource-task assignment set 112. Alternatively, the schedule parameter 114 may define the period of time between the starting and the completion of the process, i.e. the duration for performing the process according to the scheduling defined in the resource-task assignment set 112. In one example, the schedule parameter defines the duration from the current time until the scheduled end time of the process or a reciprocal of this duration.

In step ST30 it is determined whether a further process exists that has not yet been scheduled and that should be scheduled. In the affirmative, in step ST31 this process is selected and the method proceeds with step ST24 as described above. In case the tasks for all processes to be scheduled have been assigned to resources, no further process is determined to be scheduled in step ST30. The assignment of all tasks to resources, therefore, has been completed and may be stored, for example, in a database such as the database 100 and/or database 110. The method further comprises a step ST32 of evaluating this resource-task assignment set. In step ST32 a control parameter 116 is created for this completed resource-task assignment set based on the schedule parameters 114 and the weighting parameters 102. Exemplarily, the control parameter 116 is evaluated based on the pairs of the schedule parameter 140 and weighting parameter 102 defined for each of the processes. In particular, in one example for each of the processes the schedule parameter 114 and the weighting parameter 102 are multiplied and the sum of all this products for all processes with a resource-task assignment set is defined as the control parameter which is assigned to the respective resource-task assignment set and stored, for example, together with this resource-task assignment set in a database, such as database 110, for example.

Further, in step ST33 it is determined whether the scheduling should be completed. In this example implementation, at least when performing step ST32 for the first time the scheduling is regarded as not being completed and the method proceeds with step ST32 of changing the resource ordering 108 and/or establishing a second resource ordering 108' different from the first resource ordering 108. Then the method further proceeds to step ST22 and starts the cycling again with the first process. Changing the resource ordering and/or establishing a second resource ordering in step ST34 ensures that the at least one further resource-task assignment set 112', 112" established in the following scheduling cycle, i.e. a second resource-task assignment set 112' and/or a third resource-task assignment set 112", is different from the first resource-task assignment set 112 established in the first scheduling cycle described above, since at least step ST26 of assigning tasks to resources (and also step ST25 of analyzing the resource capacities) is at least partly based on the resource ordering 108, 108', 108". The complete scheduling cycle may then be repeated for a plurality of different resource orderings 108, 108', 108" resulting in a plurality of different resource-task assignment sets 112, 112', 112" each having an individual control parameter 116 assigned thereto. The collection of the plurality of resource-task assignment sets 112, 112', 112" may define and/or are comprised in a solution set 122.

In case the scheduling is regarded as being completed in step ST33 the method proceeds to step ST35 of selecting one of the established resource-task assignment sets according to a selection condition for the control parameter and allocating processes 118 to resources 106 according to the selected resource-task assignment set. Accordingly in step ST35 an allocation 120 is created that defines a precise scheduling of the processes 118 and their allocation to the resources 106.

An exemplary implementation of a method for allocating processes to a plurality of resources is described in the following. In the exemplary implementation various parameters, particularly various time parameters and/or scheduling parameters, are defined and/or set as follows. The steps involved with defining and/or setting these parameters may be carried out as part of a parameter initializing step.

Exemplarily, a requested starting time parameter for a process (Process_RequestedStart) is set to the earliest available time within the time frame period (or time slot) of the requested starting time, which may be defined in a process specification. Depending on the definition or scaling of the time frame parameters, this may be the first minute within a requested hour, or the first hour within a requested day, or the first working day (e.g. Monday) within the week of the requested start. This parameter, for example, indicates the earliest time that the process can commence. If the process can be started immediately, this parameter may be set to a time as soon as possible and/or to a value representing "ASAP" (as soon as possible).

Exemplarily, a requested ending time parameter for a process (Process_RequestedEnd) is set to the latest time within the time frame period (or time slot) of the requested ending time for the process. Analogous to the starting time, the requested ending time may be set to the last minute within a requested hour, or to the last hour within a requested day, or the last working day (e.g. Friday) with the week of the requested ending time. This parameter, exemplarily, indicates the latest time that a process must be completed. Where no ending time is assigned to the process, this parameter may be set to a value representing "ASAP" and/or "Not Available" and/or "Schedule End Time Parameter".

Exemplarily, a process restart time parameter (Process_Restart) is set to the earliest available time within the time frame period (or time slot) of the requested restarting time, similar to the requested starting time parameter. This parameter, for example, indicates the earliest time that a process can be restarted once it has been placed on hold. Where the process has been placed on hold in order to free up resource capacity, this parameter may be set to a value representing "ASAP". In one example implementation, if a process that has been put on-hold can be resumed, the process restart time parameter will be set to a value representing "ASAP". In case delay has occurred and restart time is not known, this term may be set to a value representing "indefinite", for example.

Exemplarily, if a task in "On-Hold," a task restart time parameter (Task_Restart) is set to the earliest available time within the time frame period (or time slot) of the requested restarting time of a task, similar to the process restart time parameter. This parameter, for example, indicates the earliest time that a task can be restarted once it has been placed on hold. Exemplarily, all proceeding tasks dependent on the task placed on hold will be rescheduled based on the earliest restart time assigned to the delayed task. Where the process comprising the task is placed on hold to free op resource capacity, this parameter may be set to a value representing "ASAP", for example. Where delay has occurred and the restart time is not known, this parameter may be set to a value representing "indefinite", for example.

Exemplarily, an estimated point in time to complete a task (Task_EDC) is set to the latest available point in time within the time frame period (or time slot) in which the task is estimated to be complete. This parameter, for example, indicates the estimated point in time until which a task will be completed. In an example, this parameter is entered by a user and represents the estimate point in time to complete a task evaluated at a point in time when the user enters actual data and/or when a resource operates on performing the task.

Exemplarily, an estimated period of time to complete a task (Task_ETC) is entered by a user and represents the estimated period of time needed for completing a task evaluated at a point in time when the user enters actual data and/or when a resource operates on performing the task.

Exemplarily, a scheduled task start parameter (Task_ScheduledStart) is set to the earliest available time within the time frame period (or time slot) scheduled for the starting of the task, exemplarily analogous to the requested starting time parameter for a process. This parameter, for example, indicates the time which a task is scheduled to start. In one example, this parameter may be evaluated as part of a scheduling within the selected resource-task assignment set.

Exemplarily, a scheduled task end parameter (Task_ScheduledEnd) is set to the latest time within the time frame period (or time slot) of the scheduled ending time for the task, analogous to the requested ending time parameter for a process. This parameter, for example, indicates the time which a task is scheduled to start. In one example, this parameter may be evaluated or processed as part of a scheduling within the selected resource-task assignment set.

Exemplarily, a task actual start parameter (Task_ActualStart) is set to the earliest available time within the time frame period (or time slot) in which the task has actually been started to be carried out. Exemplarily, a task actual end parameter (Task_ActualEnd) is set to the latest available time within the time frame period (or time slot) in which the task is actually completed by the resource.

A Schedule Start Time Parameter defines the point in time starting from which the tasks will be assigned to the resources. A Schedule End Time Parameter defines the point in time which defines the last point in time that a task can be assigned to a resource. This can be a day, a month, a year, or any other period of time later than the schedule start.

In one example implementation, if a task cannot be assigned to a resource, the task will be marked as "Unscheduled". The reason for this could be either there being no capable resource available that can perform the task; and/or the capable resource cannot start and finish the task between Schedule Start Time Parameter and Schedule End Time Parameter; and/or the possible assignments to all capable resources fail to comply the requirements specified in the task/process definitions, for example location constraints, bundle constraints, etc.

Additionally, if a task is scheduled within the firm period, the task status will be "In-Progress", if the task commenced (a resource had already started performing the task). Else, if the previous task status is not In-Progress, then the task status will be set to "Firm".

If the task is outside the firm period, and a resource started performing the task a current status reporting period, or if the task status was "Early-Start" in the previous scheduling period, then the status will be set to "Early-Start." Else, if the task was already set to "In-Progress" previously, the status will remain as "In-Progress"; else if performance of task has not commenced, the status will be "Scheduled."

In another example implementation, for each process the process status parameter is updated based on task status parameters (Task_Status) of the tasks comprised in the process. For example, if any task in the process has "On-Hold" status, the process will receive "On-Hold" status.

Else if any task in the process has "Unscheduled" status, the process will receive "Unscheduled" status. It is preferred to highlight the process as "Unscheduled" to illustrate that there is a problem with either in the process specification or in resource capacities.

Else if any task in the process has "In-Progress" status or if any task in the process has "Completed" status and there is at least another task within the process that has "Firm" or "Scheduled" status, then the process will receive "In-Progress" status.

Else if any task in the process has "Firm" status, the process will receive "Firm" status.

Else if any task in the process has "Early-Start" status, the process will receive "Early-Start" status.

Else if all tasks in the process have "Scheduled" status, the process will receive "Scheduled" status.

Else if all tasks in the process have "Completed" status, the status of the process will be "Completed".

In another example implementation, the update procedure may be implemented as follows:

```
IF Task_Status = 'Onhold' and Task_Restart = 'Unknown' for ANY
TASK in Process THEN
      Process_Status = 'Onhold'
      Process_Restart = 'Unknown'
      Task_Status = 'Onhold' for all Task_Status <> 'Complete'; or
'Cancelled' in entire process
ELSE IF Task_Status = 'Onhold' for all process tasks THEN
      Process_Status = 'Onhold'
ELSE IF Task_Status = 'In-Progress' for ANY TASK in process THEN
      Process_Status = 'In-Progress'
ELSE IF Task_Status = 'Complete' for ALL TASKS (excluding those
marked as 'Cancelled') in process THEN
      Process_Status = 'Complete'
ELSE IF Task_Status = 'Cancelled' for ALL TASKS in process THEN
      Process_Status = 'Cancelled'
```

In this exemplary implementation the task comprised in a process are analyzed. It is determined whether any task in the process has status information (a process status parameter) set to a value representing "Onhold" and a restart information set to a value representing "Unknown". In case such a task is found within the process, the process status parameter is set to a value representing "Onhold", the process restart value is set to a value representing "Unknown", and the status for all tasks that do not have a value representing "Complete" or "Cancelled" within the process is set to a value representing "Onhold". Accordingly, if a restart time for a task has not been entered then all tasks that are not already completed or cancelled, and the entire process may be defined to have a status representing "Onhold".

In case no task is found in the process that has a task status parameter representing "Onhold" and a restart value representing "Unknown", it is, for example, determined whether all tasks within the process have a status representing "Onhold". In the affirmative the status of the process may be set to a value representing "Onhold", for example. Further, in case none of the aforementioned conditions is fulfilled, it is determined, for example, whether any task in the process has a status representing a value "In-Progress". If such a task is found within the process, then the process status parameter may be set to a value representing "In-Progress", for example.

Even further, if none of the previous conditions is met, it is determined whether all of the tasks within the process have a status value representing "Complete". In this case the status of the process is set to a value representing "Complete". Accordingly, in case all tasks are completed, the status of the whole process may be set to a value indicating that the process is completed, for example. Exemplarily, the status of the process is also set to a value representing "Complete", if the process comprises at least one task having a status representing "Complete" and additionally if all tasks not having a status representing "Complete" within the process instead have a status representing "Cancelled". Accordingly, the status of the whole process, i.e. the process status parameter, may be set to a value indicating that the process is completed, for example, if at least one task has been completed and if no uncompleted task remains uncancelled within the process.

Finally, if none of the aforementioned conditions is fulfilled, if is determined whether all tasks within the process have a status representing the value "Cancelled". In this case the status of the process is set to a value representing "Cancelled". Accordingly, in case all tasks within a process are cancelled, then the process itself is marked as being cancelled.

If any task in a process has "Firm" status, but other tasks do not have "On-Hold", "Unscheduled", or "In-Progress" status, the status of the process may be set to "Firm". In one example the status of the process is set to a value representing "Firm", if the process is already scheduled to be started with a given period of time (firm period), given in minutes, hours, days, or weeks, for example. This aspect may be implemented as shown in the following example:

```
IF  Process_ScheduledStart  <>  NULL  AND  Process_Status  <>
'Onhold'; 'Complete'; 'Cancelled' THEN
      IF   Process_ScheduledStart   <=   (CURRENT_TIME   +
FIRM_PERIOD) THEN
             Process_Status = 'Firm'
             Task_Status = 'Firm' for all tasks associated with the
process
      ELSE
             Process_Status = 'Scheduled'
             Task_Status = 'Scheduled' for all tasks associated with
the process
      END
END
```

Alternatively, this aspect may be implemented as show above, while using the Scheduling Start Time Parameter instead of the CURRENT_TIME.

Accordingly, it is exemplarily determined whether a scheduled starting time is assigned to the process that is different from "NULL" and whether the process status parameter has a value other than "Onhold", "Complete", or "Cancelled". In case both conditions are fulfilled, if is further determined whether the starting time of the process is scheduled to a time not later than the current time plus the given firm period. In this case the status of the process is set to a value representing "Firm". By way of a further example, the statuses for all of the tasks comprised in the process are set to a value representing "Firm". In case the latter condition is not fulfilled, i.e. in case the process is scheduled to start after the expiry of the firm period, the status of the process as well as the statuses of all tasks within the process are set to a value representing "Scheduled".

In the following an exemplary implementation of scheduling tasks to resources is described. This section updates the schedule based on task actuals, and schedules task based on priority, i.e. ranking parameter, and/or location and/or available resources.

In a first step scheduling is adjusted based on process actuals for processes with entered actual data, i.e. processes which have already been worked on wherein data corresponding thereto are stored in a corresponding database. Exemplarily, the operation commences with processes with highest process priority, i.e. lowest ranking parameter, and having entered actual values for all tasks not complete or cancelled. The task's remaining and/or total processing time is updated based on the estimated time to complete the task for tasks that have been started, and based on standard values, such as the standard processing time, for tasks not yet started. The Task_ScheduledEnd parameter is updated based on the estimated time to complete the task for tasks that have started, and the total elapsed time for a task to be completed, exemplarily expressed in terms of time slots, is updated based on standard values, such as the standard processing time, for tasks not started. The minimum and maximum processing time per time frame period (time slot) is determined that can be assigned to a resource based on the remaining and/or the total processing time and the Task_ScheduledEnd parameter.

Exemplarily, if the actual number of time slots that a task is scheduled is larger than the minimum elapsed time then the minimum limit for processing time per time slot in the last time slot does not apply. Available capacity of resource is determined based on (standard use time×non-scheduled time reserve parameter)−(processing time already allocated for updated actuals). Task processing time (Task_Processing) per time slot is allocated to the resource between the minimum and maximum limits into buckets of time slots until all processing time is allocated. Further, it is checked that the task will finish in the time slot of Task_ScheduledEnd based on allocations of the processing time into buckets of time slots for tasks that have already started to be processed. Even further, it is, exemplarily, checked that the minimum elapsed time is satisfied based on allocations of the processing time into buckets of time slots for tasks that have not already started to be processed. The Task_ScheduledStart and Task_ScheduledEnd parameters are assigned based on the time slots that the allocated processing time is scheduled to start and end, respectively. Exemplarily, the above operations are repeated for all tasks in a process based on task dependency until all tasks are updated. Once all tasks are scheduled the Process_ScheduledEnd parameter is set to the maximum Task_ScheduleEnd parameter for all tasks scheduled in that process. Exemplarily, ail operations in this first step are repeated for all processes with entered actual values, i.e. processes that have already been started to be carried out by at least one resource.

In a second step, exemplarily, analogous operations are performed for processes having the status "Firm".

In a third step, exemplarily, a master resource schedule is generated. First, all tasks with a task status parameter having a value "Unscheduled" or "Scheduled" or a status corresponding to these values and with the process having a weighting parameter larger than zero, are scheduled based on the process priority, i.e. the ranking parameter and the task dependency parameters. All tasks associated with processes having a process status parameter of "In-Progress" or "Firm" will remain locked in the schedule. All tasks associated with processes having a process status parameter of "Cancelled" or "Complete" will not be considered for scheduling. Tasks are selected based on the ranking parameter of the process and based on the task dependency parameters. A set of suitable resources to complete a task is searched or retrieved based on the task identification and/or the task location and/or the task category. Tasks within a process are determined that must be bundled to a single resource. The remaining and/or the total processing time is updated based on the estimated time to complete the task for tasks that have been started, and based on standard values, such as the standard processing time, for tasks not yet started. The Task_ScheduledEnd parameter is updated based on the estimated time to complete the task for tasks that have been started, and the total elapsed time for a task to be completed, exemplarily expressed in terms of time slots, is updated based on standard values, such as standard processing time, for tasks not started. The minimum and maximum processing time per time slot is determined that can be assigned to a resource based on the remaining and/or the total processing time and the Task_ScheduledEnd parameter. Exemplarily, if the actual number of time slots that a task is scheduled is larger than the minimum elapsed time, then no minimum limit for the processing time per time slot in the final time slot does apply.

Exemplarily, the following operations are repeated for all possible combinations of resources in an identified set of suitable resources. The available capacity of resources is determined based on (standard use time×non-scheduled time reserve parameter)−(processing time already allocated for other scheduled tasks). "Actuals" may define activities and/or operations performed on the tasks and/or processes, particularly in connection with carrying out at least part of the tasks and/or processes at a resource. The task processing time per time slot is allocated to the resources between the minimum and maximum limits into buckets of time slots until all processing time is allocated. Further, it may be checked that the task will finish in the time slot defined by the Task_ScheduledEnd parameter based on allocations of the processing time into buckets of time slots for tasks that have already started. Even further, it is checked that the minimum elapsed time is satisfied based on allocations of the processing time into buckets of time slots for tasks that have not already been started. The Task_ScheduledStart and Task_ScheduledEnd parameters are assigned based on the time slots that the allocated processing time is scheduled to start and end. Exemplarily, the above operations are repeated for all tasks in a process based on the task dependency parameters until all tasks are updated.

Once all tasks are scheduled, the Process_ScheduledEnd parameter is set to the maximum of the Task_ScheduleEnd parameters for all tasks scheduled in a process. The Process_ScheduledStart parameter is set to the minimum of the Task_ScheduledStart parameters for all tasks scheduled in a process. The duration between the current time and the Process_ScheduledEnd parameter (i.e. Process_ScheduledEnd−CURRENT DATE) or between the Schedule Start Time Parameter and the Process_ScheduledEnd parameter (i.e. Process_ScheduledEnd−Schedule Start Time Parameter) is calculated. The result thereof, exemplarily, represents the schedule parameter for the respective process. Further, the ratio between the (internal) weighting parameter and the schedule parameter is calculated. Depending on the process group, the internal weighting parameter or the (internal) volume parameter and the schedule parameter may be calculated to give the score parameter for the process that has just been scheduled as a part of the current resource-task assignment set.

Exemplarily, the above operations are repeated for all processes with a weighting factor larger than zero and the ratio between the respective weighting parameters and the schedule parameters is calculated. Exemplarily, all these ratios are summed and the sum is identified as the control parameter for the scheduling.

These operations may be applied for a plurality of different resource-task assignment sets and the resulting control parameters may be compared. Exemplarily, the operations are repeated until a maximum of the control parameter is achieved. The corresponding resource-task assignment sets may be selected as a basis for allocating the processes to the resources, and in particular for controlling the resources according to the established scheduling, and finally for all other processes that have a volume parameter equal to zero.

Exemplarily, analogous operations are performed for all tasks with task status parameter "Unscheduled" or "Scheduled" and a weighing parameter being 0, where in the steps of evaluating a control parameter the process volume parameter may be used instead of the weighting parameter, for example.

The work allocation system may initially schedule the processes according to standard values for each task, such as a standard processing time for the capacity requirement parameter of a task. The processes, however, can vary in complexity and duration. In some cases, the standard estimates are not 100% accurate to initially guess the total effort and duration required for completing a task. Once the process is started, the time spent on each task might be different from the estimates, the initial standard values. Accordingly, the system exemplarily includes a status tracking module that receives from at least one resource, in another example from a plurality of resources, task report data indicating the actual state for at least one task. The task report data may comprise the estimated point in time to complete the task (Task_EDC) and/or the estimated period of time to complete the task (Task_ETC). Alternatively or additionally the task report data may comprise an actual time spent on performing the task within a certain time frame period (time slot) and/or a mean value of the actual time per time frame period (time slot) spent on performing the task. Exemplarily, the task report data comprise the task status parameter. At least part of the task report data may be automatically retrieved from resource log data, for example. At least part of the task report data may be manually entered by a user. In one example implementation, these aspects may be implemented in a step ST3000 described in connection with FIG. 5, below.

Exemplarily, based on the received task report data the system may update a planned time and/or a planned duration value of each task. Exemplarily, the capacity requirement parameter and/or the time frame parameter for one or more tasks may be replaced and/or updated based on the received task report data.

In one example, all possible resource-task assignment sets defining all possible assignments of the plurality of tasks to the plurality of resources are computed and the corresponding control parameter for each of the established resource-task assignment sets is evaluated. Depending on the selection criterion for the control parameter one of the established resource-task assignment sets is selected. Exemplarily, the control parameter is represented by a numeral value and the selection criterion prescribes to select the resource-task assignment set having the highest or the lowest control parameter.

The process of optimizing a schedule may comprise one or more of the following scheduling steps: A first scheduling step, exemplarily, comprises a step of setting up and/or retrieving priority lists for processes and tasks. The lists may correspond to processes and tasks that are going to be processed as part of a current scheduling phase. A second scheduling step may comprise a step of identifying a resource suitability set. A third scheduling step, exemplarily, comprises a step of scheduling tasks to available resource capacities. Further, a fourth scheduling step may comprise a step of optimizing the schedule. Finally, a fifth scheduling step, exemplarily, comprise a step of updating the process status parameter and/or the task status parameter. One or more of these steps may be at least partly implemented or comprised in a step ST5000 and/or a step ST6000 and/or a step ST7000 described in more detail in connection with FIGS. 5 to 7, below. Exemplarily, each of these five steps is repeated in a prioritized order for all processes depending on the current process status parameter, the weighting parameter and/or the process volume parameter. It should be noted in this connection, however, that the above enumeration of the scheduling steps is not necessarily identical to the chronological order of these scheduling steps, though in one example the steps may be carried out in the listed order.

In the step of setting up and/or retrieving priority lists for the processes and tasks, the following two aspects may be considered. Firstly, a process priority list may be set up by sorting the processes depending on the (internal) weighting parameter, the process volume parameter and the process criticality parameter in subsequent ordering steps as described above. The resulting process priority list may define a scheduling priority of the processes which is used for subsequent scheduling steps.

Secondly, a task priority list for at least some tasks within a process, in another example for all tasks within a process, may be set up based on the dependency parameters assigned to the tasks. Exemplarily, for each process a task priority list is established defining a priority ranking of at least some of the tasks, in another example all tasks comprised in the respective process. These resulting task priority lists may define a scheduling priority of the tasks that is used for the subsequent scheduling steps. In one example the task priority list for a process is established based on the dependency parameters only.

One or more of these aspects and/or further details of the step of setting up and/or retrieving priority lists for the processes and tasks may be at least partly implemented or comprised in a step ST2000 described in more detail in connection with FIG. 5, below.

A dependency of a task on one or more other tasks is exemplarily defined in the dependency parameters assigned to the task. This dependency, exemplarily, defines that a task cannot be performed before all of its predecessors identified in the dependency parameter of this task are started and/or finished. Therefore, the provision of a task priority list may ensure that for each task in a process all other tasks on which the one task depends can be scheduled to be performed before the one task.

Figure 4A:
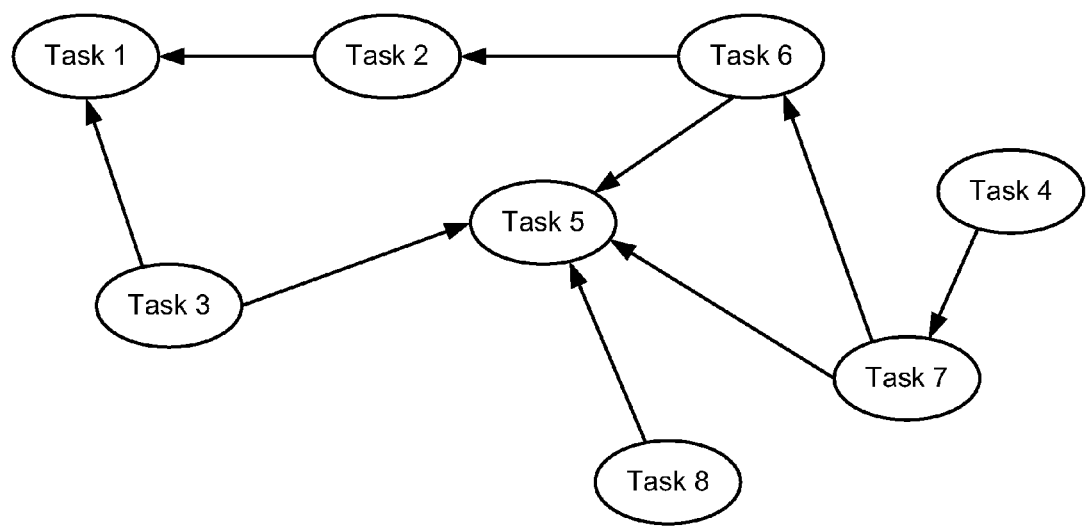
FIGS. 4A and 4B are diagrams of task dependencies and task level assignments.
Figure 4B:
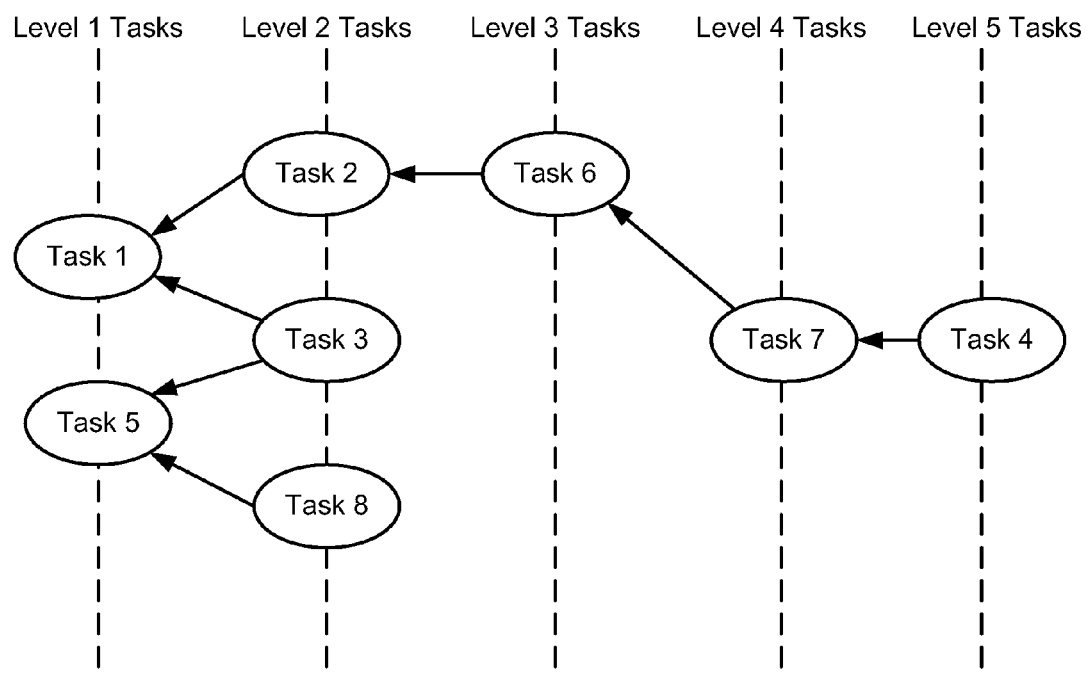

FIGS. 4A and 4B are diagrams of task dependencies and task level assignments FIG. 4A shows a plurality of tasks 1-8 and their dependencies, where all tasks are exemplarily comprised in the same process. Each arrow between two tasks represents a dependency between these two tasks, where the arrow starts at the task which depends on the task to which the arrow points. Task 6, for example, depends both on Task 2 and Task 5.

In one example the step of setting up a task priority list comprises one or more of the steps:

1) Retrieving for each task in a process the dependency parameter assigned to the task.

2) Determining all tasks that do not depend on any other task in the process and assigning to the determined tasks a task level parameter representing the value "level-1 task" or "1" or a status corresponding to this value.

3) Setting an earliest task starting time for the tasks with a task level parameter having the value "level-1 task" or "1" (or a corresponding value) to the value of the requested starting time parameter of the process.

4) Establishing task levels for all tasks by determining for each task the maximum task level of its predecessors (maximum predecessor level) and assigning the task level parameter representing the value (maximum predecessor level +1) to that task. Exemplarily, this step is repeated until all task levels are determined. For example, if it is determined for a task that its predecessor having the highest task lever parameter belongs to a task level represented by the value "level-2 task" or "2" or a corresponding value, then task level parameter for tills task is set to a value representing "level-3 task" or "3" or a corresponding value. In one example the task level parameter for all tasks is initially set to a value representing "level-1 task" or "1" or a corresponding value.

5) Constructing the ordered task list within the process by starting with the level-1 tasks and adding tasks to the ordered task list level by level.

In this example, all tasks associated with the process are determined that do not depend on any other task, i.e. that do have any predecessor, e.g., "Task 1" and "Task 5". Exemplarily, the earliest task starting time for these tasks is set to the requested starting time parameter of the process which these tasks belong to. The task level parameter of these tasks is set to a value representing "level-1 task" or "1" or a corresponding value. In one example this lowest task level parameter is initially assigned to all tasks within the process. In a further step, for all tasks the predecessor are determined which are exemplarily defined in the respective task dependency parameter for each task. For each task the maximum of the predecessor levels, i.e. the task levels of the predecessors, is determined and the task level of said task is set to a value with the next rank which is exemplarily by "1" higher than the determined maximum predecessor level.

Table 2A shows the resulting values. Task 3, for example, depends on Task 1 and Task 5 which, therefore, are the predecessors of Task 3, while Task 1 and Task 5 do not depend on any other task. Accordingly, the maximum predecessor level of Task 3 is determined to be "1" and the task level parameter of Task 3 is set to the value "2".

TABLE 2A

| Task | Predecessors | Max Predecessor Level | Task Level |
|---|---|---|---|
| 1 | None | None | 1 |
| 2 | 1 | 1 | 2 |
| 3 | 1, 5 | 1 | 2 |
| 4 | 7 | 1 | 2 |
| 5 | None | None | 1 |
| 6 | 2, 5 | 1 | 2 |
| 7 | 5, 6 | 1 | 2 |
| 8 | 5 | 1 | 2 |

The set of determining for each task the maximum task level of its predecessors is repeated such that the final task levels are successively established. Table 2B and Table 2C exemplarily represent the situations after said determining step has been performed for the third and the fourth time, respectively.

TABLE 2B

| Task | Predecessors | Max Predecessor Level | Task Level |
|---|---|---|---|
| 1 | None | None | 1 |
| 2 | 1 | 1 | 2 |
| 3 | 1, 5 | 1 | 2 |
| 4 | 7 | 2 | 3 |
| 5 | None | None | 1 |
| 6 | 2, 5 | 2 | 3 |
| 7 | 5, 6 | 3 | 4 |
| 8 | 5 | 1 | 2 |

TABLE 2C

| Task | Predecessors | Max Predecessor Level | Task Level |
|---|---|---|---|
| 1 | None | None | 1 |
| 2 | 1 | 1 | 2 |
| 3 | 1, 5 | 1 | 2 |
| 4 | 7 | 4 | 5 |
| 5 | None | None | 1 |
| 6 | 2, 5 | 2 | 3 |
| 7 | 5, 6 | 3 | 4 |
| 8 | 5 | 1 | 2 |

FIG. 4B demonstrates the assignment of the tasks of FIG. 4A to different task levels in accordance with the result shown in Table 2C.

Based on the result as shown in Table 2C, for example, the task priority list may be set up in accordance with the established task levels. This resulting task priority list may be as follows: Task 1, Task 5, Task 2, Task 3, Task 8, Task 6, Task 7, and Task 4.

In this task priority list the tasks are exemplarily initially sorted by their task level, then in a subsidiary way by the task ID in numerically and/or alphabetically ascending order, for example. For tasks having the same task level, however, their relative ordering with respect to each other is uncritical and may be arbitrarily. Once the process priority list and the task priority list(s) are established, a complete ordered list of all tasks for all processes may be established. Exemplarily, this complete ordered list of tasks is used for subsequent step of scheduling.

The identification of a resource suitability set is described in more detail. This step or at least some of its aspects may be at least partly implemented in a step ST5220 described in more detail in connection with FIG. 7, below. Once the process priority list and the task priority list(s) have been established, the complete set of resources capable of performing the tasks may be identified. Identifying possible resources of performing a task is exemplarily achieved by matching the preferred task location and task category of this task with the resource capabilities and locations. Rules relating to geography and task bundling, for example, may be considered when matching the task properties with the respective resource properties. For example, if a preferred task location is set to a status representing "Any Onshore", "Any Offshore", or "Any Location", or to a value representing such status, then resources from all onshore locations, all offshore locations or all locations, respectively, are considered for resources corresponding to the required task category. Also, all tasks having the same bundle parameter within the same process are, for example, performed by the same resource. This means that in order for a resource to be considered to complete all tasks in the bundle this resource must have a capability of performing tasks with task categories of all of the tasks in the bundle.

In summary the resource suitability set represents for each task the complete list of all resources capable of performing the task based on the task category and/or the task location. A solution set 122 then provides the total number of combinations that will be tested when trying to identify the optimum assignment of the plurality of tasks to the plurality of resources. Table 3 shows an example of a resource suitability set for four processes having the process ID 0100, 1200, 1400 and 1500, respectively and each process comprising a plurality of tasks. The column "Resource" indicates for each task all resources that are capable of performing the task when considering the task category ("Category") and the preferred task location ("Location"). The total number of possible combinations of assigning the tasks to the resources is given by: $2\times 1\times 1\times 1\times 3\times 1\times 2\times 1=12$, where it is considered that tasks having the same bundle parameter ("Bundle ID") within the same process are assigned to the same resource, and as shown in Table 6 below.

TABLE 3

| Process ID | Task ID | Bundle ID | Location | Category | Resource Suitability Set |
|---|---|---|---|---|---|
| 0100 | 0103 | 1 | Site 2 | Category 03 | R1, R2 |
| 0100 | 0111 | 2 | Site 1 | Category 09 | R3 |
| 0100 | 0109 | 2 | Site 1 | Category 09 | R3 |
| 0100 | 0110 | 2 | Site 1 | Category 09 | R3 |
| 1200 | 1201 | 1 | Undifined | Category 09 | R3 R8, R9 |
| 1200 | 1211 | 1 | Undefined | Category 09 | R3, R8, R9 |

TABLE 3-continued

| Process ID | Task ID | Bundle ID | Location | Category | Resource Suitability Set |
|---|---|---|---|---|---|
| 1200 | 1222 | 1 | Undefined | Category 09 | R3, R8, R9 |
| 1400 | 1404 | 1 | Site 1 | Category 09 | R3 |
| 1400 | 1413 | 1 | Site 1 | Category 09 | R3 |
| 1500 | 1502 | 1 | Site 1 | Catogory 02 | R3, R4 |
| 1500 | 1505 | 1 | Site 1 | Category 02 | R3, R4 |

Exemplarily, for each task a list of resources is determined that can perform the task based on the task category and/or the preferred location, for example. If there are a number of m tasks (task 1 to task m) and each task can be assigned to a number of $n_i$ resources, the total number of combinations exemplarily becomes:

$$\prod_{i=0}^{m} n_i,$$

This formula may be applicable if no bundle constraints exist. In the example, however, the bundle constraint has already been considered in order to reach the result of 12, since the tasks of the process 1200 and 1500 can only be scheduled to the same resource, since they are part of the same bundle, respectively. For example, the total number of combinations for the given example is indeed 2×1×1×1×3×3×3× 1×1×2×2=216. However, the system may check for invalid combinations in ST5240 and only considers the valid alternatives for scheduling.

During the scheduling tasks to available resource capacities, at least two time parameters may be considered during the scheduling: 1) the capacity requirement parameter which exemplarily represents a required processing time for a particular task to be performed by a resource, and 2) the time frame parameter that defines, for example, a period of minimum time required for carrying out the task. The time frame parameter may define a number of time frame periods or time slots. This process may be at least partly implemented in a step ST5260 described in more detail in connection with FIG. 7, below.

A third time parameter may also be considered for scheduling. A scheduling period parameter may define for each task a minimum number of scheduling time blocks required for performing the tasks. Exemplarily, the scheduling period parameter for a task is determined based on the time frame parameter assigned to the task. Exemplarily the scheduling time blocks represent time period units larger than the time frame periods (time slots). For example, the time frame parameter for a complex painting task may define a minimum number of 10 time slots, where each time slot represents one hour. A scheduling time block may be defined as a work shift (e.g. spanning eight hours). Accordingly, the scheduling period parameter may be set to a value of "two shifts" or "2" or a status corresponding to this value, since it is exemplarily determined from the time frame parameter and the scheduling time block definition that said complex painting task at least partly extends to two work shifts. The capacity requirement parameter for this complex painting task may represent a required processing time of 50 minutes, for example. Accordingly the 50 minutes processing time may be distributed over the 10 hours with a mean time of five minutes processing time within each hour for example.

Generally, the scheduling period parameter is exemplarily determined from the time frame parameter as follows: The number of time frame periods defined in the time frame parameter (e.g. 10 hours) is divided by the number of time frame periods per scheduling time block (e.g. eight hours per shift, 24 hours per day, 60 minutes per hour, five workday per week, etc.) and the result (1.25 in the shown example) is round up to a full integer number (2 in the shown example).

Further, in one example an average processing time per scheduling time block is determined by dividing the total processing time, as exemplarily defined in the capacity requirement parameter, by the minimum number of required scheduling time blocks, as defined in the scheduling period parameter, for example. In the shown example this results in 25 minutes per shift. This value may be assigned to and/or processed as a mean time bucket parameter. In a further example, a time bucket variation parameter may be defined that represents, for example, a relative deviation of the actual processing time within each scheduling time block from the mean time bucket parameter when scheduling the tasks. The bucket variation parameter may be set to 50%, for example, indicating that the actually scheduled processing time per week should be at least 50% and at most 150% of the value defined by the mean time bucket parameter. These values define a minimum bucket processing time and a maximum bucket processing time. Alternatively, any other value may be used for the bucket variation parameter depending on the particular requirements.

In order for a resource to finish a complex painting task according to a further example, the resource may need to paint the same area with different materials however in order to start painting the second layer the resource may have to wait one day for the paint to dry out. The painting task could take net four hours with two two-hours blocks spread to two working shifts. Therefore, different task categories may require different time utilization factors of the resources. It is not required that the time bucket variation parameters (time utilization) are the same for all tasks. Defining the minimum time bucket processing time parameter of 50% of the value defined by the mean time bucket parameter and the maximum at 150% of the value defined by the mean time bucket parameter may not be the optimum for all task categories. Therefore, the minimum and maximum parameters are exemplarily given and they may change according to task types.

When assigning tasks to available resources one or more of the following rules may be considered:

1) If a task is spread over multiple scheduling time blocks, the scheduling time blocks should be consecutive scheduling time blocks, i.e. there should be no interruption.

2) The minimum bucket processing time will be first assigned to each of scheduling time blocks, therefore resulting in a main block.

3) Once the minimum bucket processing time is inserted into the main block, then the remaining processing time will be inserted until the maximum bucket processing time is reached with an increment defined in an incremental bucket processing time parameter and/or unit the total processing time is completely assigned.

4) If there is still processing time to be scheduled, then a so-called tail block will be started and the task's assignment duration will be extended scheduling time block by scheduling time block, until all of the remaining processing time is assigned to the available capacity of the respective resource.

In the following example, a task which is planned to take 32 hours to complete in 16 workdays is added to the schedule. The scheduling time block may be defined as a week having five workdays. Accordingly, the scheduling period parameter is determined to define four week (16/5 up-rounded). The mean time bucket parameter defines eight hours per week, where the minimum and the maximum bucket processing times may be set to four hours per week and 12 hours per week, respectively. The total resource capacity may be determined to be 20 hours per week.

The available resource capacity (in hours) per week prior to scheduling this particular task may be as follows in the individual weeks (scheduling time blocks STB1 to STB6):

TABLE 4

| STB1 | STB2 | STB3 | STB4 | STB5 | STB6 |
|------|------|------|------|------|------|
| 6 | 4 | 4 | 5 | 8 | 10 |

Accordingly, the available resource capacity in the first week (STB1) is 6 hours and so on, as shown in Table 4.

The main block for the task will be a four week long block. For this block to be a valid block for scheduling, it must allow the algorithm to schedule a minimum of four hours to each week. If we look at the available capacities from Week 1 (STB1) to 4 (STB4), it can be seen that it is possible to assign four hours to each week which corresponds to the minimum bucket processing time. The result of the assigned processing time (in hours) within the main block is as follows:

TABLE 5A

| STB1 | STB2 | STB3 | STB4 | STB5 | STB6 |
|------|------|------|------|------|------|
| 4 | 4 | 4 | 4 | | |

In a next step, the assigned processing time is increased by an incremental bucket processing time of 0.5 hours until either the maximum bucket processing time (12 hours in this example) is reached or the available capacity is finished. Subsequent iterations of these steps are shown in the Tables 5B to 5E.

Iteration 1:

TABLE 5B

| STB1 | STB2 | STB3 | STB4 | STB5 | STB6 |
|------|------|------|------|------|------|
| 4.5 | 4 | 4 | 4.5 | | |

Iteration 2:

TABLE 5C

| STB1 | STB2 | STB3 | STB4 | STB5 | STB6 |
|------|------|------|------|------|------|
| 5 | 4 | 4 | 5 | | |

Iteration 3:

TABLE 5D

| STB1 | STB2 | STB3 | STB4 | STB5 | STB6 |
|------|------|------|------|------|------|
| 5.6 | 4 | 4 | 5 | | |

Iteration 4:

TABLE 5E

| STB1 | STB2 | STB3 | STB4 | STB5 | STB6 |
|------|------|------|------|------|------|
| 6 | 4 | 4 | 5 | | |

By the end of iteration 4, the main block (defined by the scheduling period parameter, i.e. four weeks in the present example) is completely filled by allocating processing time to all available capacity within this block. Now, the task duration will be extended week by week, until all of the remaining processing time allocated.

Iteration 5:

TABLE 5F

| STB1 | STB2 | STB3 | STB4 | STB5 | STB6 |
|------|------|------|------|------|------|
| 6 | 4 | 4 | 5 | 4 | |

Iterations 6-13:

TABLE 5G

| STB1 | STB2 | STB3 | STB4 | STB5 | STB6 |
|------|------|------|------|------|------|
| 6 | 4 | 4 | 5 | 8 | |

At the end of iteration 13, the available capacity of the fifth week (STB5) has also been completely used, and there are still five hours of processing time which have not been allocated yet. This time is assigned to the sixth week (STB6) in iterations 14 to 16, as shown in Tables 5H to 5K.

Iteration 14:

TABLE 5H

| STB1 | STB2 | ST83 | STB4 | STB5 | STB6 |
|------|------|------|------|------|------|
| 6 | 4 | 4 | 5 | 8 | 4 |

Iteration 15:

TABLE 5I

| STB1 | STB2 | STB3 | STB4 | STB5 | STB6 |
|------|------|------|------|------|------|
| 6 | 4 | 4 | 5 | 8 | 4.5 |

Iteration 16:

TABLE 5K

| STB1 | STB2 | STB3 | STB4 | STB5 | STB6 |
|------|------|------|------|------|------|
| 6 | 4 | 4 | 5 | 8 | 5 |

After 16 iterations all of the processing time of this task is allocated. The task's duration has now become six weeks. This means that given the current load of this resource, it is able to finish the task in six weeks rather than the minimum number of four weeks defined in the scheduling period parameter.

If in the above example the available capacity in the third week was only three hours then the new task would not be able to be scheduled until the fourth week as there would not have been enough consecutive weeks with the minimum capacity of four hours available.

The available capacity of the resources will continue to be used as tasks are scheduled according to the process priority list and task priority list while testing a single combination from all combinations in the resource suitability set as described above.

The process of optimizing a schedule may include three process categories: assessment processes, volume processes, and other processes. The assessment processes have an assessment parameter greater than zero. The volume processes have a volume parameter greater than zero but either do not have an assessment parameter, or the assessment parameter is set to zero. Remaining processes fall into the other processes group.

The benefit of optimizing the schedule for different groups of processes is different. For the assessment processes, the benefit of the processes are measured by the assessment parameter and the volume processes provide a benefit to the organization measured by the volume parameter, for instance. Therefore the score calculation for different process groups may be based on those parameters. The initial process rankings may also be based on those parameters similarly.

The scheduling algorithm evaluates, for example, a score value for each process, once all of its tasks are assigned to a set of resources. The calculation of the score value may be different for each process depending on the process group defined above, for example. For the assessment processes, the score value may be determined based on the internal weighting parameter and the elapsed time until the process is finished. For the volume processes, the score value may be determined based on the volume parameter and/or the internal volume parameter and the elapsed time until the process is finished. For the other type of processes, the score value may be determined based on the elapsed time until the process is finished, only. One or more steps of this scheduling algorithm or at least some of its aspects may be at least partly implemented in a step ST5200 described in more detail in connection with FIGS. 6 and 7, below.

The elapsed time until a process is completed is exemplarily defined as time interval from the current time when the evaluation is performed until the point in time when the process is planned to be finished according to the established scheduling.

In one example, the score value for the assessment processes is calculated by dividing the internal weighting parameter by the time interval between the current point in time and the planned point in time for finishing the process. The score value for the volume processes is exemplarily calculated by dividing the volume parameter by the time interval between the current point in time and the planned point in time for finishing the process. For the other processes, the score value may be calculated as the reciprocal of the time interval between the current point in time and the planned point in time for finishing the process, for example.

Dividing the assessment or the volume parameter to the elapsed time facilitates the calculation of the potential benefit provided to the organization per unit time. This provides a simple but yet powerful metric to evaluate the benefit of the optimization of the schedule. If based on the resource task assignments of the process it is going to take significant time to finish the process but in return it yields less profit to the organization by scheduling this process to finish earlier, this will be a less preferable resource assignment set. However, it may be more advantageous in the end for the profitability of the whole solution set, i.e. the cumulative benefit for scheduling all processes according to the resource assignment given in the scheduling set. Hence, the sums of the scores of all processes are compared with the result scores of the other resource-task assignment sets.

In the example discussed in connection with Table 3, above, the solution set 122 has 12 possible resource-task assignment sets based on the defined task parameters and resource profiles. Table 6A shows all possible resource-task assignment sets (Opt 1 to Opt 12) that can occur. A plurality of resource-task assignment sets, such as all possible resource-task assignment sets, together form the solution set 122, as shown in Table 6A, for example.

TABLE 6A

| Process ID | Task ID | Opt 1 | Opt 2 | Opt 3 | Opt 4 | Opt 5 | Opt 6 | Opt 7 | Opt 8 | Opt 9 | Opt 10 | Opt 11 | Opt 12 |
|---|---|---|---|---|---|---|---|---|---|---|---|---|---|
| 0100 | 0103 | R1 | R2 | R1 | R2 | R1 | R2 | R1 | R2 | R1 | R2 | R1 | R2 |
| 0100 | 0111 | R3 | R3 | R3 | R3 | R3 | R3 | R3 | R3 | R3 | R3 | R3 | R3 |
| 0100 | 0109 | R3 | R3 | R3 | R3 | R3 | R3 | R3 | R3 | R3 | R3 | R3 | R3 |
| 0100 | 0110 | R3 | R3 | R3 | R3 | R3 | R3 | R3 | R3 | R3 | R3 | R3 | R3 |
| 1200 | 1201 | R3 | R3 | R3 | R3 | R8 | R8 | R8 | R8 | R9 | R9 | R9 | R9 |
| 1200 | 1211 | R3 | R3 | R3 | R3 | R8 | R8 | R8 | R8 | R9 | R9 | R9 | R9 |
| 1200 | 1222 | R3 | R3 | R3 | R3 | R8 | R8 | R8 | R8 | R9 | R9 | R9 | R9 |
| 1400 | 1404 | R3 | R3 | R3 | R3 | R3 | R3 | R3 | R3 | R3 | R3 | R3 | R3 |
| 1400 | 1413 | R3 | R3 | R3 | R3 | R3 | R3 | R3 | R3 | R3 | R3 | R3 | R3 |
| 1500 | 1502 | R3 | R3 | R4 | R4 | R3 | R3 | R4 | R4 | R3 | R3 | R4 | R4 |
| 1500 | 1505 | R3 | R3 | R4 | R4 | R3 | R3 | R4 | R4 | R3 | R3 | R4 | R4 |

For each of the processes within each resource-task assignment set, a schedule parameter is evaluated which, for example, is based on the time interval between the current time when evaluating the schedule parameter and the point in time at which the respective process is planned to be finished according to the established resource-task assignment set (Opt 1 to Opt 12), i.e., according to the scheduling within the resource-task assignment set. In one example implementation, the schedule parameter represents said time interval. This time interval may be measured in months, weeks, days, hours, minutes, seconds, or any other appropriate unit of time.

Table 6B shows an example based on the solution set shown in Table 6A, where the values indicated in Table 6B for each process within each resource-task assignment set (Opt 1, Opt 2, . . . , Opt 12) may represent the point in time at which the respective process is planned to be finished according to the scheduling in the respective resource-task assignment set. In this example, this point in time is given as a date. For example, in the first resource-task assignment set (Opt 1) process 0100 is scheduled to be finished on February 16th, while process 1500 is scheduled to be finished on March 6th. In the given example, the current time is assumed to be February 6th. Accordingly, the schedule parameter for a certain process (0100, 1200, 1400, 1500) within a certain resource-task assignment set (Opt 1, . . . Opt 12) may be evaluated as the number of days between the current date (February 6th) and the scheduled finishing date for said process within said resource-task assignment set. As can be seen from Table 6A, the schedule parameter of process 0100 for the first resource-task assignment set Opt 1 is 10 days or the value "10" or any value corresponding thereto.

Three minor phases based on the process groups are optimized within each major phase. For example, each of the major phase processes are optimized in three minor phases based on the weighing parameter and/or the assessment

TABLE 6B

| Process ID | Opt 1 | Opt 2 | Opt 3 | Opt 4 | Opt 5 | Opt 6 | Opt 7 | Opt 8 | Opt 9 | Opt 10 | Opt 11 | Opt 12 |
|---|---|---|---|---|---|---|---|---|---|---|---|---|
| 0100 | 16-Feb | 13-Feb | 16-Feb | 13-Feb | 16-Feb | 13-Feb | 16-Feb | 13-Feb | 16-Feb | 13-Feb | 16-Feb | 13-Feb |
| 1200 | 22-Feb | 20-Feb | 22-Feb | 20-Feb | 14-Feb | 10-Feb | 14-Feb | 10-Feb | 17-Feb | 15-Feb | 17-Feb | 15-Feb |
| 1400 | 27-Feb | 24-Feb | 27-Feb | 24-Feb | 20-Feb | 17-Feb | 20-Feb | 17-Feb | 20-Feb | 17-Feb | 20-Feb | 17-Feb |
| 1500 | 06-Mar | 03-Mar | 14-Feb | 14-Feb | 27-Feb | 24-Feb | 14-Feb | 14-Feb | 27-Feb | 24-Feb | 14-Feb | 14-Feb |

Further, in another example a score value may be determined for each process as described in more detail below. Exemplarily, the score value may be determined by dividing for each process the weighting parameter of the process by the schedule parameter established for the individual resource assignments. Table 6C shows an example of such score values established for the plurality of processes and the plurality of resource-task assignment sets based on the schedule parameters retrieved from the example described in connection with Table 6B, above. For each process (0100, 1200, 1400, 1500) Table 6C shows the weighting parameter and a plurality of score values each of which has been established based on the weighting parameter assigned to the process and the schedule parameter determined for a particular resource-task assignment set. The weighting parameter for process 0100, for example, has a value "10000". With a schedule parameter of "10" defined for this process in the first resource-task assignment set Opt 1, this results in a score value of 10000/10=1000, as indicated in Table 6C.

Further, for each resource assignment a control parameter may be determined by summing up the score values of all processes within each of the resource-task assignment sets and the resource-task assignment set having the largest control parameter may be selected. As indicated in Table 8, the control parameter for the first resource-task assignment set Opt 1 is "1068". Based on these control parameters the resource-task assignment set Opt 8 having the largest control parameter of "1689" may be selected among all established resource-task assignment sets, which together from the solution set. In an example implementation, for each different group of processes a separate control parameter may be determined.

parameter of the process. The three major optimization phases and three minor phases are listed below in the priority order which they are run, for example. All minor phases within a major optimization phase are run, for example, before the next major optimization phase is run. For example, all processes with a status of 'In-progress' are scheduled for assessment processes, volume processes and other processes before the next major optimization phase (i.e. all "Firm" processes) are run.

Exemplarily, before the optimization phases are stared the following processes and/or task lists are established for the respective major optimization phase:

1) In-Progress process lists (for the first major optimization phase) may define and/or list:
    a) assessment processes that are in "In-Progress" status
    b) volume processes that are in "In-Progress" status
    c) other processes that are in "In-Progress" status
2) Firm process fists (for the second major optimization phase) may define and/or list:
    a) assessment processes that are in "Firm" status
    b) volume processes that are in "Firm" status
    c) other processes that are in "Firm" status
3) Phase III Project Lists (for the third major optimization phase) may define and/or list:
    a) assessment processes that are in "Early Start", "Scheduled" or "Unscheduled" status
    b) volume processes that are in "Early Start", "Scheduled" or "Unscheduled" status
    c) other processes that are in "Early Start", "Scheduled" or "Unscheduled" status

TABLE 6C

| Process ID | Weighting Parameter | Opt 1 | Opt 2 | Opt 3 | Opt 4 | Opt 5 | Opt 6 | Opt 7 | Opt 8 | Opt 9 | Opt 10 | Opt 11 | Opt 12 |
|---|---|---|---|---|---|---|---|---|---|---|---|---|---|
| 0100 | 10000 | 1000 | 1429 | 1000 | 1429 | 1000 | 1429 | 1000 | 1429 | 1000 | 1429 | 1000 | 1429 |
| 1200 | 1000 | 62.5 | 71.4 | 71.4 | 62.5 | 71.4 | 125 | 250 | 125 | 250 | 90.9 | 111.1 | 90.9 |
| 1400 | 100 | 4.76 | 5.56 | 4.76 | 5.56 | 7.14 | 9.09 | 7.14 | 9.09 | 7.14 | 9.09 | 7.14 | 90.9 |
| 1500 | 10 | 0.36 | 0.4 | 1.25 | 1.25 | 0.48 | 0.56 | 1.25 | 1.25 | 0.48 | 0.56 | 1.25 | 1.25 |
| Control Parameter | | 1068 | 1506 | 1069 | 1507 | 1133 | 1668 | 1133 | 1689 | 1099 | 1549 | 1099 | 1550 |

Exemplarily, the optimization of the schedule comprises three major optimization phases, with each major optimization phase comprising three minor phases. Each major optimization phase may optimize, for example, a certain set of processes all having the same process status parameter. Scheduling, for example, starts with scheduling the processes having the status parameter representing an "In-Progress" status, and continues with the "Firm" processes, for example. Finally, the processes having "Early-Start", "Scheduled" and "Unscheduled" status are optimized. Example implementations of these three major phases are also described as steps ST5000, ST6000, and ST7000 in connection with FIG. 5, below.

During the first major optimization phase, the "In-Progress" processes are scheduled. Since they have been already started, the scheduling algorithm tries to schedule them first to ensure continuity in the process execution. Exemplarily, this optimization phase does not try to find out the best "resource to task assignment" combinations, i.e., the best resource-task assignment set, but it may use the previous resource-task assignment set to add the tasks to the schedules of the resources, for example. Exemplarily, the following steps may be carried out for all process groups (assessment processes, volume processes and other processes):

1) Retrieve the task list exemplarily extracted for this phase as listed above;

2) Schedule the tasks to resources while keeping assignments of tasks to resources;

3) Check an assignment status;

4) Perform post-scheduling settlement to finalize the task and process status;

5) Merge assignments with the results of the previous optimisations;

6) Copy the schedules of the resources from the solution set back to the main schedules;

7) Add the tasks that could not be assigned to the global list of unassigned tasks.

If a process and its tasks loose their scheduled status ("In-Progress", "Firm", "Early-Start" or "Scheduled", for example), due to a task in the process that could not be scheduled, all assignments for this process may be removed from the resource-task assignment set, for example. As a consequence the "balance" of the resource-task assignment set is changed, since there might be some other tasks that are added to the schedules of the resources after those tasks have been scheduled that have been subsequently removed. If the scheduling algorithm just removes the assignments from the schedules of the resources, this causes gaps in the schedules of the resources and, therefore, reduces the utilization of the resources. Therefore, as long as some tasks are de-assigned due to some other tasks in the same process that could not be scheduled, the optimization may be re-run until no more de-assignments are necessary, for example.

Accordingly, the first processes that will go in the schedules are the ones in "In-Progress" status, since they have been already started, the scheduling algorithm tries to schedule them first to ensure continuity in the project. The first major optimization phase exemplarily inserts the tasks to the schedules of the resources that have already been assigned and are currently working on the task. Since the processes are in progress, the scheduling engine does not change any assignments for the In-Progress processes, this includes all tasks within a project that is 'In-progress' but have not yet started (i.e. tasks with a status of Firm for an In-Progress process).

In the following, the second major optimization phase according to an example is described in more detail. Exemplarily, the second major optimization phase optimizes the "Firm" processes. Exemplarily, the assignments of tasks to resource have not yet been fixed for these processes, which means they will be re-optimized. Since the process status is "Firm", it will always keep its status even if the process falls out of a "Firm" zone, which is a given period of time after the scheduling run that may be defined in the firm period duration parameter. It is advantageous to re-optimize the task-resource assignments of these processes because due to the work load caused by the In-Progress processes, the previous set of resources assigned to the firm processes might not be able to start working on the "Firm" processes on time. In this case, it is worth to try out some new combinations to see whether there is a resource-task combination that could deliver a Firm process earlier.

Exemplarily, the following steps are carried out for all process groups (assessment processes, volume processes and other processes):

1) Retrieve the task list extracted for this phase as listed above, for example;

2) Schedule the tasks to resources to try all task resource assignment combinations, i.e., all resource-task assignment sets;

3) Check the assignment status;

4) Perform post-scheduling settlement to finalize the task and process status;

5) Merge assignments with the results of the previous optimizations;

6) Copy the schedules of the resources from the solution set back to main schedules;

7) Add the tasks that could not be assigned to the global list of unassigned tasks.

When scheduling processes with a status of 'Firm', all tasks within the processes are re-optimized and may be assigned a new resource combination if this provides a more optimum solution based on available resource capacity. Once a process has a status of "Firm" it will continue to retain this status regardless of where the process is scheduled in the future.

In the following, the third major optimization phase, according to one example, is described in more detail. Exemplarily, the third major optimization phase optimizes the rest of the processes, which have "Early Start", "Scheduled" and/or "Unscheduled", for example. If a process has the "Early-Start" status, this means that one or more tasks within a process have been started earlier than it was expected which is not earlier than the end of the "Firm" period. Processes having a "Scheduled" status exemplarily have been actually scheduled in the previous schedule run. However, they are not supposed to be start within the firm time period. "Unscheduled" processes are generally the processes that have been newly set up. Since they are the newest processes among the others, they will be scheduled as last together with the "Early Start" and "Scheduled" processes, for example.

Exemplarily, the following steps are carried out for all process groups (assessment processes, volume processes and other processes):

1) Retrieve the task list extracted for this phase as listed above, for example;

2) Schedule the tasks to resources to try all task resource assignment combinations, i.e., all resource-task assignment set;

3) Check the assignment status;

4) Perform post-scheduling settlement to finalize the task and process status;

5) Merge assignments with the results of the previous optimizations;

6) Copy the schedules of the resources from the solution set back to main schedules;

7) Add the tasks that could not be assigned to the global list of unassigned tasks.

During the minor optimization phases (or minor scheduling phases), priority is given to processes in the following order within each of the three major optimization phases (or major scheduling phase):

1) Assessment processes (Sub-Phase a)—This represents all processes within a major scheduling phase that have a weighting parameter greater than zero.

2) Volume processes (Sub-Phase b)—This represents all processes within a major scheduling phase that have a weighting parameter equal to zero and a volume parameter greater than zero.

3) Other processes (Sub-Phase c)—This represents all processes within a major scheduling phase that have a weighting parameter equal to zero and a volume parameter equal to zero.

A step of post-scheduling settlement may comprise re-optimizing the schedule after tasks have been removed from the schedule. This step may comprise re-optimizing the schedule for "Un-scheduled" processes. For example, the step of post-scheduling settlement is comprised in the step of optimizing the schedule. If a single task within a process cannot be scheduled to a resource, as a scheduling rule, the assignments of the other tasks within the same process may become invalid. If a task in a process cannot be scheduled, the whole process cannot be finished. This step of post-scheduling settlement may be at least partly implemented in the steps ST5500 and/or ST5600 described in more detail in connection with FIG. 6, below.

Exemplarily, a task will not be assigned to a resource, if there is no resource available in the preferred location, which has the required available resource capacity; and/or if there is no resource available in the preferred location, which has the required capability of perform that task depending on the task category, for example; and/or if the schedules of all of the suitable resources are full within a certain advance planning time.

If a process and its tasks loose their scheduled status ("In-Progress", "Firm", "Early-Start" or "Scheduled", for example), due to a task in the process that could not be scheduled, all assignments for this process may be removed from the solution set, for example. As a consequence the "balance" of the solution set is changed, since there might be some other tasks that are added to the schedules of the resources after those tasks have been scheduled that have been subsequently removed. If the scheduling algorithm just removes the assignments from the schedules of the resources, this causes gaps in the schedules of the resources and, therefore, reduces the utilization of the resources. Therefore, as long as some tasks are de-assigned due to some other tasks in the same process that could not be scheduled, the optimization may be re-run until no more de-assignments are necessary, for example.

Figure 5:
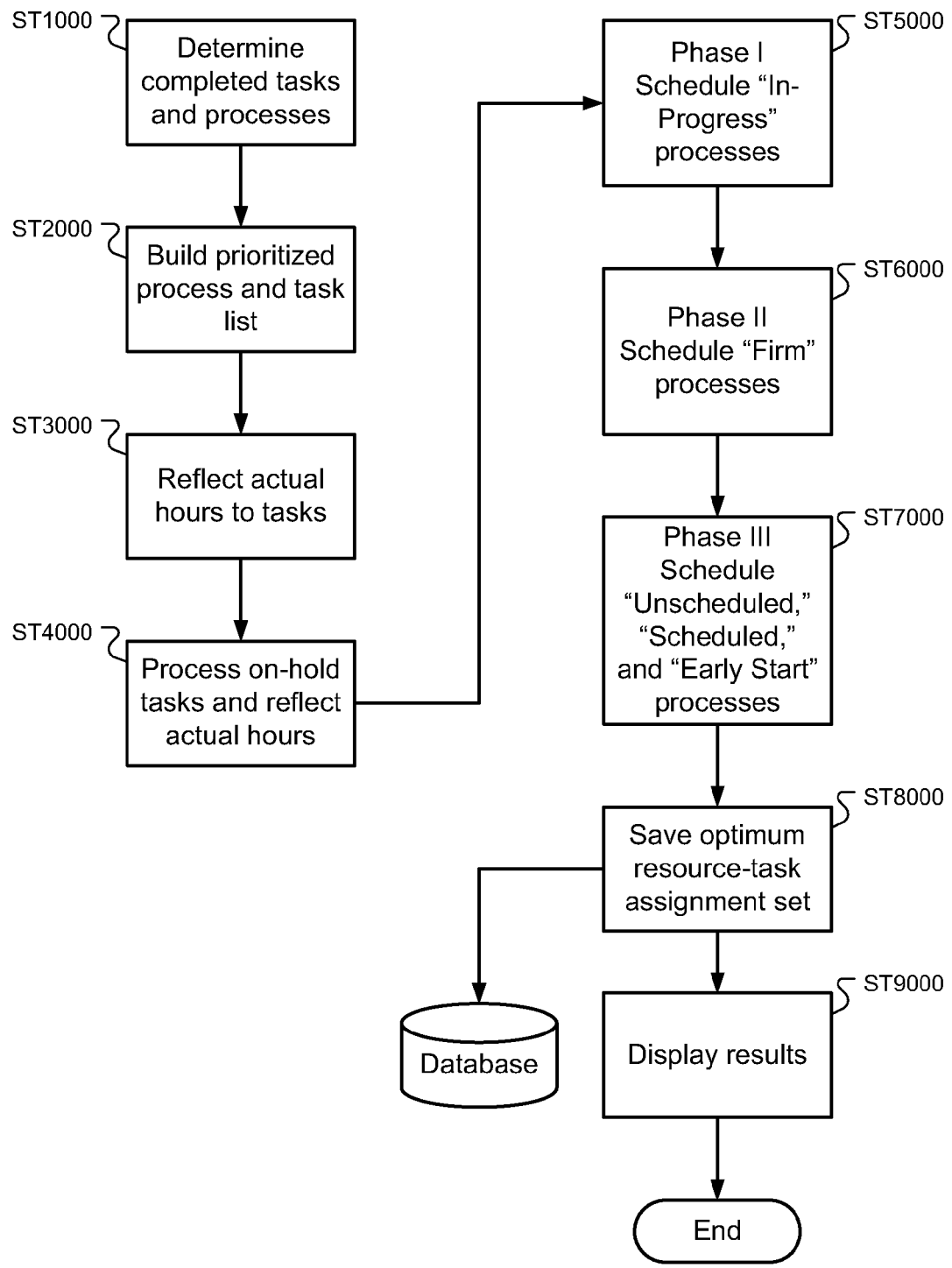
FIG. 5 is a flow diagram of another example method of allocating processes to resources.

FIG. 5 is a flow diagram of another example method of allocating processes to resources. The method may include one or more of the following steps: A step ST1000 of determining completed tasks and processes; and/or a step ST2000 of building prioritized process and task lists; and/or a step ST3000 of reflecting actual hours to tasks; and/or a step ST4000 of processing "On-Hold"-tasks and reflecting reported actual hours to them; and/or a step ST5000 of scheduling "In-Progress" processes (Phase I); and/or a step ST6000 of scheduling "Firm" processes (Phase II); and/or a step ST7000 of scheduling "Unscheduled", "Scheduled", and "Early Start" processes (Phase III); and/or a step ST8000 of saving the selected resource-task assignment set to a database, such as the database 100 or 110, for example; and/or a step ST9000 of displaying results.

An implementation need not execute the above enumeration of the method steps in the chronological order shown.

During the step ST1000 of determining completed tasks and processes for each process in a list of active processes, the underlying tasks are checked to determine whether there are any tasks that are marked as being completed. If a task is found to be completed, its status is set to the value "Completed" or a value corresponding thereto.

The step ST2000 of building prioritized process and task lists may comprise the step of setting up and/or retrieving priority lists for the processes and tasks as described above in connection with FIGS. 4A and 4B and in connection with Tables 2A, 2B, and 2C, for example.

During the step ST3000 of reflecting actual hours to tasks, task report data as described above may be received and/or processed as previously described above.

During the step ST4000 of processing "On-Hold"-tasks and reflecting reported actual hours to them, the tasks which have "On-Hold" status are analyzed. If the task restart parameter of a task that has been put on-hold is set to "Indefinite", this means that this task cannot be restarted and will continue to have the same status. For the on-hold tasks, which do have a restart time parameter equal to or greater than the schedule start time parameter, the requested start parameter for those tasks will be set to the restart time parameter and they will be included in the scheduling with the status parameters they did possess prior to being put on-hold. The on-hold tasks which are processed by the scheduling algorithm will continue to appear as "On-Hold", although they are included in the schedule and assigned to resources. It is possible that for a task which is put on-hold, a resource might have commenced the task and worked on it, therefore, the remaining hours for the task may need to be adjusted by considering the actual hours worked on the task prior to being put on-hold.

The step ST5000 of scheduling "In-Progress" processes (Phase I), the step ST6000 of scheduling "Firm" processes (Phase II), and the step ST7000 of scheduling "Unscheduled", "Scheduled", and "Early Start" processes (Phase III) each corresponds to one of the three major optimization phases according to an optimization of the schedule described above, respectively.

The step ST5000 of scheduling "In-Progress" processes may comprise one or more of the following steps: a step of setting up and/or retrieving priority lists for processes and tasks, such as for processes and task that are going to be processed as part of the current scheduling phase, as described in detail above; and/or a step of identifying a resource suitability set, as described in detail above; and/or a step of scheduling tasks to available resource capacities as described in detail above; and/or a step of optimizing the schedule, as described in detail above; and/or a step of updating the process status parameter and/or the task status parameter, as described in detail above.

Figure 6:
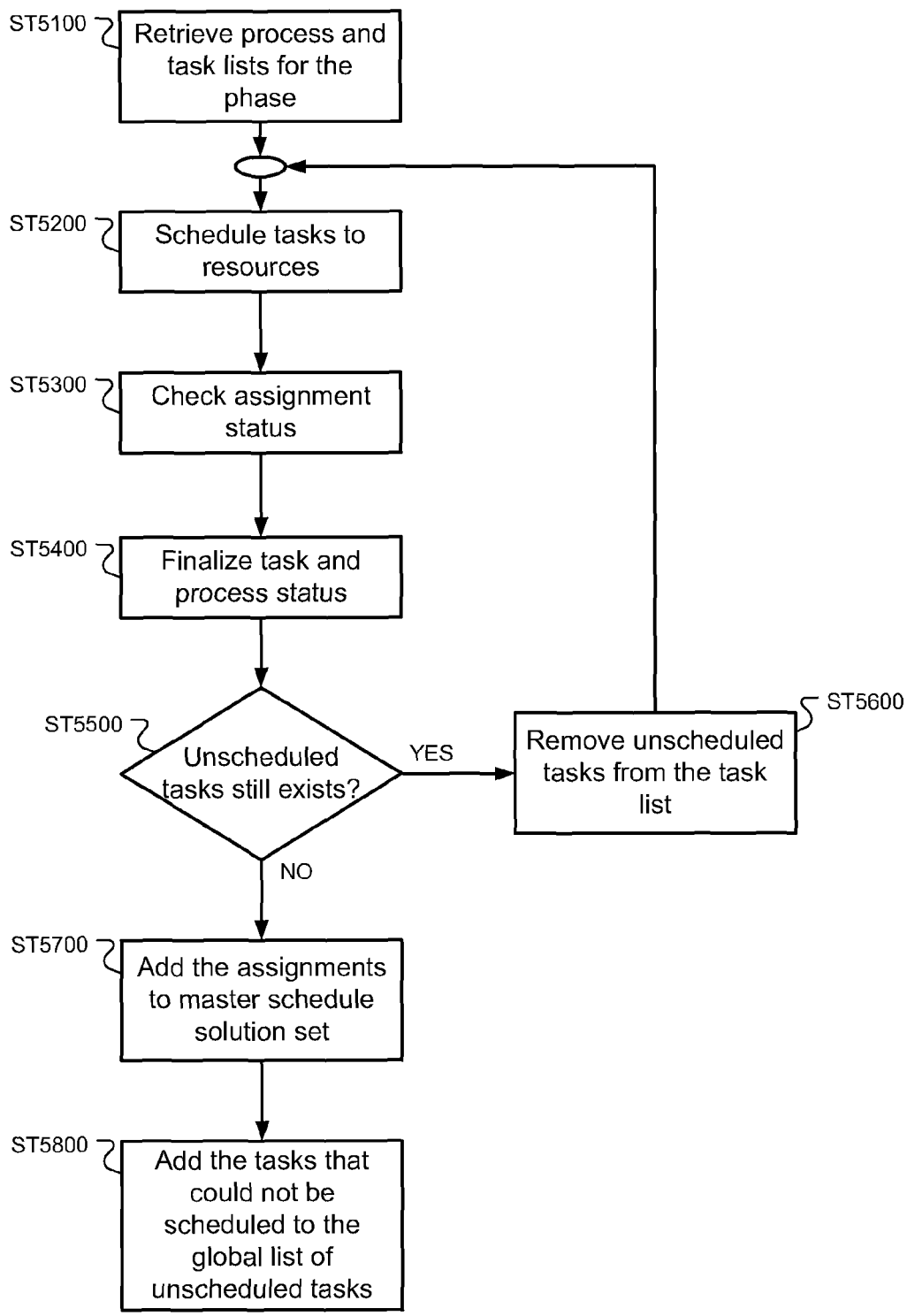
FIG. 6 is a flow diagram of an example implementation of the process of scheduling in-progress processes of FIG. 5.

FIG. 6 is a flow diagram of an example implementation of the process of scheduling in-progress processes of FIG. 5. With reference to FIG. 6, the step ST5000 of scheduling "In-Progress" processes may alternatively comprise one or more of the following steps: a step ST5100 of retrieving process and task lists for the current phase; and/or a step ST5200 of scheduling tasks to resources; and/or a step ST5300 of checking assignment status; and/or a step ST5400 of finalizing task and process status; and/or a step ST5600 of Post Scheduling Settlement; and/or a step ST5700 of adding assignments to a master schedule solution set; and/or a step ST5800 of add a task that could not be scheduled to a global list of unscheduled tasks.

An implementation need not execute the above enumeration of the method steps in the chronological order shown.

During the step ST5100 of retrieving process and task lists for the current phase, all processes that are going to be scheduled within the current phase will be retrieved from the database. Following the processes, their tasks will be retrieved from the database and inserted into a task priority list according to the priority ranking of the enclosing processes.

The step ST5200 of scheduling tasks to resources may be implemented as described with respect to Tables 6A-6C above.

During the step ST5300 of checking assignment status, the status of the tasks according to their scheduled start times is checked. In one example implementation, the task status parameters are determined as described above. For each process the process status parameter is updated based on task status parameters (Task_Status) of the tasks comprised in the process as described in detail above During the step ST5400 of finalising task and process status, the process status is determined based on the task assignments.

The step ST5600 of Post Scheduling Settlement may comprises a step ST5500 of determining whether unscheduled tasks still exist and a step ST5600 of removing unscheduled tasks from the task list. The step ST5600 of Post Scheduling Settlement comprises the step of post-scheduling settlement as described.

The step ST5700 of adding assignments to a master schedule solution set comprises a step of adding the finalized task assignments, for example the finalized resource-task assignment sets, for the current phase to a master schedule solution set which comprises the task assignments, i.e. the resource-task assignment sets, of all phases.

During the step ST9000 of displaying results, the results of the scheduling algorithm together with the metrics showing the overall benefit of the optimization will be displayed to the user. Additionally, the resource assignments for each task, the process delivery dates, and hourly, daily, or weekly assignment planning, for example, for each task are made visible to the user.

Figure 7:
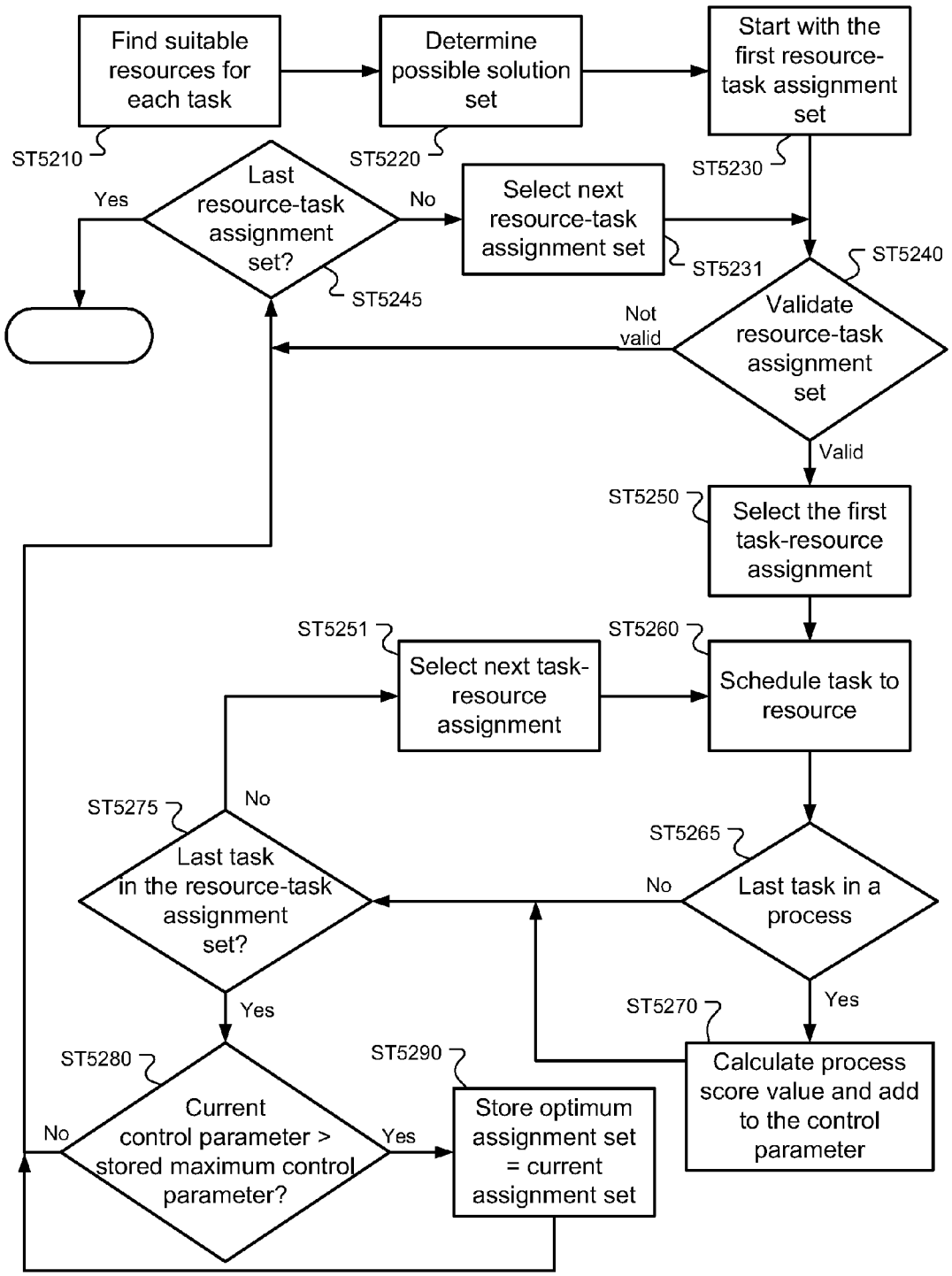
FIG. 7 is a flow diagram of an example implementation of the process of scheduling tasks to resources of FIG. 6.

FIG. 7 is a flow diagram of an example implementation of the process of scheduling tasks to resources of FIG. 6. With reference to FIG. 7, the step ST5200 of scheduling tasks to resources may comprise one or more of the following steps: a step ST5210 of identifying the resource suitability set; and/or a step ST5220 of determining the a solution set, where the solution set may comprise a plurality of resource-task assignment sets, such as all different resource-task assignment set that are possible for the identified resource suitability set; and/or a step ST5230 of selecting the first resource-task assignment set within the solution set as a current resource-task assignment set; and/or a step ST5231 of selecting the next resource-task assignment set within the solution set as the current resource-task assignment set; and/or a step ST5240 of validating the current resource-task assignment set; and/or a step ST5245 of determining whether the current resource-task assignment set is the last resource-task assignment set within the solution set; and/or a step ST5250 of selecting the first task-resource assignment within the current resource-task assignment set as the current task-resource assignment; and/or a step ST5251 of selecting the next task-resource assignment within the current resource-task assignment set as the current task-resource assignment; and/or a step ST5260 of scheduling the task to the resource according to the current task-resource assignment; and/or a step ST5265 of determining whether the task defined in the current task-resource assignment is the last task within a process; and/or a step ST5270 of evaluating the score value for the process and adding said score value to the control parameter of the current resource-task assignment set; and/or a step ST5275 of determining whether the current task-resource assignment is the last task-resource assignment within the current resource-task assignment set; and/or
a step ST5280 of determining whether the control parameter of the current resource-task assignment set is greater than a stored maximum control parameter; and/or a step ST5290 of storing the current resource-task assignment set as the optimum resource-task assignment set and storing the control parameter of the current resource-task assignment set as the maximum control parameter.

In the step ST5210 of determining the resource suitability set, the set of suitable resources for each task may be determined. The step ST5210 of determining the resource suitability set may be implemented as described above with reference to Table 3, for example.

The step ST5231 of selecting the next resource-task assignment set within the solution set as the current resource-task assignment set may be performed if the current resource-task assignment set is determined as not being the last resource-task assignment set within the solution set in the step ST5245.

In step ST5240 the current resource-task assignment set is validated according to bundle constraints. The assignment of some bundled tasks within the resource-task assignment set may already be fixed, since the tasks have "In-Progress" status. Therefore, other tasks that belong to the same bundle should be assigned to the same resource. The step ST5240 verifies whether the combination which is generated by the algorithm conforms to such bundle constraints. If the resource-task assignment set is determined to be not valid in step ST5240, the method preferable proceeds to step ST5245, as indicated in FIG. 7. Otherwise, i.e. if the current resource-task assignment set is determined to be valid in accordance to the bundle constraints, the method proceeds to step ST5250 of selecting the first task-resource assignment within the current resource-task assignment set.

The step ST5251 of selecting the next task-resource assignment within the current resource-task assignment set as the current task-resource assignment may be performed if the current task-resource assignment is determined to be not the last task-resource assignment within the current resource-task assignment set in the step ST5275.

The step ST5260 of scheduling the task to the resource according to FIG. 7 may comprise a step of scheduling task to available resource capacities as described with reference to Tables 4 and 5, above.

The step ST5270 of evaluating the score value for the process and adding said score value to the control parameter of the current resource-task assignment set may be performed if in step ST5265 the task defined in the current task-resource assignment is determined to be the last task within the process which the task belongs to. If in step ST5265 the task defined in the current task-resource assignment is determined not to be the last task within the process which the said task belongs to, than the processing proceeds to step ST5275 of determining whether the current task-resource assignment is the last task-resource assignment within the current resource-task assignment set. If the current task-resource assignment is the last task-resource assignment within the current resource-task assignment set, the processing proceeds to step ST5280 of determining whether the control parameter of the current resource-task assignment set is greater than a stored maximum control parameter. If this is the case, then the method proceeds to step ST5290. Otherwise, i.e. in case in step ST5280 the control parameter of the current resource-task assignment set is determined not to be greater than the stored maximum control parameter, the method proceeds to step ST5245 as indicated in FIG. 7.

The steps ST6000 of scheduling "Firm" processes (Phase II) and ST7000 of scheduling "Unscheduled", "Scheduled", and "Early Start" processes (Phase III) and may be performed analogous to the step ST5000 of scheduling "In-Progress" processes (Phase I), i.e. details described for step ST5000 in connection with FIGS. 5 to 7 may apply to the steps ST6000 and ST7000 also.

The work allocation model may also be used in other fields and model other types of work, such as business services and the like. By way of an example, an application of the work allocation model to the service sector, and particularly for allocating work request for procurement services, will be described with reference to FIGS. 8-12. In this particular example, the processes being organized are represented by projects each of which covers a client's work request. Each project belongs to a category such as "IT", "Travel", "Facilities & Services", or "Professional Services", for example. In one example, it is intended to maximize the total savings for a client by advantageously allocating the client's work request to the available procurement resource capacities. The process volume parameter assigned to each project in this example may be represented by an Estimate Baseline Spend for each project as described below. The efficiency parameter for each project may be received from a user or a database as a Savings Estimate percentage of a Savings Estimate Potential that may depend on the project category and an Estimated Savings Level, such as "Low", "Medium", or "High", for example, described below. Based on the Estimated Baseline Spend and the Savings Estimate Potential, a Savings Estimate value is determined that represents the assessment parameter described above. The (internal) weighting parameter stores Adjusted Savings described below and a Business Criticality for each project is stored in the criticality parameter.

Figure 8A:
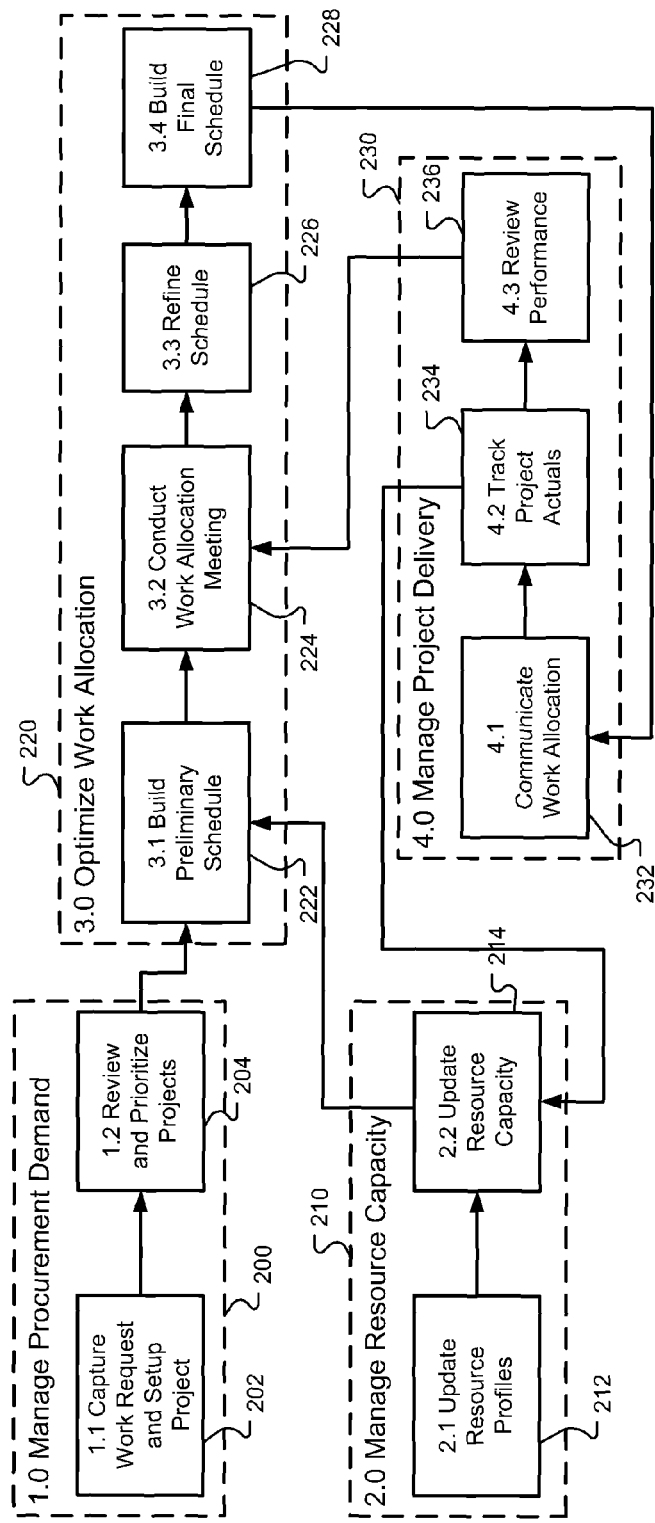
FIG. 8A is a flow diagram of an example work allocation model applied in a service sector environment for allocating work requests for procurement services.

FIG. 8A is a flow diagram of an example work allocation model applied in a service sector environment for allocating work requests for procurement services. The example work allocation process comprises four main steps: a Manage Procurement Demand process 200, a Manage Resource Capacity process 210, an Optimize Work Allocation process 220, and a Manage Project Delivery process 230.

The Manage Procurement Demand process 200 includes a capture work request and project setup process 202 and a review and prioritizes project process 204. The Manage Procurement Demand process 200 focuses on capturing work requests, and setting up and prioritizing project demand. Activities include receiving sourcing work requests and determining if the requests will require more than a predetermined time to complete. In one example, the predetermined time is four hours. Requests requiring less than four hours are completed on a first in, first out basis where the resource has available non-scheduled capacity to complete the request. Requests requiring greater than four hours to complete are entered into a work allocation model and a new project is setup to satisfy the work request.

The Manage Resource Capacity process 210 includes an update resource profile process 212 and an update resource capacity process 214. The Manage Resource Capacity process 210 focuses on determining and managing resource capability and available resource capacity to satisfy procurement demand. Activities include review periodic status reports, reviewing resource capability reports, and updating resource profiles for team resources.

The Optimize Work Allocation process 220 includes a build preliminary schedule process 222, a work allocation meeting process 224, a refine schedule process 228, and a build final schedule process 228. The Optimize Work Allocation process 220 focuses on assigning resource capacity to work requests with the highest potential benefit based on the list of project priorities. Activities include generating a preliminary project schedule based on initial project priority list; conducting a work allocation meeting to review project schedule and make adjustments to either project priorities, or project setups to overcome scheduled project delays; and refining project priority list and project setup parameters based on agreed outcomes or work allocation meeting and generates final project.

The Manage Project Delivery process 230 includes a communicate work allocation process 232, a track project actuals 234, and a review performance process 236. The Manage Project Delivery process 230 focuses on effectively communicating work allocation to resources, and on tracking and managing the delivery of work. Activities include generating reports to communicate final resource assignments and meeting outcomes and distributes to all meeting attendees; communicating resource assignments to team members and highlight any key changes to the schedule; resources executing against the resource assignment schedule and record their actual time and estimated time to complete tasks at the end of each week; and generating KPI reports to review team performance and identify potential areas for improvement.

Figure 8B:
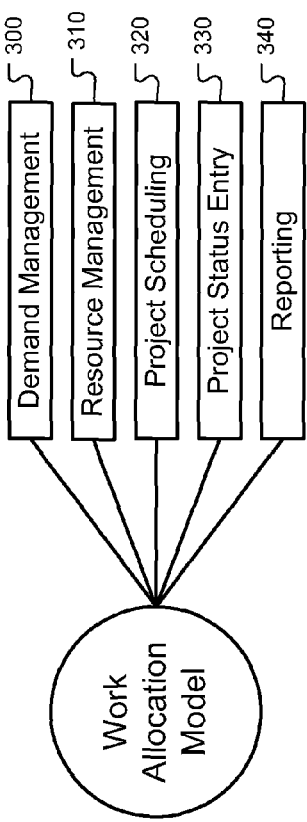
FIG. 8B is an entity relationship diagram showing related functionalities of an example work allocation model.

FIG. 8B is an entity relationship diagram showing related functionalities of an example work allocation model. The example work allocation model for use in the work allocation process comprises five main areas of functionality: demand management 300, resource management 310, project scheduling 320, project status entry 330, and reporting 340.

Demand management 300 is focused on capturing client work requests; setting up and planning projects to satisfy client demand; classification of client demand to enable scheduling to available resources; prioritizing projects based on project savings potential and adjusting project priority based on overall business needs; viewing project setup and priority.

Resource management 310 is focused on classification of resource skill profiles, category experience and location to match available resources to project tasks; definition of a resources weekly capacity available for scheduled projects; entering of planned resource vacations and public holidays by work location; viewing resource profiles.

Project scheduling 320 is focused on scheduling task demands to available capacity; displaying scheduled project start and end dates; displaying resource assignments by tasks and periods.

Project status entry 330 is focused on capturing the time spent by a resource completing a scheduled task, the estimated working time and the estimated number of elapsed working days for the resource to complete the tasks in the future; time spent by resources on non-scheduled work by activity type; viewing historical status entry by resource.

Reporting 340 provide users with a flexible and easy to use tool for reporting information generated by the work allocation model. The reports resent information in clear format that is easy to understand and provides the information required to effectively support the process based on selected report filtering criteria.

Each of the functional areas is discussed in more detail below.

In one example, demand management 300 includes the functionality of capturing client work requests, which capture a clear description of the work request; the scope of the work request; name and contact details of the person requesting the work requestor; the language that the project should be completed in; the criticality of the request to the client; the project start and end dates requested by the client; and spend category and initial spend estimate associated with the request.

Demand management 300 may also include the functionality of generating initial project savings estimate, which provides an initial savings estimate, representing the assessment parameter for each project, based on the estimated level of savings that can be achieved (low, med, high). This initial savings estimate is used only to determine the initial priority of a project to initially schedule the project and does not represent the actual savings that are committed to be delivered. The initial savings estimate is calculated; as the 'initial spend estimated' X 'Savings Estimate %', where the 'Savings Estimate %' is based on the selected 'Estimated Savings Level' and the selected 'Category Type', as shown in Table 7 below. The Estimated Savings Level is defined as 'Low', 'Med', and 'High' based on a set of defined criteria.

TABLE 7

| Category | Savings Estimate % | | |
|---|---|---|---|
| | Low | Med | High |
| IT | 6% | 7% | 9% |
| Travel | 8% | 12% | 14% |
| Facilities & Services | 5% | 10% | 15% |
| Professional Services | 5% | 10% | 15% |

For example, to determine the initial savings estimate for a project with following assigned parameters:
Initial Spend Estimate=$1,000,000 to $5,000,000;
Spend Category='IT';
Estimated Savings Level='High'
The following calculations are performed:
Initial Spend Estimate=($5,000,000+$1,000,000)/2=$3,000,000
Savings Estimate Potential=9% for 'IT' Category with 'High' Estimated Savings Level
Initial Savings Estimate=$3,000,000×9%=$270,000

Accordingly, the assessment parameter for the project as shown in Table 7 is $270,000.

Demand management 300 may also include the functionality of defining project level parameters to define the primary location of the project and the project owner. The primary project location represents the location primarily responsible for the delivery of the project. For Example, if a work request is raised in Germany and the project is scheduled for completion by resources in both Germany and Bratislava then the primary location is Germany. In one example, the primary project location is not used when scheduling the project as the location dimension used in the scheduling algorithm is defined at the task level allowing projects to be split and scheduled across multiple locations.

The project owner is the person with overall accountability for delivery of a project. In one example, the project owner field is not used when scheduling the project which means the project owner may not necessarily be scheduled the project if this is not the optimum resource assignment. White the project owner may not be scheduled the project, they are however responsible for overseeing the overall delivery of the project and is normally a more senior member of a team, such as a team lead.

Demand management 300 may also include the functionality of selecting project tasks and standard task estimates. This involves selecting the set of tasks required to complete the project. All tasks should be selected from a standard task list, with each task having a Standard Processing Time which represents the estimated time spent completing a task in absolute hours being stored as the capacity requirement parameter for the task, and a Standard Elapsed Time which represents the estimated total elapsed time in weeks to complete a task based on the selected task complexity, e.g., low, med, or high. The Standard Elapsed Time may be stored as the time frame parameter for the task.

The Standard Processing Time and the Standard Elapsed Time may be derived historical based on the actual times taken to complete various tasks with differing levels of complexity. These standard estimates are then used to schedule a project into the future and to establish scheduled start and end dates for all tasks in a project and for the overall project. Resources assigned to a task should focus on completing all tasks within the allocated time to avoid delays in delivering the project and in delivery future projects that have been scheduled to a resource.

By way of example, the standard processing time and the standard elapsed time for the tasks listed below in Table 8 is determined based on task complexity. The task complexity may be represented by the task volume parameter.

TABLE 8

| ID | Tasks | Complexity |
|---|---|---|
| 1 | Collect and analyze data | Med |
| 4 | Conduct industry analysis | High |
| 6 | Develop category strategy | High |

Table 9 below is an example task estimate matrix used to determine standard processing time and the standard elapsed time based on task complexity.

TABLE 9

| | | Low Complexity | | Med Complexity | | High Complexity | |
|---|---|---|---|---|---|---|---|
| ID | Tasks | Processing (hrs) | Elapsed (weeks) | Processing (hrs) | Elapsed (weeks) | Processing (hrs) | Elapsed (weeks) |
| 1 | Collect and analyze data | 20 | 1 | 60 | 3 | 100 | 5 |
| 2 | Segment Purchases | 10 | 1 | 15 | 2 | 20 | 3 |
| 3 | Validate & profile category | 5 | 1 | 10 | 1 | 15 | 2 |
| 4 | Conduct industry analysis | 20 | 1 | 30 | 1 | 40 | 2 |
| 5 | Build TCO Model | 20 | 1 | 60 | 3 | 100 | 6 |
| 6 | Develop category strategy | 10 | 1 | 15 | 2 | 20 | 3 |
| 7 | Create, distribute & coordinate vendor RFI | 5 | 1 | 10 | 2 | 15 | 2 |
| 8 | Analyze RFI results & create supplier long list | 4 | 1 | 8 | 1 | 12 | 2 |
| 9 | Create, distribute & coordinate vendor RFx | 20 | 1 | 60 | 3 | 100 | 5 |
| 10 | Analyze RFx results & create supplier short list | 10 | 1 | 15 | 2 | 20 | 3 |

Based on the above matrix, the standard processing time and the standard elapsed time for each task is as shown in Table 10 below.

TABLE 10

| Tasks | Processing (Hrs) | Elapsed (Wks) |
|---|---|---|
| Collect and analyze data | 60 | 3 |
| Conduct industry analysis | 40 | 2 |
| Develop category strategy | 20 | 3 |

Demand management 300 may also include the functionality of setting task parameters. Each task may have a preferred location selected where the task should be completed and an indication as to whether or not category experience is required to complete the task. Defining a project by a set of tasks, by location, by category experience is how demand is defined so it can be matched to available resources from the selected location, with the necessary skill profile and category experience, if a resource profile is not available for an entity to perform the task, it may be assumed that an infinite amount of capacity exists at the entity to complete the task. This enables tasks due for completion by the entity to be scheduled as part of the overall project, and for the scheduled start and end dates, and task dependencies to be communicated to the entity.

Demand management 300 may also include the functionality of forced resource assignments for a specific resource to be manually assigned to a specific task. This functionality may be used in exceptional cases where a specific resource must complete a task, as manually forcing the assignment of resources to specific tasks will reduce the optimization potential of the scheduling algorithm by reducing the potential number of task to resource combinations.

Demand management 300 may also include the functionality of setting task dependencies to allow dependencies between tasks within a single project to be setup so the tasks are able to be scheduled with consideration to other dependant tasks within the project. A task dependency exists between one or more tasks, and all dependant tasks can not be scheduled to start until after the scheduled end date of all predecessor tasks.

Demand management 300 may also include the functionality of to create bundled groups of tasks within a single project so all tasks in the bundled group are assigned to a single resource. The purpose of this functionality is to create logical grouping of tasks that could be assigned to a single resource. For example, a project containing seven tasks may have three tasks that could be completed by a single resource located off-shore, and four tasks that could be completed by a single resource on-shore. Bundling the tasks into tow groups and defining the tasks parameters accordingly (i.e. preferred location as either on-shore or off-shore) will enable the project to be split across two resources in two different locations. Failure to bundle tasks could result in the seven tasks being assigned to seven different resources which is obviously not a practical solution. When initially setting up a project with multiple tasks, the default configuration may be for all tasks to be created within a single bundle. This ensures that the default is for all tasks in a project to be completed by a single resource.

Demand management 300 may also include the functionality of de-assigning a resource from a task to remove an assigned resource from a task as there may be times when the assigned resource should not or can not complete a task. For example, if a resource is currently working on a project, and a higher priority project is requested which requires that specific resources skills to complete, then the option should exist to de-assign the resource from his current task so he has available capacity to complete the higher priority project. Another option may be to place the task that is current in-progress to an on-hold status with a restart date set for some time in the future so the resources capacity is freed up to work on the project of higher priority.

Demand management 300 may also include the functionality of canceling a task or project. If a task within a project or an entire project is no longer going to be completed, the canceling functionality enables users to cancel either the task or the entire project. When canceling a task within a project there can be a check to ensure that the task is not part of a dependency within the project. If the task is part of a dependency the user should first remove the project dependencies before canceling the tasks. Also if a project or task is current in progress there should be a warning message to inform the user that the task or project they are attempting to cancel is already in progress.

Demand management 300 may also include the functionality of placing a task or a project on-hold to place either a task within a project or an entire project on-hold. Tasks or projects may be placed on-hold if external factors limit the ability to progress further with the project or task, or in order to free-up the capacity of a resource assigned to the task to work on projects with a higher priority. The user may set a task or project to a status of on-hold either indefinitely, or until a specific point in time in the future when the task or project can be recommenced in the future. When placing a task or project on-hold indefinitely, the task or project will not be considered for scheduling until a specific restart date has been set. Once a specific re-start date has been set for the future, the task or project will then be rescheduled to commence on the specified date, with the status remaining as on-hold until the week that the project is scheduled to restart.

Demand management 300 may also include the functionality of setting projects as "Ready to be Scheduled" so that projects are only considered for scheduling once the users has indicated that the project is 'Ready to be scheduled'. Before this point the project remains in a status of 'New Request' allowing the resource to continue setting up a project over a period of time. When setting a project as 'Ready to be scheduled' the system should perform a check on the validity of the parameters used in setting up the project to ensure that the project has at least one valid scheduling solution, e.g. all tasks/task bundles in the project must have at least one valid resource combination that matches the location, task profile, and category experience required to complete the task. If a valid combination does not exist the project should not be able to be set to a status of 'Ready to be scheduled'. The user must then address the resource constraint by either adjusting the profile of a user to match the requirements of the project, or adjust the parameters used in the projects to match the profiles of the available resources.

Demand management 300 may also include the functionality of Prioritizing Projects. Projects may be initially prioritized based on 'Initial Savings Estimate', then 'Initial Spend Estimate', then 'Business Criticality'. While this criterion should be used to initially prioritize projects, users may also have the ability to re-prioritize projects based on feedback from project monitoring. For example, if there is a project with zero spend and zero savings then its initial priority ranking will be low compared with other projects having both savings and spend. This project, however, may be critical to a client's operations. The client will then have the choice to re-prioritize this project relative to all other projects that are either in-progress, or in the project pipeline. Moving a project above another project in the priority list means that the project is of higher importance and as a result should be scheduled to available capacity before the lower ranked project when scheduled in the same scheduling priority-phase which is based on the status of the project.

The following example rules may be implemented to allow effective prioritizing and re-prioritization of projects:

1) For projects to be re-prioritized an additional field should be created call the 'Adjusted Savings'. This value represents the perceived value of a project. For example, if a project with 'Initial Savings Estimated' equal to $0 is re-prioritized above a project with an 'Initial Savings Estimated' equal to $100, then the project with zero savings is perceived to have a value of at least $100 as this is the savings potential of the project it replaced.

2) All new projects will initially set Initial Estimated Savings equal to Adjusted Savings Estimate before any manually priority adjustment is made 3) Projects will be sorted by Adjusted Savings, then by Initial Spend Estimate, then by Business Criticality 4) If a project that has a priority ranking lower than five is adjusted to priority ranking five, the Adjusted Savings field should be set to equal to the Adjust Savings value for project five which it has now been moved below, with all projects with priority less than project five being assigned the Adjusted Savings project of the project directly under them in the priority list.

5) The Priority Ranking field will be assigned sequentially from one through to N for a set of N projects based on the sort order of Adjusted Savings, Initial Spend Estimate and Business Criticality.

6) Any newly created projects will have Adjusted Savings equal to Initial Estimated Savings and should be inserted into the complete set of N projects based on Adjusted Savings, initial Spend Estimate, and Business Criticality.

7) The Adjusted Savings field is only used to rank projects and should not be made visible to the user.

For example, an initial set of 10 projects are created and sorted based on initial Savings Estimate, then Initial Spend Estimate, then Business Criticality, as shown in Table 11 below.

TABLE 11

| Priority Ranking | Project Number | Adjusted Savings | Initial Savings Estimate | Initial Spend Estimate | Business Criticaility |
| --- | --- | --- | --- | --- | --- |
| 1 | 100 | $1,000,000 | $1,000,000 | $25,000,000 | 1 |
| 2 | 200 | $800,000 | $800,000 | $20,000,000 | 2 |
| 3 | 300 | $500,000 | $500,000 | $15,000,000 | 1 |
| 4 | 400 | $500,000 | $500,000 | $10,000,000 | 3 |
| 5 | 500 | $300,000 | $300,000 | $12,000,000 | 2 |
| 6 | 600 | $200,000 | $200,000 | $10,000,000 | 1 |
| 7 | 700 | $200,000 | $200,000 | $7,000,000 | 3 |
| 8 | 800 | $0 | $0 | $17,000,000 | 2 |
| 9 | 900 | $0 | $0 | $12,000,000 | 1 |
| 10 | 1000 | $0 | $0 | $12,000,000 | 3 |

Project number 900 is manually adjusted to the second highest priority project and the Adjusted Savings is set to $800,000 which is the Adjusted Savings value of the project which project 900 was prioritized above. All projects ranked below project 900 are then moved down one project ranking and the 'Adjusted Savings' values are moved to the project directly beneath them, as shown in Table 12 below.

TABLE 12

| Priority Ranking | Project Number | Adjusted Savings | Initial Savings Estimate | Initial Spend Estimate | Business Criticaility |
| --- | --- | --- | --- | --- | --- |
| 1 | 100 | $1,000,000 | $1,000,000 | $25,000,000 | 1 |
| 2 | 900 | $800,000 | $0 | $12,000,000 | 1 |
| 3 | 200 | $500,000 | $800,000 | $20,000,000 | 2 |
| 4 | 300 | $500,000 | $500,000 | $15,000,000 | 1 |
| 5 | 400 | $300,000 | $500,000 | $10,000,000 | 3 |
| 6 | 500 | $200,000 | $300,000 | $12,000,000 | 2 |
| 7 | 600 | $200,000 | $200,000 | $10,000,000 | 1 |
| 8 | 700 | $0 | $200,000 | $7,000,000 | 3 |
| 9 | 800 | $0 | $0 | $17,000,000 | 2 |
| 10 | 1000 | $0 | $0 | $12,000,000 | 3 |

During the next planning cycle three hew projects are entered into the Work Allocation Model as indicated in Table 13 below, with the 'Adjusted Savings' value set equal to the 'Initial Savings Estimate'

TABLE 13

| Priority Ranking | Project Number | Adjusted Savings | Initial Savings Estimate | Initial Spend Estimate | Business Criticaility |
| --- | --- | --- | --- | --- | --- |
| NA | 1100 | $500,000 | $500,000 | $20,000,000 | 2 |
| NA | 1200 | $900,000 | $900,000 | $10,000,000 | 1 |
| NA | 1300 | $0 | $0 | $20,000,000 | 1 |

The three new projects are inserted into the existing Project Priority list based on Adjusted Savings, Initial Spend Estimate and Business Criticality, as shown in Table 14 below.

TABLE 14

| Priority Ranking | Project Number | Adjusted Savings | Initial Savings Estimate | Initial Spend Estimate | Business Criticaility |
| --- | --- | --- | --- | --- | --- |
| 1 | 100 | $1,000,000 | $1,000,000 | $25,000,000 | 1 |
| 2 | 1200 | $900,000 | $900,000 | $10,000,000 | 1 |
| 3 | 900 | $800,000 | $0 | $12,000,000 | 1 |
| 4 | 200 | $500,000 | $800,000 | $20,000,000 | 2 |
| 5 | 1100 | $500,000 | $500,000 | $20,000,000 | 2 |
| 6 | 300 | $500,000 | $500,000 | $15,000,000 | 1 |
| 7 | 400 | $300,000 | $500,000 | $10,000,000 | 3 |
| 8 | 500 | $200,000 | $300,000 | $12,000,000 | 2 |
| 9 | 600 | $200,000 | $200,000 | $10,000,000 | 1 |
| 10 | 700 | $0 | $200,000 | $7,000,000 | 3 |
| 11 | 1300 | $0 | $0 | $20,000,000 | 1 |
| 12 | 800 | $0 | $0 | $17,000,000 | 2 |
| 13 | 1000 | $0 | $0 | $12,000,000 | 3 |

Note the project 1100 is ranked above project 300 because it has a higher Initial Spend Estimate and equivalent Adjusted Savings; project 1200 is ranked below project 900 because it has a higher Adjusted Savings; and project 1300 is ranked above project 800 because it has a higher Initial Spend Estimate and equivalent Adjusted Savings.

Project 1300 is manually adjusted to the highest ranked project and the Adjusted Savings is set to=$1,000,000, while all projects ranked below project 1300 are moved down one project ranking and there 'Adjusted Savings' value are moved to the project directly beneath them, as shown in Table 15 below.

TABLE 15

| Priority Ranking | Project Number | Adjusted Savings | Savings Estimate | Estimated Baseline Spend | Business Criticaility |
| --- | --- | --- | --- | --- | --- |
| 1 | 1300 | $1,000,000 | $0 | $20,000,000 | 1 |
| 2 | 100 | $900,000 | $1,000,000 | $25,000,000 | 1 |
| 3 | 1200 | $800,000 | $900,000 | $10,000,000 | 1 |
| 4 | 900 | $500,000 | $0 | $12,000,000 | 1 |
| 5 | 200 | $500,000 | $800,000 | $20,000,000 | 2 |

TABLE 15-continued

| Priority Ranking | Project Number | Adjusted Savings | Savings Estimate | Estimated Baseline Spend | Business Criticaility |
|---|---|---|---|---|---|
| 6 | 1100 | $500,000 | $500,000 | $20,000,000 | 2 |
| 7 | 300 | $300,000 | $500,000 | $15,000,000 | 1 |
| 8 | 400 | $200,000 | $500,000 | $10,000,000 | 3 |
| 9 | 500 | $200,000 | $300,000 | $12,000,000 | 2 |
| 10 | 600 | $0 | $200,000 | $10,000,000 | 1 |
| 11 | 700 | $0 | $200,000 | $7,000,000 | 3 |
| 12 | 800 | $0 | $0 | $17,000,000 | 2 |
| 13 | 1000 | $0 | $0 | $12,000,000 | 3 |

In one example, resource management 310 may include the functionality of adding a new resource to add a new resource in the work allocation model. Each resource should have a nominated work location; work level; email address; user ID and password; available capacity for scheduled work, and resource skill profile. Resources should also be able to be flagged as inactive. This ensures that work is not scheduled to resources that can no longer have work scheduled to them, for example if an employee leaves the organization.

Resource management 310 may also include the functionality of defining a resource's available capacity. In one example, a resource's available capacity may be defined by two variables: 1) the number of hours that a resource works in a single week; and 2) the percentage of time that a resource should have reserved for activities that are not scheduled by the work allocation model (i.e. Non-Scheduled Time Reserve). Non-scheduled activities include team meetings, unplanned leave, and work requests requiring less than four hours to complete.

For example, resource A is a highly skilled sourcing specialist contracted to work 40 hours per week. As resource A is a sourcing specialist the majority of his time should be spent working on savings or cost avoidance projects. For reason resource A's non-scheduled time reserve is only set to 20%; i.e. 80% of resources A's. working time should be spent on scheduled sourcing project work. Therefore the total available capacity that resource A has for work that is scheduled by the work allocation model=40 hours×(1−20%)=32 hours per week.

Resource management 310 may also include the functionality of defining a resources skill profile. A resources skill profile should be defined by 1) the tasks that a resource is able to have scheduled to them; and 2) the categories that a resource is able to work on. Tasks should be selected from a standard list of tasks that can be scheduled within the work allocation model, and categories should be selected from the standard list of categories that commodities are classified by for the client.

Resource management 310 may also include the functionality of viewing all resources for viewing a list of all resources in a single view. When a resource in the list is highlighted a summary of their task profile and category experience should be displayed in the bottom half of the screen.

Resource management 310 may also include the functionality of entering planned absences resulting from training, holiday, vacation, etc. When entering a planned absence the start and end date should be entered to ensure work is not scheduled to the resource while they are not available. As resources may at times be partially available the functionality should exist to allow the percentage of time that a resource may be partially available during a planned absence to be entered.

In one example, project scheduling 320 may include the functionally of scheduling optimization. Optimizing a schedule may result in savings, and in one example the optimization of a schedule generates a display that shows the Savings per Day and Spend per Day that the proposed optimized schedule would provide. This enables the impact of changes in either project setup or priority to be quantified by comparing Savings and Spend per Day results for multiple scheduling scenarios with different project setup and project priority. In one implementation, the user may run multiple schedules within a week to enable modeling of alternate scenarios in order to refine the final schedule.

Project scheduling 320 may also include the functionality of refining project setup and project priorities. A user may have two possible options available when refining a schedule; adjusting project priorities or changing the parameters used to setup a project. In order for the schedule to be easily refined with multiple scheduling scenarios able to quickly run, a user may access a project setup environment for an individual project and the project priority list.

Project scheduling 320 may also include the functionality of viewing scheduled and unscheduled projects. Once the schedule has been generated users may view the results of the schedule at a project level. Information that may be displayed at a project level are: Priority Ranking; Project Name; Project Location; Requested Start Date; Requested End Date; Scheduled Start Date; Scheduled End Date; Project Status; Delay between Requested End Date and Scheduled End Date. Users should also be able to easily identify all projects which were unable to be scheduled in order to know where constraints for individual projects need to be resolved.

Project scheduling 320 may also include the functionality of viewing task assignments and viewing weekly task assignments. Once the schedule has been generated users may easily view the results of the schedule at a task level. Information that may be displayed at a task level may include: Project Name; Task Name; Assigned Resource; Resource Location; Scheduled Start Date; Scheduled End Date; Planned Hours (for total task); Task Status. Users should also be able to view the allocation of planned hours for a task by week. For Example if a task is scheduled across three weeks with a total planned duration of 30 hours, the user may view how the 30 hours are distributed across the three weeks.

Project scheduling 320 may also include the functionality of de-assigning a resource from a task. When viewing task assignments, the user may have tie option to remove the assignment of a resource from a single task if the resource assignment needs to be changed. Once the user had de-assigned a resource from a task, the user may enter the project setup and force a resource assignment of an alternate resource before re-running the schedule to ensure the same resource is hot once again assigned to the task when the schedule is run.

In one example, project status entry 330 may include the functionality of weekly status entry for each weekly cycle. Each resource may enter status for all tasks they have worked on in a given week. The resource may enter, save and change entries before finally submitting the status entry for the week.

In one example, entering status for each weekly cycle includes four time categories. The first category is time for assigned projects and tasks. Assigned projects and tasks are the tasks that have been assigned to a specific resource. Users may review the total planned Hours for the task; the total cumulative actual hours already spent on the task; the remaining hours that may be spent on the task; and the planned hours for the week that time is being entered. When entering status, users may enter the actual hours spent on the task during the week; the estimated time to complete the task; and the estimated elapsed days to complete the task. When tasks are complete, users may flag them as complete so they are no longer considered for scheduling.

The second category is time for projects and tasks not yet assigned. This functionality is useful for projects which have been entered into the work allocation mode) and the user has already started working on the task before it is actually scheduled. This functionality may be used for projects of high priority that are expedited. Users may enter the actual hours spent on the task during the week; the estimated time to complete the task; and the estimated elapsed days to complete the task. Users may also flag a task as complete.

The third category is entering time for tasks assigned to others. Users may enter actual hours spent on a task during the week for task not assigned to them if they have spent time working on the task.

The fourth category is entering time for non-scheduled activities. Users may enter actual hours spent on a non-scheduled task during the week. A non-scheduled task may be a task that does not have a defined work effort or elapsed days to complete or that otherwise cannot be scheduled. For example, a non scheduled task may include team meetings or unplanned leave. Capturing actual hours for non-scheduled tasks provides visibility into how resources are allocating all of their time in a week.

Reporting 340 may generate reports in a variety of ways. For example, users may generate individual reports or may generate reports based on variable filter criteria. Reports may be exported to different formats, such as PDF or spreadsheet formats.

Scheduling client sourcing work requests against available capacity may be based on classifications of demand and supply so the work requests can be matched against each available capacity to identify resources to complete specific types of work. In one example implementation, upon receipt of a work request, a project is setup in the work allocation model to satisfy this request. There may be a one to one relationship between a client sourcing request and a project within the model. When setting up the project, all tasks required within the project to satisfy the request may be entered, and all dependencies between tasks in the project setup to allow the correct scheduling order for tasks within a project to occur. A project is then setup comprising multiple tasks to satisfy the work requests. Each task within a project is primarily defined by a task name; a preferred location; and category experience requirements. Also all dependencies between tasks in the project may be setup to allow the correct scheduling order for tasks with a project to occur. Each resource is then defined by their resource profile which contains their location, the tasks they are qualified to complete, and the categories they can complete. Task type, category experience, and location are thus three common parameters that are used to match available resource capacity (supply) with projects that are setup to satisfy client sourcing work requests (demand).

A number of hierarchy structures may be used in the model to effectively optimize the scheduling of demand and supply across multiple locations. In one implementation, data hierarchies are configured to provide a structured approach to defining the vertical relationships between key data within the model. Example data hierarchies may include project hierarchy 400, task hierarchy 410, and geographic hierarchy 420.

Figure 9A:
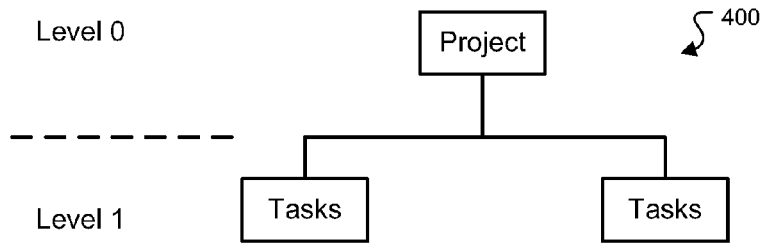
FIGS. 9A to 9D are example hierarchical structures for projects and tasks.
Figure 9B:
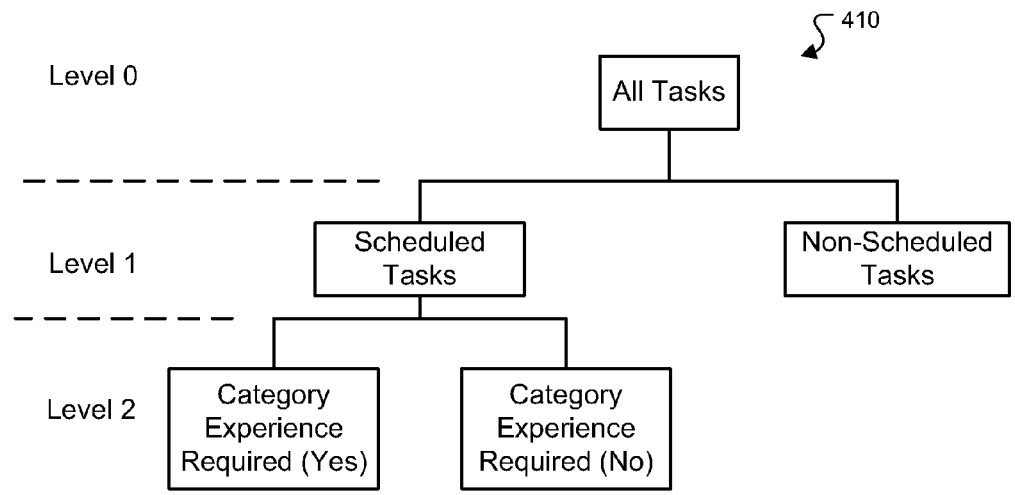

As shown in an example project hierarchy 400 of FIG. 9A, each project may contain one or more tasks that need to be completed in order to satisfy the request. A single project may be created to satisfy a single work request. As shown in FIG. 9B, all tasks within a project may be classified as either "Scheduled" or "Non-Scheduled" according to an example task hierarchy 410. Scheduled Tasks are tasks with standard work effort and elapsed time estimate enabling the task to be scheduled with a defined start and end date. When defining scheduled tasks the user may select whether category experience is required to complete the task. In one example, when category experience is required, only resources with the category experience required to complete the task and the required task profile can be considered.

Non-Scheduled Tasks are tasks which are not scheduled as part of a project because they do not have any standard work effort or elapsed time estimates. Users may record actual time spent completing non-scheduled tasks when completing their weekly status reports to capture how resources are actually allocating their time.

Figure 9C:
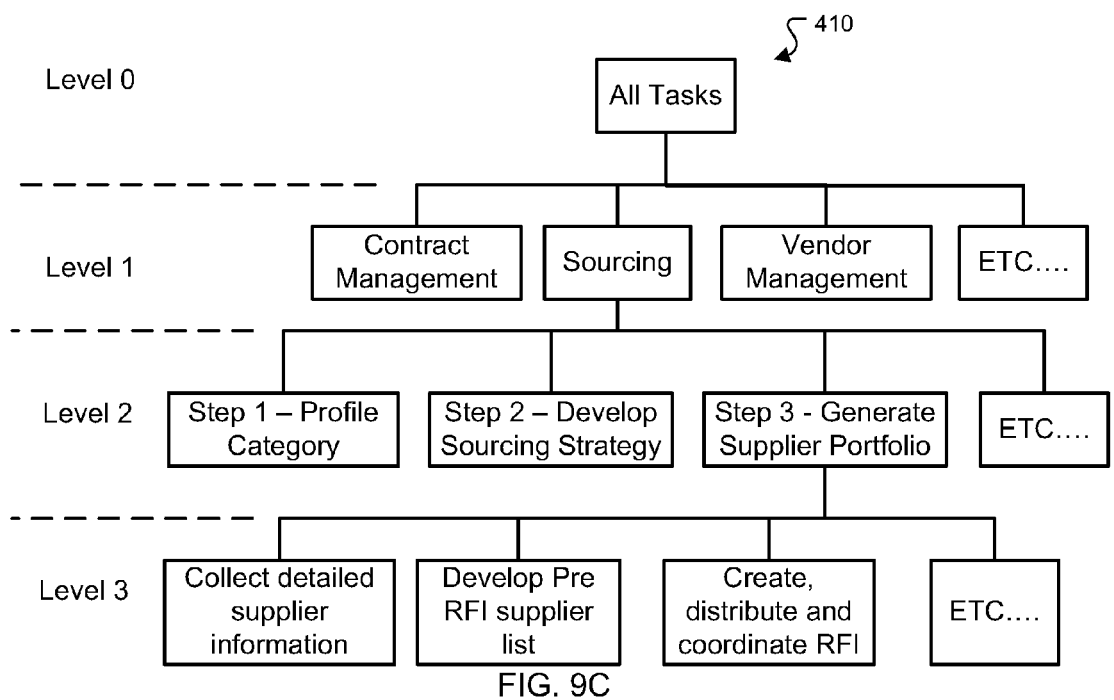

FIG. 9C represents another example task hierarchy 410 that exists in the work allocation model. Tasks represent the actual base level activities that may be performed in order for a client sourcing request to be completed, with each scheduled task having an associated deliverable. Projects may be defined by the set of tasks that are to be completed in order to satisfy a client request. Resources may also defined by the set of tasks they are qualified to complete, e.g., a resource task profile.

The task hierarchy 410 enables identification of tasks at the base level, e.g. level 3, when either selecting tasks as part of a project or when setting up the task profile of a resource. Drilling down through the hierarchy provides a logical grouping of all tasks so that tasks are more easily identified.

The task hierarchy 410 also enables actual time recorded at the task level to be aggregated to a higher level for reporting purposes. For example, rather than reporting the percentage split of time spent across each task within the model, time can be reported as a percentage of time split across each of the seven sourcing steps, a percentage of time split across contract management, sourcing and vendor management, etc.

Figure 9D:
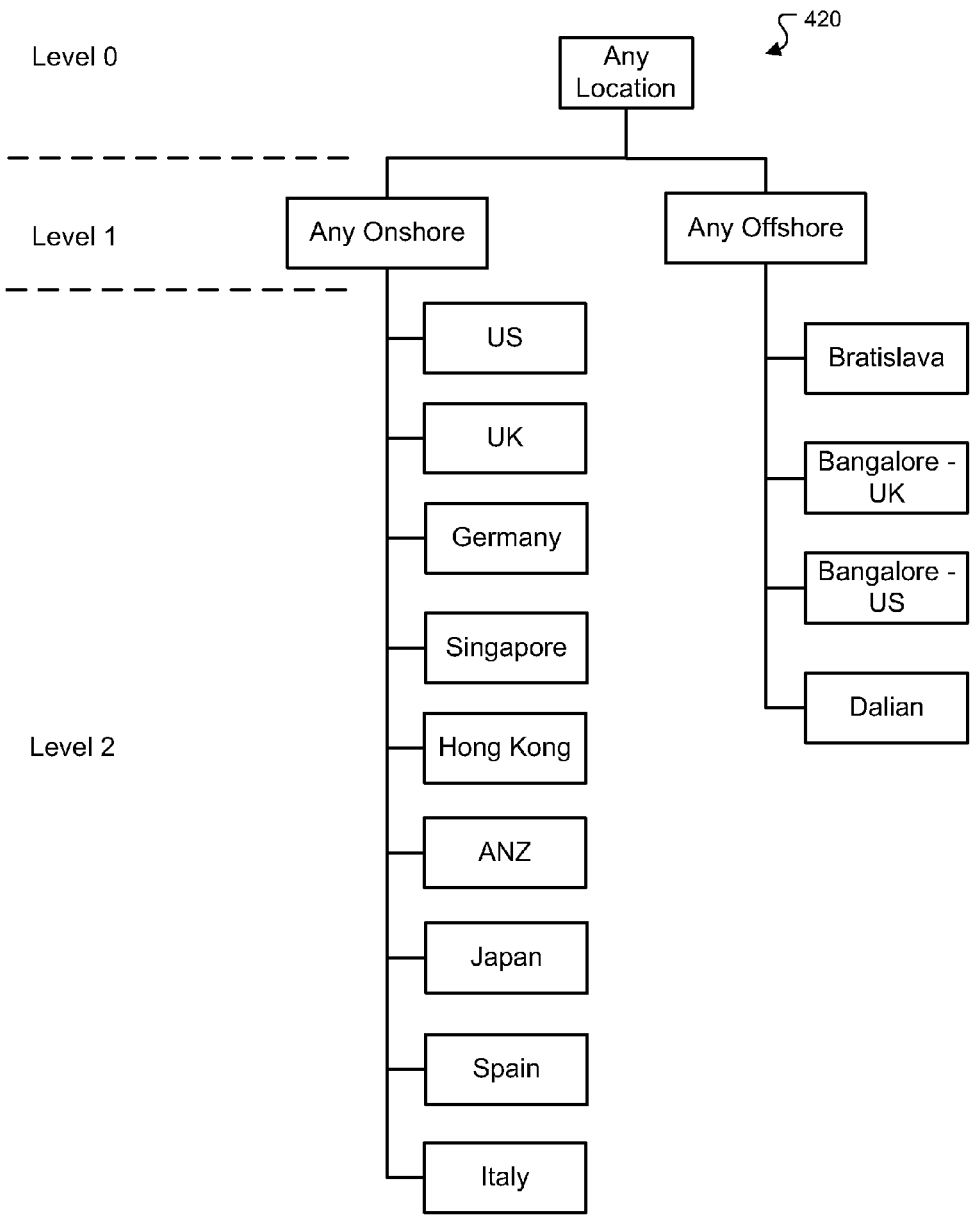

FIG. 9D represents an example geographic hierarchy 420. Locations may be grouped into onshore locations and offshore locations. Resources within the model may be aligned to a single location that is classified as either onshore or offshore. When defining a project to satisfy a work request, the tasks within a project may have a specific preferred location where the tasks may be completed. For example, if a task must be completed in a German on-shore location, then the location requirement is specified in the task parameters when setting up a project in the model. This will result in the task being able to only be assigned to a resource located in Germany.

Tasks may also be defined as being able to be completed in either "Any Onshore Location" or "Any Offshore Location". This results in all available resources located in Onshore or Offshore locations respectively being considered to complete the tasks. Where the location that the task is performed is not important "Any Location" may be selected which will result in all APS resources globally being considered to complete the task.

Figure 10:
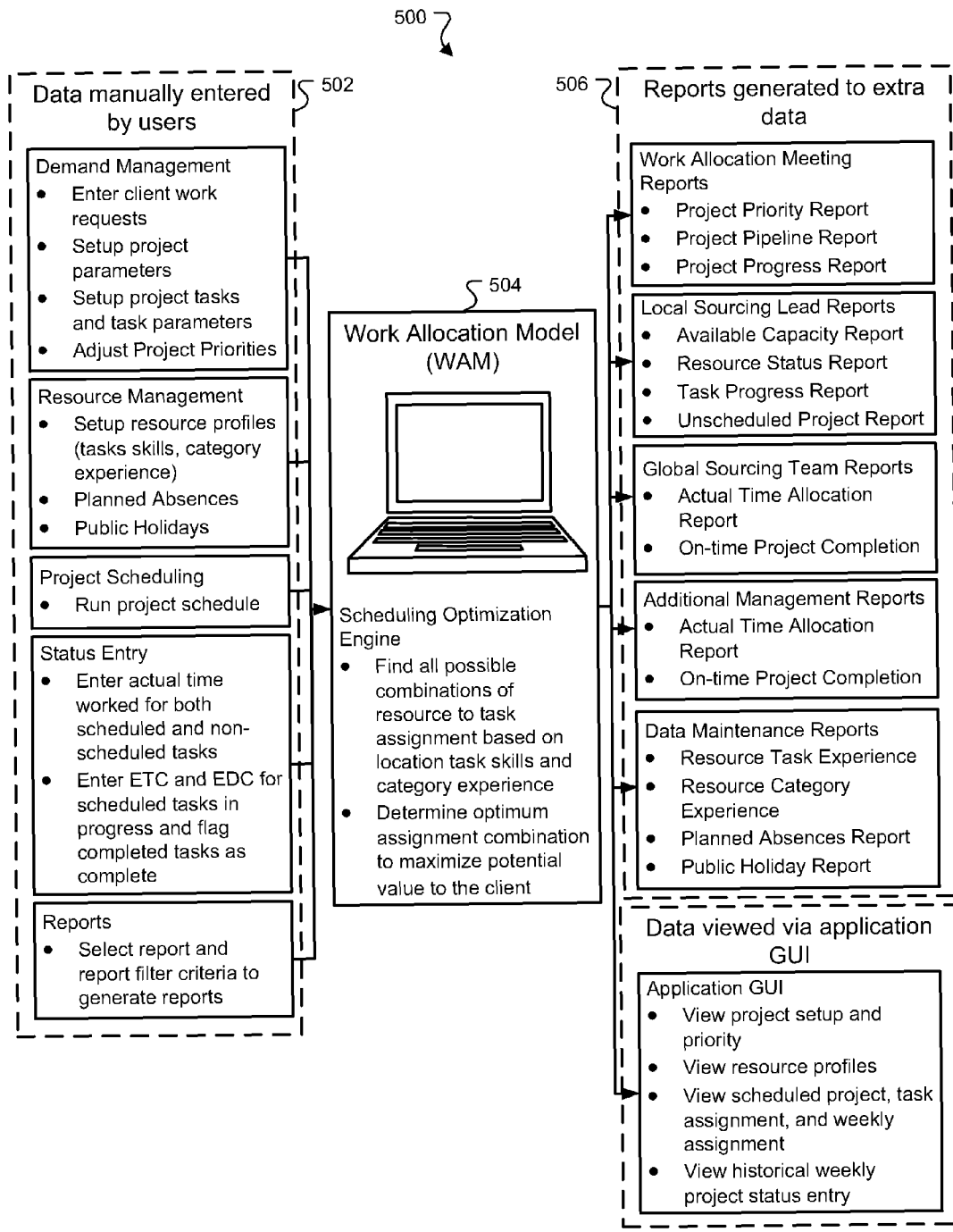
FIG. 10 is a data element diagram for the example work allocation model.

FIG. 10 is a data element diagram for the example work allocation model. The data element diagram includes a summary of the data elements 502 manually entered into the work allocation model by the users, functions 504 performed by the work allocation model to process this data, and reports 508 and data views available for the user to extract and view information generated by the work allocation model.

The work allocation model may optimize the scheduling of work requests with available resource capacity. An optimization process may compute all possible resources assignments to project tasks and select the resources assignment solution that generates the largest potential value in the shortest period of time to the client. In one example, the optimization process comprises five steps: building the project and task priority list; identifying the scheduling solution set; scheduling tasks to available resource capacity; optimizing the schedule; and updating the project and task status.

In the example service sector implementation, projects may be prioritized based on an Adjusted Savings Estimate criterion, then on an Initial Spend Estimate criterion, and then on a Business Criticality criterion. These criteria are used to generate the priority order that projects may be scheduled.

Prioritization is also based on the dependencies between tasks within each specific project. For each project listed in priority order the next level is to prioritize the order in which tasks within a project are scheduled. The only factor that drives the order of the task list within a project is the dependencies between the tasks.

The prioritization based on these criteria and dependencies is similar to the prioritization process described with respect to Tables 11-15 and FIGS. 4A and 4B above.

Once the project priority and ordered task list have been created, the complete set of resources able to complete each task may be identified. The identification of possible resources able to complete a task is achieved by matching the task, preferred location and category experience of a specific task with the task profile, category experience and location of resource such as described with respect to Table 3 above. Likewise, scheduling tasks to available resource capacity and may be achieved by a process such as the process described with respect to Tables 5A-5K above.

In the example service sector implementation, the scheduling of tasks within projects to available resources may also be optimized by an optimization process. For optimization, projects may be categorized into three possible groups: savings projects, spend projects, and other projects.

Saving projects, which correspond to assessment processes in as described in the previous example, each have a savings potential that is specified when setting up the project. Spend projects, which correspond to volume processes described in the previous example, have an initial spend estimate but do not have a savings potential. Finally, all other projects may be generally categorized as "Other" projects.

The scheduling algorithm evaluates a score for each project, once all of its tasks are assigned to a set of resources. The calculation of the score may be different for each project type. For the savings projects, the benefit may be defined as delivering the maximum savings in the shortest amount of time. For the spend projects, the benefit may be defined as delivering the maximum spend in the shortest amount of time. For the other type of projects, the benefit may be defined as delivering the projects in the shortest amount of time.

The score for the savings projects (savings score) may be calculated dividing the adjusted savings value by the number of elapsed days until the project completion. The number of elapsed days until the project completion represents the schedule parameter for each project. The score for the spend projects (spend score), may be calculated by dividing the adjusted spend value by the number of elapsed days until the project completion.

For example, the solution set in Table 16 below has twelve possible tasks to resource assignment combinations based on the defined task parameters and resource profiles.

TABLE 16

| Project Name | Task # | Task | Bundle ID | Preferred Location | Category Experience | Potential Resource |
|---|---|---|---|---|---|---|
| Project 1 | P1T1 | Collect and analyse spend data | 1 | Br | Not Required | R1, R2 |
| Project 1 | P1T2 | Conduct supply market analysis | 2 | Germany | IT - Hardware | R3 |
| Project 1 | P1T3 | Access current sourcing practices | 2 | Germany | IT - Hardware | R3 |
| Project 1 | P1T4 | Develop category profile summary | 2 | Germany | IT - Hardware | R3 |
| Project 2 | P2T1 | Create, distribute & coordinate RFP | 1 | Any Onshore | IT - Hardware | R3, R8, R9 |
| Project 2 | P2T2 | Analyze RFP responses | 1 | Any Onshore | IT - Hardware | R3, R8, R9 |
| Project 2 | P2T3 | Develop supplier shortlist for negotiation | 1 | Any Onshore | IT - Hardware | R3, R8, R9 |
| Project 3 | P3T1 | Develop for negotiation strategies | 1 | Germany | IT - Hardware | R3 |
| Project 3 | P3T2 | Conduct vendor negotiation | 1 | Germany | IT - Hardware | R3 |
| Project 4 | P4T1 | Develop supplier negotiation strategies | 1 | Germany | IT - Software | R3, R4 |
| Project 4 | P4T1 | Conduct vendor negotiation | 1 | Germany | IT - Software | R3, R4 |

Table 17 lists all possible task to resource assignment combinations.

TABLE 17

| Project Name | Task # | Opt 1 | Opt 2 | Opt 3 | Opt 4 | Opt 5 | Opt 6 | Opt 7 | Opt 8 | Opt 9 | Opt 10 | Opt 11 | Opt 12 |
|---|---|---|---|---|---|---|---|---|---|---|---|---|---|
| Project 1 | Task 1 | R1 | R2 | R1 | R2 | R1 | R2 | R1 | R2 | R1 | R2 | R1 | R2 |
| Project 1 | Task 2 | R3 | R3 | R3 | R3 | R3 | R3 | R3 | R3 | R3 | R3 | R3 | R3 |
| Project 1 | Task 3 | R3 | R3 | R3 | R3 | R3 | R3 | R3 | R3 | R3 | R3 | R3 | R3 |
| Project 1 | Task 4 | R3 | R3 | R3 | R3 | R3 | R3 | R3 | R3 | R3 | R3 | R3 | R3 |
| Project 2 | Task 1 | R3 | R8 | R9 | R3 | R8 | R8 | R8 | R9 | R9 | R9 | R9 | R9 |
| Project 2 | Task 2 | R3 | R3 | R3 | R3 | R8 | R6 | R8 | R6 | R9 | R8 | R8 | R9 |
| Project 2 | Task 3 | R8 | R8 | R8 | R3 | R8 | R8 | R8 | R8 | R9 | R9 | R9 | R9 |
| Project 3 | Task 1 | R3 | R3 | R3 | R3 | R3 | R3 | R3 | R3 | R3 | R3 | R3 | R3 |
| Project 3 | Task 2 | R3 | R3 | R3 | R3 | R3 | R3 | R3 | R3 | R3 | R3 | R3 | R3 |
| Project 4 | Task 1 | R3 | R3 | R4 | R4 | R3 | R3 | R4 | R4 | R3 | R3 | R4 | R4 |
| Project 4 | Task 2 | R3 | R3 | R4 | R4 | R3 | R3 | R4 | R4 | R3 | R3 | R4 | R4 |

Based on all possible tasks to resource assignments, there are twelve possible combinations for when the projects 1-4 could be completed, as listed in Table 18.

TABLE 18

| Project Name | Current Date | Opt 1 | Opt 2 | Opt 3 | Opt 4 | Opt 5 | Opt 6 | Opt 7 | Opt 8 | Opt 9 | Opt 10 | Opt 11 | Opt 12 |
|---|---|---|---|---|---|---|---|---|---|---|---|---|---|
| Project 1 | 6-Feb | 16-Feb | 13-Feb | 16-Feb | 13-Feb | 16-Feb | 13-Feb | 16-Feb | 13-Feb | 16-Feb | 13-Feb | 16-Feb | 13-Feb |
| Project 2 | 6-Feb | 22-Feb | 20-Feb | 22-Feb | 20-Feb | 14-Feb | 10-Feb | 14-Feb | 10-Feb | 17-Feb | 15-Feb | 17-Feb | 15-Feb |

TABLE 18-continued

| Project Name | Current Date | Opt 1 | Opt 2 | Opt 3 | Opt 4 | Opt 5 | Opt 6 | Opt 7 | Opt 8 | Opt 9 | Opt 10 | Opt 11 | Opt 12 |
|---|---|---|---|---|---|---|---|---|---|---|---|---|---|
| Project 3 | 6-Feb | 27-Feb | 24-Feb | 27-Feb | 24-Feb | 20-Feb | 17-Feb | 20-Feb | 17-Feb | 20-Feb | 17-Feb | 20-Feb | 17-Feb |
| Project 4 | 6-Feb | 06-Mar | 03-Mar | 14-Feb | 14-Feb | 27-Feb | 24-Feb | 14-Feb | 14-Feb | 27-Feb | 24-Feb | 14-Feb | 14-Feb |

Thus the savings score for each combination can be calculated by dividing the adjusted savings potential by the elapsed days until the project is complete. The scores (process assessment values) for each project are then added together for the combinations to determine the combination yielding the highest score.

The sum of the scores may represent the control parameter. The selection criterion is set to select the resource assignment having the highest control parameter. In this example, the resource assignment for option eight would be selected as it provides the maximum amount of potential savings per day, as indicated by the highest control parameter shown in Table 19.

TABLE 19

| Project Name | Adjusted Savings | Opt 1 | Opt 2 | Opt 3 | Opt 4 | Opt 5 | Opt 6 |
|---|---|---|---|---|---|---|---|
| Project 1 | 10,000,000 | 1000000 | 1428571 | 1000000 | 1428671 | 1000000 | 1428571 |
| Project 2 | 1,000,000 | 62500 | 71429 | 62500 | 71429 | 125000 | 250000 |
| Project 3 | 100,000 | 4762 | 5556 | 4762 | 5556 | 7143 | 9091 |
| Project 4 | 10,000 | 357 | 400 | 1250 | 1250 | 476 | 556 |
| Total Euro/Day | | 1067619 | 1505956 | 1068512 | 1506806 | 1132619 | 1688218 |

| Project Name | Adjusted Savings | Opt 7 | Opt 8 | Opt 9 | Opt 10 | Opt 11 | Opt 12 |
|---|---|---|---|---|---|---|---|
| Project 1 | 10,000,000 | 1000000 | 1428571 | 1000000 | 1428571 | 1000000 | 1428571 |
| Project 2 | 1,000,000 | 125000 | 250000 | 90909 | 111111 | 90909 | 111111 |
| Project 3 | 100,000 | 7143 | 9091 | 7143 | 9091 | 7143 | 9091 |
| Project 4 | 10,000 | 1250 | 1250 | 476 | 556 | 1250 | 1250 |
| Total/Day | | 1133393 | 1688912 | 1098528 | 1549329 | 1099302 | 1550023 |

When evaluating non-savings projects, the same process may be applied; however the adjusted spend value is used rather than the adjusted savings value when determining the score for all non-savings projects.

Projects may be optimized in three major phases with each major phase comprising three minor optimization phases. Optimization of the projects according to these scheduling phases is as described above. In this example, the three major phase and corresponding three minor phases areas follows:
1) In-Progress Project Lists (Phase I)
   a. Savings Projects that are in "In-Progress" status
   b. Spend Projects that are in "In-Progress" status
   c. Other projects that are in "In-Progress" status
2) Firm Project Lists (Phase II)
   a. Savings Projects that are in "Firm" status
   b. Spend Projects that are in "Firm" status
   c. Other projects that are in "Firm" status
3) Remaining Project Lists (Phase III)
   a. Savings Projects that are in "Early Start", "Scheduled" or "Unscheduled" status
   b. Spend Projects that are in "Early Start", "Scheduled" or "Unscheduled" status
   c. Other projects that are in "Early Start", "Scheduled" or "Unscheduled" status In one example implementation, the minor scheduling phases ensure priority is given to projects in the following order within each of the three major scheduling phases:
1) Savings Projects: Projects within a major scheduling phase that have an Adjusted Savings greater that zero;
2) Spend Projects: Projects within a major scheduling phase that have Adjusted Savings equal to zero and an Adjusted Spend greater than zero; and
3) Other projects: Projects within a major scheduling phase that have an Adjusted Savings equal to zero and an Adjusted Spend equal to zero.

Optimization may be repeated for scheduled and unscheduled projects. As previously described, a task may not be assigned to a resource if there is no resource available. Additionally, a project and its tasks may lose their scheduled status (e.g., In-Progress, Firm, Early-Start or Scheduled) if a particular task in the project can not be scheduled. In such situation, the assignments may need to be removed from the solution set that may cause scheduling gaps. Thus, as long as some tasks are de-assigned due to other tasks in the same project not being scheduled, the optimization process may be repeated until de-assignments are no longer necessary.

Figure 11:
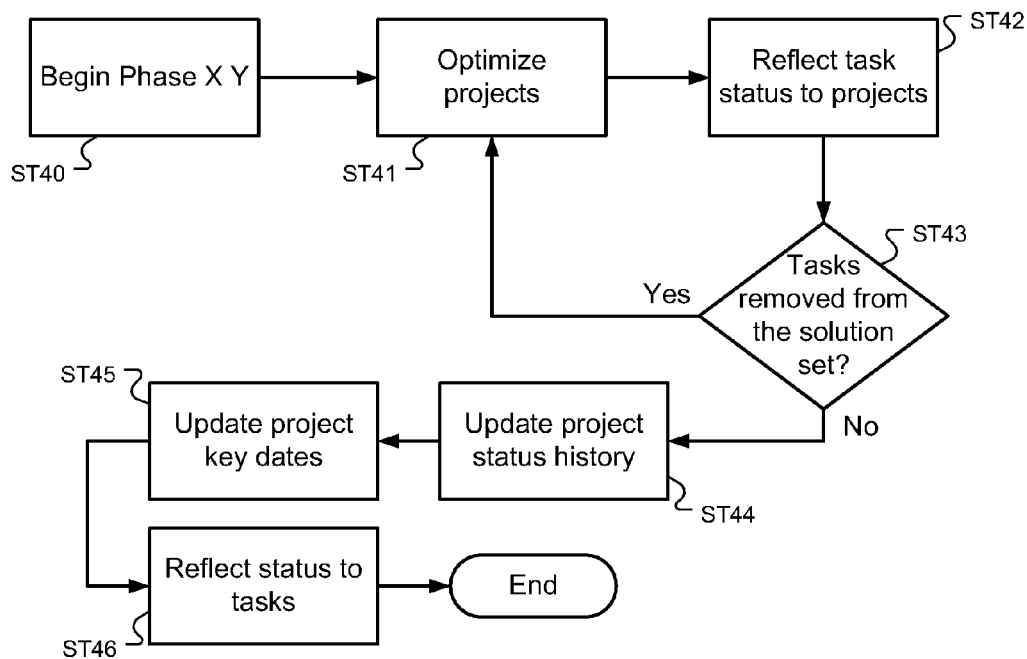
FIG. 11 is a flow diagram of a method for determining a status of a project.

FIG. 11 shows a flow diagram representing an exemplary process for determining a status of a project. Step ST40 begins a major (X) and minor (Y) optimization phase. Step ST41 optimizes the projects according to the corresponding major and minor phase. Step ST42 reflects the status of tasks to projects. Thereafter, step ST43 determines if tasks have been removed from the solution set. If tasks have been removed from the solution set, then the process returns to step ST41; otherwise, step ST44 updates the project status history. Thereafter, step ST45 updates project dates, and step ST46 reflects projects status to tasks.

Figure 12:
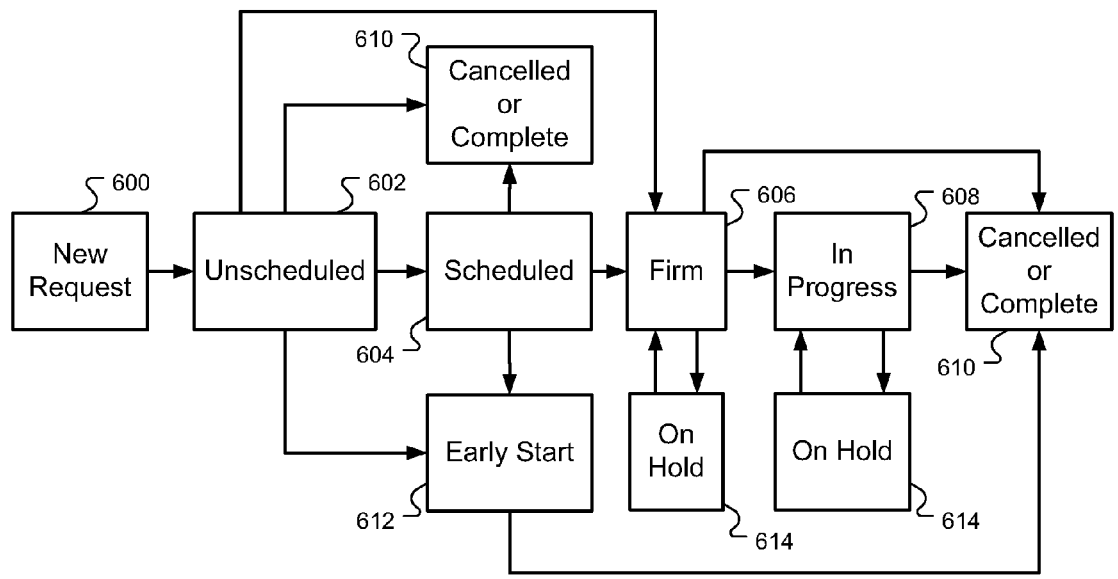
FIG. 12 is a state transition diagram for tasks and projects.

A solution set may be periodically updated for all project and task status. FIG. 12 shows a state transition diagram for tasks and projects and the potential categories and transitions. Periodic updates may include updates to scheduled start and end dates, original planned start and end dates, and actual start dates at the project and task level. A standard life cycle of a task or project begins with a new request status 200. Projects that are in the process of being setup and not ready to be scheduled may be associated with a new request status 600.

One the project or task is ready to be scheduled, the status is changed to an unscheduled status 202 to indicate that the project or task not yet scheduled is to be scheduled during the next scheduling process. Once the project or task is scheduled, its status is changed to the scheduled status 604.

Thereafter, once the project is due to start within a given time period, e.g., two weeks, the status is changed to a firm status 606. A firm status indicates the assigned resources are fixed for the project, the start and end dates can be committed to a client, and the project will now have scheduling priority over projects with a status of "scheduled."

Upon commencement of the project or task, the status is changed to an in-progress status 608. Projects or tasks with a status of in-progress may receive priority over other projects when optimizing the project schedule. Projects with a status of 'In-progress' get priority over all other projects when generating the project schedule.

Finally, upon completion, or upon cancellation of a project or task, the status is changed to canceled/completed status 610.

Status variations may also occur during a project or task life cycle. For example, a project or task having a status of unscheduled 602, scheduled 604 or firm 606 may be changed to canceled/completed status 610.

Alternatively, projects or tasks for which work has started before the scheduled start date or before a change to the firm status receive an early start status 612. Projects or tasks having an early status may be scheduled with the same priority as projects with a scheduled status. Finally, projects or tasks having a status of firm or in-progress may be placed on-hold, at which time the status is changed to the on-hold status 614.

In one example, project and task status and schedule dates may be updated according to the following sequence: updating project status based on scheduled task status; updating task status based on overall project status; updating task scheduled dates based on change in task status from a previous period (e.g., one week); and updating project scheduled dates based on changes in project status the previous period.

Table 22 summarizes how overall project status is determined according to the status of the underlying tasks within a project once task status has been updated for the given period.

TABLE 22

| Project Status Becomes | IF... | | | | |
|---|---|---|---|---|---|
| Unscheduled | at least one task | is | Unscheduled | | |
| Early Start | at least one task | is | Early Start | and | all others Unscheduled or Scheduled |
| Scheduled | all tasks | are | Scheduled | | |
| Firm | at least one task | is | Firm | | |
| In-Progress | at least one task | is | In-Progress | or in | Completed |
| On-Hold | all tasks | are | On-Hold | | |
| Completed | all tasks | are | Completed | | |

Task status may be updated based on overall project status. Table 23 summarizes how the new status of a project will be reflected back to its corresponding tasks once the schedule has been determined and new project statuses have been generated. The first row indicates the new project status that will be reflected to its underlying tasks, and the first column indicates the task status prior to reflecting the project status.

TABLE 23

| | Completed | In-Progress | Firm | Scheduled | Early Start | Unscheduled |
|---|---|---|---|---|---|---|
| Completed | x | No Change | No Change | No Change | N/A | No Change |
| In-Progress | N/A | x | N/A | N/A | N/A | No Change |
| Firm | N/A | No Change | x | N/A | N/A | Unscheduled |
| Scheduled | N/A | Firm | Firm | x | No Change | Unscheduled |
| Early Start | N/A | In-Progress | In-Progress | No Change | x | No Change |
| Unscheduled | N/A | N/A | N/A | N/A | N/A | x |
| On-Hold | N/A | N/A | N/A | N/A | N/A | N/A |

Task schedule dates may also be updated based on changes in task status from a previous period. Table 24 illustrates the how the scheduled start and end dates, original planned start and end dates, and actual start dates are updated based on the changing of task status from a previous period to the current period.

TABLE 24

| Old Task Status | New Status | SchedStart | SchedEnd | ActualStart | OrigPlanStart | OrigPlanEnd |
|---|---|---|---|---|---|---|
| Unscheduled | Unscheduled | No | No | No | No | No |
| | Scheduled | Not possible | Not possible | Not possible | Not possible | Not possible |
| | Early Start | Not possible | Not possible | Not possible | Not possible | Not possible |
| | Firm | Not possible | Not possible | Not possible | Not possible | Not possible |
| | In-Progress | Not possible | Not possible | Not possible | Not possible | Not possible |
| | Completed | Not possible | Not possible | Not possible | Not possible | Not possible |
| | On-Hold | No | No | No | No | No |
| Scheduled | Unscheduled | Delete | Delete | No | No | No |
| | Scheduled | No | No | No | No | No |
| | Early Start | No | No | No | No | No |
| | Firm | No | No | No | Update | Update |
| | In-Progress | Not possible | Not possible | Not possible | Not possible | Not possible |
| | Completed | Not possible | Not possible | Not possible | Not possible | Not possible |
| | On-Hold | No | No | No | No | No |

TABLE 24-continued

| Old Task Status | New Status | SchedStart | SchedEnd | ActualStart | OrigPlanStart | OrigPlanEnd |
|---|---|---|---|---|---|---|
| Early Start | Unscheduled | Delete | Delete | No | No | No |
| | Scheduled | Not possible | Not possible | Not possible | Not possible | Not possible |
| | Early Start | No | No | No | No | No |
| | Firm | Not possible | Not possible | Not possible | Not possible | Not possible |
| | In-Progress | Update | Update | No | Not possible | Update |
| | Completed | Not possible | Not possible | Not possible | Not possible | Not possible |
| | On-Hold | No | No | No | No | No |
| Firm | Unscheduled | Delete | Delete | No | No | No |
| | Scheduled | Not possible | Not possible | Not possible | Not possible | Not possible |
| | Early Start | Not possible | Not possible | Not possible | Not possible | Not possible |
| | Firm | No | No | No | No | No |
| | In-Progress | Not possible | Not possible | Not possible | Not possible | Not possible |
| | Completed | Not possible | Not possible | Not possible | Not possible | Not possible |
| | On-Hold | No | No | No | No | No |
| In-Progress | Unscheduled | Not possible | Not possible | Not possible | Not possible | Not possible |
| | Scheduled | Not possible | Not possible | Not possible | Not possible | Not possible |
| | Early Start | Not possible | Not possible | Not possible | Not possible | Not possible |
| | Firm | Not possible | Not possible | Not possible | Not possible | Not possible |
| | In-Progress | Not possible | Not possible | Not possible | Not possible | Not possible |
| | Completed | Not possible | Not possible | Not possible | Not possible | Not possible |
| | On-Hold | Not possible | Not possible | Not possible | Not possible | Not possible |
| Completed | Unscheduled | Not possible | Not possible | Not possible | Not possible | Not possible |
| | Scheduled | Not possible | Not possible | Not possible | Not possible | Not possible |
| | Early Start | Not possible | Not possible | Not possible | Not possible | Not possible |
| | Firm | Not possible | Not possible | Not possible | Not possible | Not possible |
| | In-Progress | Not possible | Not possible | Not possible | Not possible | Not possible |
| | Completed | Not possible | Not possible | Not possible | Not possible | Not possible |
| | On-Hold | Not possible | Not possible | Not possible | Not possible | Not possible |

Project scheduled dates may be updated based on changes in project status from a previous period. Once all task level dates have been updated, dates relating to the scheduling information at the project level may be updated based on the change of status at the project level. Table 25 summarizes the possible changes.

TABLE 25

| Old Project Status | New Status | SchedStart | SchedEnd | ActualStart | OrigPlanStart | OrigPlanEnd |
|---|---|---|---|---|---|---|
| Unscheduled | Unscheduled | No | No | No | No | No |
| | Scheduled | Update | Update | No | No | No |
| | Firm | Update | Update | No | Update | Update |
| | In-Progress | Update | Update | Update | Update | Update |
| | Completed | Update | Update | Update | Update | Update |
| | On-Hold | No | No | No | No | No |
| Scheduled | Unscheduled | No | No | No | No | No |
| | Scheduled | Update | Update | No | No | No |
| | Firm | Update | Update | No | Update | Update |
| | In-Progress | Update | Update | Update | Update | Update |
| | Completed | Update | Update | Update | Update | Update |
| | On-Hold | No | No | No | No | No |
| Firm | Unscheduled | No | No | No | No | No |
| | Scheduled | Update | Update | No | No | No |
| | Firm | Update | Update | No | No | No |
| | In-Progress | If SchedStart <> This Week | Update | Update | No | No |
| | Completed | If SchedStart <> This Week | If SchedEnd <> This Week | Update | No | No |
| | On-Hold | No | No | No | No | No |
| In-Progress | Unscheduled | Not possible | Not possible | Not possible | Not possible | Not possible |
| | Scheduled | Not possible | Not possible | Not possible | Not possible | Not possible |
| | Firm | Not possible | Not possible | Not possible | Not possible | Not possible |
| | In-Progress | No | Update | No | No | No |
| | Completed | No | If SchedEnd <> This Week | No | No | No |
| | On-Hold | No | No | No | No | No |
| Completed | Unscheduled | Not possible | Not possible | Not possible | Not possible | Not possible |
| | Scheduled | Not possible | Not possible | Not possible | Not possible | Not possible |
| | Firm | Not possible | Not possible | Not possible | Not possible | Not possible |
| | In-Progress | Not possible | Not possible | Not possible | Not possible | Not possible |
| | Completed | Not possible | Not possible | Not possible | Not possible | Not possible |
| | On-Hold | Not possible | Not possible | Not possible | Not possible | Not possible |

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method for allocating processes to a plurality of resources, the method comprising:
    receiving a process specification defining a plurality of processes, each process having an associated weighting parameter and comprising at least one task belonging to a task category;
    analyzing an available resource capacity for each of a plurality of resources, each resource capable of performing tasks within at least one task category in at least one task location;
    establishing a first resource-task assignment set defining an assignment of the plurality of tasks to the plurality of resources depending on the task categories and the task locations, wherein the first resource-task assignment set defines a first scheduling of the tasks depending on the available resource capacities, and evaluating for each of the processes a first schedule parameter depending on the scheduling of the tasks belonging to the respective process;
    establishing a second resource-task assignment set defining an assignment of the plurality of tasks to the plurality of resources depending on the task categories and the task locations, wherein the second resource-task assignment set defines a second scheduling of the tasks depending on the available resource capacities, and evaluating for each of the processes at least a second schedule parameter depending on the scheduling of the tasks belonging to the respective process;
    evaluating, by one or more computers and for each of the first and second resource-task assignment sets, a control parameter that indicates a completion time associated with the resource-task assignment set, and that depends on the weighting parameter and the schedule parameter for the resource-task assignment set;
    selecting one of the first and second resource-task assignment sets depending on a selection criterion for the control parameters; and
    allocating the tasks to the resources according to the selected resource-task assignment set, wherein evaluating a control parameter for each of the first and second resource assignments comprises:
        evaluating, for each of the processes scheduled, a process assessment value that is based on a multiplicative product of the corresponding schedule parameter and the weighting parameter assigned to the process; and
        summing the process assessment values of all processes scheduled.

2. The method of claim 1, wherein the process specification comprises for at least one task a capacity requirement parameter defining the required resource capacity for carrying out the task, and a time frame parameter defining a period of minimum time required for carrying out the task; and wherein the tasks are scheduled depending on the task capacity requirement parameter and the time frame parameter.

3. The method of claim 2, wherein:
    the time frame parameter defines a plurality of time frame periods, each time frame period defining a minimum portion of a total processing time to be carried out.

4. The method of claim 1,
    wherein receiving a process specification comprises receiving for each process a process volume parameter and an efficiency parameter; and
    wherein the method further comprises evaluating the weighting parameter for each of the processes based on the process volume parameter and the efficiency parameter.

5. The method of claim 1, wherein the method further comprises:
    ordering the processes depending on the weighting parameter;
    assigning to each process a ranking parameter depending on the ordering;
    modifying the ranking parameter of a selected process; and
    modifying the weighting parameter of the selected process depending on the weighting parameter of at least one other process.

6. The method of claim 1, wherein:
    the schedule parameters are evaluated based on the scheduled ending time for the last task within each process or the starting time for the first task within each process.

7. The method of claim 1, further comprising:
    establishing a first resource ordering and a second resource ordering different from the first resource ordering; and
    wherein establishing the first resource assignment comprises successively assigning the tasks to the resources according to the first resource ordering, and establishing the second resource assignment comprises successively assigning the tasks to the resources according to the second resource ordering.

8. A system for allocating processes to a plurality of resources, the system comprising:
    one or more computers; and
    a non-transitory computer-readable medium coupled to the one or more computers having instructions stored thereon which, when executed by the one or more computers, cause the one or more computers to perform operations comprising:
    receiving a process specification defining a plurality of processes, each process having an associated weighting parameter and comprising at least one task belonging to a task category;
    analyzing an available resource capacity for each of a plurality of resources, each resource capable of performing tasks within at least one task category in at least one task location;
    establishing a first resource-task assignment set defining an assignment of the plurality of tasks to the plurality of resources depending on the task categories and the task locations, wherein the first resource-task assignment set defines a first scheduling of the tasks depending on the available resource capacities, and evaluating for each of the processes a first schedule parameter depending on the scheduling of the tasks belonging to the respective process;
    establishing a second resource-task assignment set defining an assignment of the plurality of tasks to the plurality of resources depending on the task categories and the task locations, wherein the second resource-task assignment set defines a second scheduling of the tasks depending on the available resource capacities, and evaluating for each of the processes at least a second schedule parameter depending on the scheduling of the tasks belonging to the respective process;
    evaluating, for each of the first and second resource-task assignment sets, a control parameter that indicates a completion time associated with the resource-task assignment set, and that depends on the weighting parameter and the schedule parameter for the resource-task assignment set;

selecting one of the first and second resource-task assignment sets depending on a selection criterion for the control parameters; and allocating the tasks to the resources according to the selected resource-task assignment set, wherein evaluating a control parameter for each of the first and second resource assignments comprises:

evaluating, for each of the processes scheduled, a process assessment value that is based on a multiplicative product of the corresponding schedule parameter and the weighting parameter assigned to the process; and summing the process assessment values of all processes scheduled.

9. The system of claim 8, wherein:

the process specification comprises for at least one task a capacity requirement parameter defining the required resource capacity for carrying out the task;

a time frame parameter defining a period of minimum time required for carrying out the task; and wherein the tasks are scheduled depending on the task capacity requirement parameter and the time frame parameter.

10. The system of claim 9, wherein:

the time frame parameter defines a plurality of time frame periods, each time frame period defining a minimum portion of a total processing time to be carried out.

11. The system of claim 8, wherein the instructions for receiving a process specification cause the one or more computers to perform operations further comprising:

receiving for each process a process volume parameter and an efficiency parameter; and wherein the instructions cause the one or more computers to perform operations further comprising evaluating the weighting parameter for each of the processes based on the process volume parameter and the efficiency parameter.

12. The system of claim 8, wherein the instructions cause the one or more computers to perform operations further comprising:

ordering the processes depending on the weighting parameter;

assigning to each process a ranking parameter depending on the ordering;

modifying the ranking parameter of a selected process; and modifying the weighting parameter of the selected process depending on the weighting parameter of at least one other process.

13. The system of claim 8, wherein:

the schedule parameters are evaluated based on the scheduled ending time for the last task within each process or the starting time for the first task within each process.

14. The system of claim 8, the instructions cause the one or more computers to perform operations further comprising:

establishing a first resource ordering and a second resource ordering different from the first resource ordering; and wherein establishing the first resource assignment comprises successively assigning the tasks to the resources according to the first resource ordering, and establishing the second resource assignment comprises successively assigning the tasks to the resources according to the second resource ordering.

15. A computer program product, tangibly embodied in a non-transitory machine-readable medium, the computer program product comprising instructions that, when read by a machine, operate to cause a data processing apparatus to perform functions including:

receiving a process specification defining a plurality of processes, each process having an associated weighting parameter and comprising at least one task belonging to a task category;

analyzing an available resource capacity for each of a plurality of resources, each resource capable of performing tasks within at least one task category in at least one task location;

establishing a first resource-task assignment set defining an assignment of the plurality of tasks to the plurality of resources depending on the task categories and the task locations, wherein the first resource-task assignment set defines a first scheduling of the tasks depending on the available resource capacities, and evaluating for each of the processes a first schedule parameter depending on the scheduling of the tasks belonging to the respective process;

establishing a second resource-task assignment set defining an assignment of the plurality of tasks to the plurality of resources depending on the task categories and the task locations, wherein the second resource-task assignment set defines a second scheduling of the tasks depending on the available resource capacities, and evaluating for each of the processes at least a second schedule parameter depending on the scheduling of the tasks belonging to the respective process;

evaluating, for each of the first and second resource-task assignment sets, a control parameter that indicates a completion time associated with the resource-task assignment set, and that depends on the weighting parameter and the schedule parameter for the resource-task assignment set;

selecting one of the first and second resource-task assignment sets depending on a selection criterion for the control parameters; and allocating the tasks to the resources according to the selected resource-task assignment set, wherein evaluating a control parameter for each of the first and second resource assignments comprises:

evaluating, for each of the processes scheduled, a process assessment value that is based on a multiplicative product of the corresponding schedule parameter and the weighting parameter assigned to the process; and summing the process assessment values of all processes scheduled.

16. The computer program product of claim 15, wherein:

the process specification comprises for at least one task a capacity requirement parameter defining the required resource capacity for carrying out the task;

a time frame parameter defining a period of minimum time required for carrying out the task; and wherein the tasks are scheduled depending on the task capacity requirement parameter and the time frame parameter.

17. The computer program product of claim 16, wherein:

the time frame parameter defines a plurality of time frame periods, each time frame period defining a minimum portion of a total processing time to be carried out.

18. The computer program product of claim 15, wherein the instructions for receiving a process specification cause the data processing apparatus to perform functions further including:

receiving for each process a process volume parameter and an efficiency parameter; and wherein the instructions cause the data processing apparatus to perform functions further including evaluating the weighting parameter for each of the processes based on the process volume parameter and the efficiency parameter.

19. The computer program product of claim 15, further comprising instructions that, when read by a machine, operate to cause a data processing apparatus to perform functions including:

ordering the processes depending on the weighting parameter;

assigning to each process a ranking parameter depending on the ordering;

modifying the ranking parameter of a selected process; and
modifying the weighting parameter of the selected process depending on the weighting parameter of at least one other process.

20. The computer program product of claim 15, wherein: the schedule parameters are evaluated based on the scheduled ending time for the last task within each process or the starting time for the first task within each process.

21. The computer program product of claim 15, further comprising instructions that, when read by a machine, operate to cause a data processing apparatus to perform functions including:
establishing a first resource ordering and a second resource ordering different from the first resource ordering; and
wherein establishing the first resource assignment comprises successively assigning the tasks to the resources according to the first resource ordering, and establishing the second resource assignment comprises successively assigning the tasks to the resources according to the second resource ordering.

22. The method of claim 1, wherein the task category indicates an action performed by the process in order to complete the task belonging to the task category.

23. The method of claim 1, wherein analyzing an available resource capacity for each of a plurality of resources further comprises determining a standard use time and a non-scheduled time reserve parameter for each of the plurality of resources.

24. The method of claim 1, wherein a bundle parameter is assigned to one or more of the plurality of tasks, the bundle parameter defining a group of tasks within the process.

\* \* \* \* \*

UNITED STATES PATENT AND TRADEMARK OFFICE
CERTIFICATE OF CORRECTION

Page 1 of 1

| | |
|---|---|
| PATENT NO. | : 8,185,422 B2 |
| APPLICATION NO. | : 11/461077 |
| DATED | : May 22, 2012 |
| INVENTOR(S) | : Savas Yurekli et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this
Twenty-fifth Day of September, 2012

David J. Kappos
*Director of the United States Patent and Trademark Office*